United States Patent [19]
Crawford

[11] Patent Number: 6,014,651
[45] Date of Patent: Jan. 11, 2000

[54] COMMERCIAL ONLINE SOFTWARE DISTRIBUTION SYSTEMS AND METHODS USING ENCRYPTION FOR SECURITY

[76] Inventor: Christopher M. Crawford, 4001 47th St., NW., Apt. 2, Washington, D.C. 20016

[21] Appl. No.: 09/159,492

[22] Filed: Sep. 23, 1998

Related U.S. Application Data

[62] Division of application No. 08/813,612, Mar. 10, 1997, Pat. No. 5,901,228, which is a division of application No. 08/145,825, Nov. 4, 1993, Pat. No. 5,771,354.

[51] Int. Cl.[7] .................................................. G06F 17/60
[52] U.S. Cl. ........................................ 705/400; 705/34
[58] Field of Search ..................... 379/111, 114; 395/200.47, 200.48, 200.49; 705/1, 30, 34, 400, 418; 709/217, 218, 219

[56] References Cited

U.S. PATENT DOCUMENTS

| | | | |
|---|---|---|---|
| 3,917,934 | 11/1975 | Goto | 705/418 |
| 4,278,837 | 7/1981 | Best | 178/22.09 |
| 4,319,079 | 3/1982 | Best | 178/22.09 |
| 4,465,901 | 8/1984 | Best | 178/22.08 |
| 4,649,479 | 3/1987 | Advani et al. | 395/681 |
| 4,675,828 | 6/1987 | Winston | 364/528.21 |
| 4,685,055 | 8/1987 | Thomas | 364/200 |
| 4,796,220 | 1/1989 | Wolfe | 364/900 |
| 4,868,758 | 9/1989 | Kokubu | 705/400 |
| 4,901,223 | 2/1990 | Rhyne | 345/475 |
| 4,954,945 | 9/1990 | Inoue et al. | 395/675 |
| 4,959,861 | 9/1990 | Howlette | 380/4 |
| 4,962,449 | 10/1990 | Schlesinger | 364/200 |
| 4,982,324 | 1/1991 | McConaughy et al. | 395/200.52 |
| 4,994,963 | 2/1991 | Rorden et al. | 395/309 |
| 5,005,122 | 4/1991 | Griffin et al. | 364/200 |
| 5,007,082 | 4/1991 | Cummins | 380/4 |
| 5,023,774 | 6/1991 | Sakai | 395/849 |
| 5,089,958 | 2/1992 | Horton | 395/182.03 |
| 5,107,456 | 4/1992 | Schuur | 395/325 |
| 5,109,515 | 4/1992 | Laggis et al. | 707/10 |
| 5,181,238 | 1/1993 | Medamana et al. | 379/95 |
| 5,182,770 | 1/1993 | Medveczky et al. | 380/4 |
| 5,204,897 | 4/1993 | Wyman | 380/4 |
| 5,210,866 | 5/1993 | Milligan et al. | 395/182.04 |
| 5,212,784 | 5/1993 | Sparks | 395/575 |
| 5,222,134 | 6/1993 | Waite et al. | 380/4 |
| 5,265,153 | 11/1993 | Ozawa | 379/100.04 |
| 5,276,441 | 1/1994 | Katsurada et al. | 340/825.03 |
| 5,276,867 | 1/1994 | Kenley et al. | 707/204 |
| 5,291,554 | 3/1994 | Morales | 380/5 |
| 5,317,728 | 5/1994 | Tevis et al. | 707/204 |
| 5,325,430 | 6/1994 | Smyth et al. | 380/4 |
| 5,353,283 | 10/1994 | Tsuchiya | 370/60 |
| 5,353,411 | 10/1994 | Nakaosa et al. | 395/651 |
| 5,367,698 | 11/1994 | Webber et al. | 395/800 |
| 5,371,852 | 12/1994 | Attanasio et al. | 395/200 |
| 5,379,418 | 1/1995 | Shimazaki et al. | 395/575 |
| 5,383,129 | 1/1995 | Farrell | 705/400 |
| 5,390,297 | 2/1995 | Barber et al. | 395/200 |
| 5,404,527 | 4/1995 | Irwin et al. | 395/200.52 |
| 5,426,594 | 6/1995 | Wright et al. | 395/200.36 |
| 5,448,718 | 9/1995 | Cohn et al. | 395/404 |
| 5,497,463 | 3/1996 | Stein et al. | 395/200.03 |
| 5,497,479 | 3/1996 | Hornbuckle | 463/29 |
| 5,509,070 | 4/1996 | Schull | 380/4 |
| 5,515,502 | 5/1996 | Wood | 395/182.13 |
| 5,535,407 | 7/1996 | Yanagawa et al. | 705/39 |

(List continued on next page.)

*Primary Examiner*—Edward R. Cosimano
*Attorney, Agent, or Firm*—Nixon & Vanderhye P.C.

[57] ABSTRACT

A customer computer connects to an online service provider by phone, Internet, or other telecommunications link. The link gives the customer access to additional processing and storage resources such as virtual storage, processing power and/or additional software or data through interaction between the customer computer and an online service provider computer over the link. The additional resources made available to the customer computer enhance the customers' local needs through access to virtual storage, a more powerful processor of similar type for program execution, and/or online support services such as software rental, software sales, release update services, anti-viral services, data backup and recovery services, diagnostic services and/or repair services.

94 Claims, 63 Drawing Sheets

U.S. PATENT DOCUMENTS

| | | | |
|---|---|---|---|
| 5,544,320 | 8/1996 | Konrad . | |
| 5,606,719 | 2/1997 | Nichols et al. | 395/876 |
| 5,646,984 | 7/1997 | Oda | 379/114 |
| 5,689,476 | 11/1997 | Leach | 368/10 |
| 5,696,901 | 12/1997 | Konrad | 395/200.33 |
| 5,732,401 | 3/1998 | Conway | 705/29 |
| 5,751,799 | 5/1998 | Kawasaki | 379/114 |
| 5,771,354 | 6/1998 | Crawford | 395/200.59 |
| 5,799,285 | 8/1998 | Klingman | 705/26 |
| 5,893,077 | 4/1999 | Griffin | 705/34 |
| 5,901,228 | 5/1999 | Crawford | 380/25 |

| 600 | Hardware Configuration Data | Processor Make & Model | Memory | Peripherals | |
|---|---|---|---|---|---|
| 602 | Customer Profile Data | Userid | Password | Customer Name | Phone Number |
| 604 | Table Occurs | Access Code | Phone Number | Access Reason | Response Default | Replica/Host Link |
| 606 | Session Active Flag | Host/Replica Session | Automated Session Flag | | 608 |
| 607 / 610 | Service Control Program Hot Key | Session Initiation Hot Key | Command Prompt Drive Chg Hot Key | 612 / 613 |
| 614 | Redirected Interrupt Table Occurs | Interrupt | Active | | |
| 616 | Automated Session Table Occurs | Date | Day | Time of Day | Interval Time | Service Options |
| 624 | Ringing Pattern Stores Table Occurs | Call | Rings | Wait Time | Error Tolerance |
| 626 | Backup Option flag | Incremental Flag | Full Backup | Backup File List |
| 628 | Restore Option Flag | Incremental Flag | Full Restore | Restore File List |
| 630 | Anti-Viral Option Flag | Device Cleansing List | Build Anti-Viral Environment |
| 632 | Media Routing Option Flag | Default Customer & Host Storage Locations by Media Type |
| 634 | Media Origination Table | Device | Location | Allocate Device | Read Device Flag |
| 636 | Media Destination Table | Device | Location | Allocate Device | Write to Device Flag |
| 638 | Inter-Routing Media Option Flag | Media Conversion Table Occurs | From Media | To Media |
| 640 | Diagnostic Option Flag | Diagnostic Function List |
| 642 | Disk Compression Option Flag | Compression Method |
| 644 | Disk Encryption Option Flag | Encryption Method |
| 646 | Disk Management Option Flag | Management Functions |
| 648 | Release Update Option Flag | Software & Info List |
| 649A | Processor Flag (Customer, Replica, Host) |
| 649B | Processing Control Table Default Settings by Processor Flag |
| 649C | Customer Processor Command Prompt Drive Designator |
| 649D | Replica Processor Command Prompt Drive Designator |
| 649E | Drive Control Table Default Settings by Disk Type |

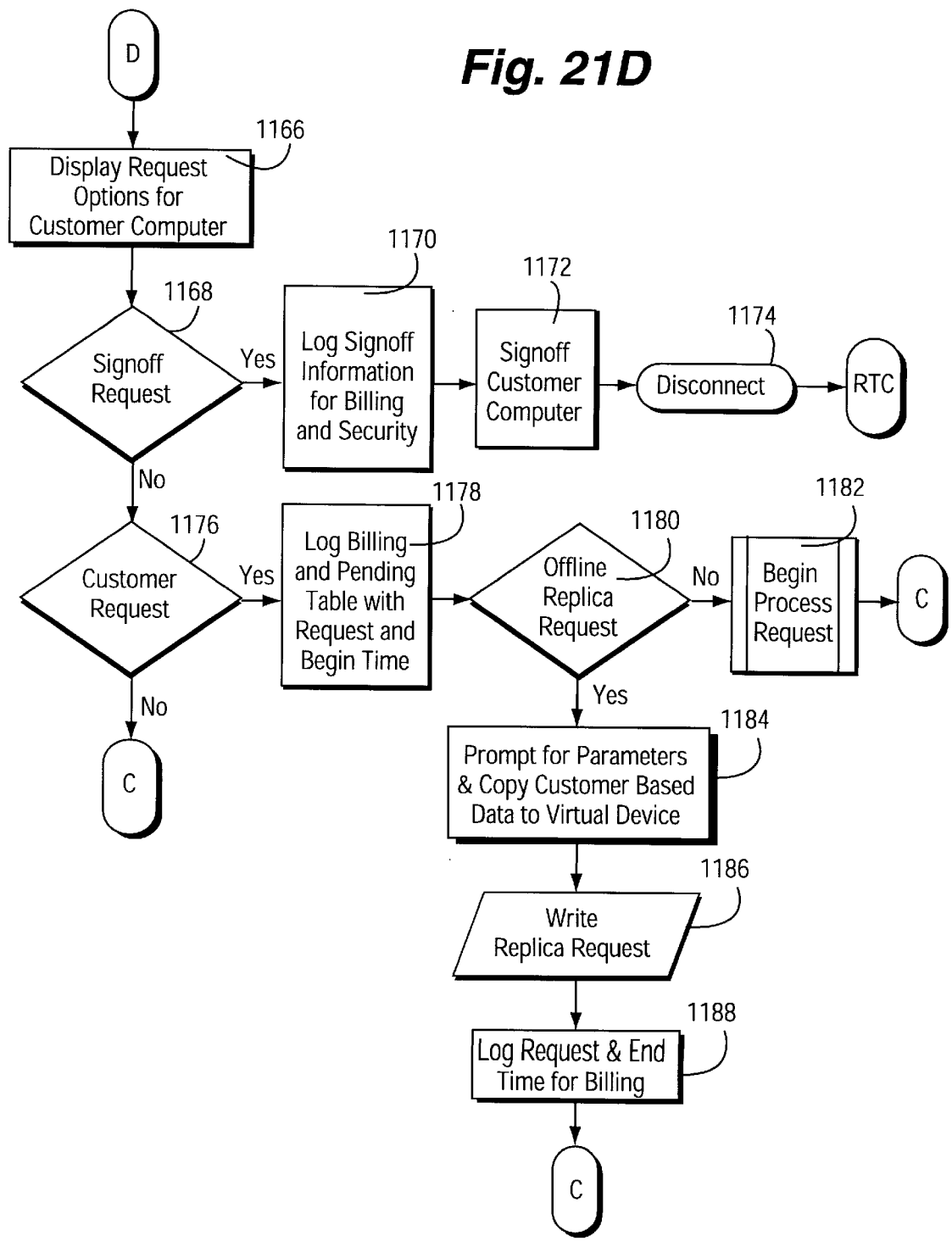

Fig. 22A

| Online Service Control Data Customer 1 |
|---|
| Online Service Control Data Customer 2 |
| . . . |
| Online Service Control Data Customer N |

Fig. 22B

| 1002 | |
|---|---|
| 1002A | Image of Online Service Control Data Stored on Customer Computer |

| | | | |
|---|---|---|---|
| 1002B | Billing Name | Address | Phone Number |
| 1002C | Method of Payment | Bank & Credit Card Information | |
| 1002D | Customer Access Allowed | Multiple Simultaneous Signons Allowed | |
| 1002E | Balance and Payment Info | Current & YTD Balance | Payment & Charge History |
| 1002F | Credit Info | Credit Limit | Maximum Daily/Monthly Charge | Limits Per Service Option |
| 1002G | Services Allowed/Prohibited Table Occurs | Service | Date/Day/Time Range | Allow/Prohibit |
| 1002H | Ringing Pattern Table Occurs | Call Occurrence | Phone Number | Wait Time Before Dialing |
| | | | Times to Ring | Answer on Ring | Tolerance |
| 1002I | Dialup Table Occurs | Date | Time of Day | Use Ring Pattern | Complete Pending Requests |
| 1002J | Dialup Table Occurs | Day | Time of Day | Use Ring Pattern | Complete Pending Requests |
| 1002K | Dialup Table Occurs | Date | Interval Time | Use Ring Pattern | Complete Pending Requests |
| 1002L | Dialup Table Occurs | Day | Interval Time | Use Ring Pattern | Complete Pending Requests |
| 1002M | Access Code Table | Dialup Reason | Access Code |
| 1002N | Request Pending Table Occurs | Request | Date/Time | Estimated Completion | Notify Method |
| 1002O | Completion Message Table Occurs | Completion Message | Notify Status | Notify method |
| 1002P | Error Message Table Occurs | Error Message | Status | Action Performed | Response |
| 1002Q | Notify Method Table Occurs | Message | Response Action | Notify Method |
| 1002R | Dialback Option Flag | Signon Allowed Flag |
| 1002S | Member Since Date | Reinstatement Date |
| 1002T | Last Signon Date & Time | Duration |
| 1002U | Service Cancel Date | Reason |
| 1002V | Processor Flag (Host, Replica, Customer) |
| 1002W | Telco Billing Access Flag |
| 1002X | Error Signon Attempts |

Fig. 22C

| Userid | Start Date/Day & Time | Request Table Entry | Parameters | Use Replica | Notify Method |
|--------|----------------------|---------------------|------------|-------------|---------------|
| 1004A | 1004B  1004C | Backup | 1004D | 1004E | 1004F |
| | | Restore | | | |
| | | Archive | | | |
| | | Create Anti-Viral Environment | | | |
| | | Diagnostics | | | |
| | | Storage Maintenance | | | |
| | | Release Update | | | |
| | | Upload Online Service Control Data | | | |
| | | Media Routing | | | |
| | | Media Conversion | | | |
| | | Write Host or Replica Signal Data | | | |
| | | Write Replica Request | | | |
| | | Signoff | | | |
| | | Other Request | | | |

| | |
|---|---|
| 1006A | Userid |
| 1006B | Date/Time Submitted |
| 1006C | Date/Time to Start |
| 1006D | Estimated Completion Time |
| 1006E | Request, Request Parameters |
| 1006F | Processor Type Flag |
| 1006G | Input Device/File List |
| 1006H | Output Device/File List |
| 1006I | Notify Method |

Fig. 22E — 1000

| | |
|---|---|
| 1000A | Userid |
| 1000B | Date/Time Submitted |
| 1000C | Date/Time to Dialup |
| 1000D | Access Code |
| 1000E | Dialup Reason |
| 1000F | Replica/Host Signal Flag |
| 1000G | Await Pending Requests |

Fig. 22F — 1008

| | |
|---|---|
| 1008A | Userid |
| 1008B | Date/Time Started |
| 1008C | Date/Time Completed |
| 1008D | Request |
| 1008E | Request Sucessful |
| 1008F | Customer/Host/Replica Request |
| 1008G | Processor Type Flag |
| 1008H | Telco Billing Flag |
| 1008I | CPU Time, Storage Type & Usage |
| 1008J | Printer Type and Charges |
| 1008K | Charge Amount |

Fig. 22G — 1010

| | |
|---|---|
| 1010A | Request |
| 1010B | Customer/Host/Replica Request |
| 1010C | Replica Server or Offline Task |
| 1010D | Processor Type Flag |
| 1010E | Time of Day Range |
| 1010F | Date Range |
| 1010G | Holiday |
| 1010H | Charge Amount Per Minute |
| 1010I | Monthly Base Charge |
| 1010J | Per Use Charge |
| 1010K | Storage Charge Table(Type, Qty, $) |

COMMERCIAL ONLINE SOFTWARE DISTRIBUTION SYSTEMS AND METHODS USING ENCRYPTION FOR SECURITY

This is a division of application Ser. No. 08/813,612 filed Mar. 10, 1997, now U.S. Pat. No. 5,901,228, which is a division of application Ser. No. 08/145,825 filed Nov. 4, 1993, now U.S. Pat. No. 5,771,354.

FIELD OF THE INVENTION

The present invention relates to on-line services for computer users. More specifically, it provides an on-line service that supplies automated information processing services to computer users for a fee. The present invention more particularly relates to an on-line service that allows remote computer users to connect on-line to computer devices (e.g., "virtual" disks) and access them to do such things as run computer software from them.

BACKGROUND AND SUMMARY OF THE INVENTION

It is common for computer users to connect to a large mainframe computer to get computer services. The user has a "dumb" terminal (a keyboard and a display but no processor "brain") connect to the mainframe computer over a telephone line. The user's "dumb terminal" calls up the mainframe and establishes an on-line connection. The mainframe does all the computer processing, and sends the results down the telephone line for display on the user's display. The user is often charged a fee based on the amount of time he is connected to the mainframe.

Many people now have personal computers in their homes and businesses. These "stand-alone" personal computers have taken over the marketplace, and now most computing is done locally within the box that sits in front of the user. This is possible because these personal computers are self-contained units that have their own powerful internal processor "brain," memory and mass storage. Since they can do most computing locally, most computing tasks can be carried out without connecting to another computer over a telephone line.

Even though most computing can be done locally on a personal computer, there is often a need to share information between computers. For example, one computer user may wish to send an electronic mail message ("Email") to another computer user. Similarly, a computer user may want to retrieve a file he (or someone else) previously stored on another computer.

The simplest way to transfer information between computers is to have one of the computers write the information onto a storage device (e.g., a floppy diskette or magnetic tape). This storage device is then physically carried to the other computer, which reads the information. While this approach is simple and low in cost, it is often inconvenient to carry or send a physical storage device to the computer that wants to read the information. In addition, it may take too long to physically move the storage device (e.g., suppose that the two computers are in different states or even in different countries).

Because computer users often demand instantaneous sharing of computer information and cannot wait for someone to send them a floppy disk containing the information, various "on-line" personal computer connections have become popular. The computer user can connect a "modem" (a kind of data transmitter and receiver) between his computer and his telephone line. The computer controls the modem to automatically call the telephone number of another computer, which also has a similar modem connected between it and the telephone line. The two computers can "talk" to one another over the telephone line, and can exchange all sorts of information such as files, Email, and computer programs.

An entire industry of "information providers" (also referred to as "on-line services") has been created to support the need for computers to share information. These information providers automatically answer telephone calls placed by user's computers, automatically respond to information requests, and provide the information over the telephone line to the calling computer. Compuserve, Prodigy and America On-line are all examples of information providers. A computer user can use these on-line services to do useful things such as place a computer want ad, read electronic mail messages, download a new video game program, scan the news wires, get a stock quote, and conference with other computer users about his favorite hobby. The information providers require the user to pay a fee each month. This fee can be a flat, unlimited use fee, or it can be based on the amount of connection time. The user's credit card number is often on record, and his credit card is automatically charged every month.

The information provider maintains a "host" computer system (e.g., a large "mainframe" computer) that automatically answers the incoming call. When a user requests a function to be performed by the information provider, software is run on the host computer system to satisfy the request. Results can be stored on the host for later review or file transfer to the remote personal computer. The user's computer uses "file transfer protocols" and "workstation capture buffer" to receive the data. However, just like with prior "dumb" terminals, user interaction with the host computer system is with the user's personal computer acting as a workstation display terminal. The user is limited to keyboard input and displayed output.

There are also certain products that allow one personal computer to remotely access another personal computer and/or resources connected to the other personal computer. For example, a product known as "PC Anywhere" involves loading software onto two personal computers: the "master" personal computer to be accessed, and the "remote" personal computer that will be doing the remote accessing. The software allows an on-line, real time link to be established via modems and a telecommunications link between the master and the remote. All user inputs (e.g., keyboard and mouse commands) inputted at the remote are passed to the master, and all display outputs (e.g, screen driver inputs) are passed from the master to the remote. The processor of the remote simply passes this information back and forth without doing any other substantive processing on it. Moreover, the on-line session takes control of the remote computer (at least in a single tasking environment) and does not allow the remote user to access other resources of his remote computer. This "PC Anywhere" technique thus allows the remote computer to access all resources (e.g., connections to a minicomputer) that the master can access, but does not permit any substantial degree of co-processing. In other words, the remote personal computer thus acts like a "dumb" terminal, with the master doing all of the substantive processing.

So-called "Bulletin Board" systems also provide on-line services to PC users. These systems typically consist of a dedicated personal computer with a large hard disk to store the software and messages collected from various users. These systems are suitable for sending and retrieving messages, bulletins, programs, and other uses like a forwarding point for customer orders, remote site data collection, software distribution, or on-line product support services. Limited hardware and software costs for these systems has made them a cost effective solution for certain business needs. More frequently, they are used by individuals to send and receive programs and messages. The biggest limitations to these systems are their lack of security controls and their limited capabilities (and corresponding susceptibility to overload) when operated in a multi-user and multi-tasking environment. Bulletin Board systems are also renowned for spreading computer viruses (see discussion below) particularly because virus coders can easily upload their infected programs anonymously.

Another way computer users commonly share information is by logging onto the "Internet," a worldwide network of computers connected together. Nearly every university and many other organizations in the United States have connected their computer systems to the Internet. The Internet is commonly used to transfer electronic mail and files between computers. However, some "server" computers on the Internet also provide automatic computing capabilities to remote users. For example, it is possible to send an electronic mail "request" that a particular "server" computer automatically responds to by sending a electronic mail "reply" containing the requested information. A simple example is for a server to reply to a request by sending a text message or file. On a more complex scale, so-called "Archie" servers can automatically perform a database search based on the request, and send back a list of records that meet the search criteria. It is also possible to send programs from a less powerful computer to a more powerful computer, having the more powerful computer execute the program to generate an output file, and then return the output file to the less powerful computer for review and analysis. A wealth of publications and articles are available that provide much more information about the "Internet" and the so-called "Information Highway."

The Internet is similar to a LAN/WAN in that it was designed to allow many computers of differing types to interconnect and exchange information and programs. The Internet is used to allow computers to interconnect with other computers of similar or different type to exchange information and access programs. Typical access to the Internet is by monthly fee paid to a provider for access. A typical fee might be $200 a month for unlimited access and 50 megabytes of download capabilities. Additional data downloaded would be provided on a per megabtye basis. Other commercial providers on the Internet may charge by the minute for access to their system. An on-line service as described in the exemplary embodiment of this invention could become a commercial provider on the Internet.

Many users connect to the Internet using a protocol called "SLIP" which allows a personal computer to operate as a "dumb terminal" for access to information and services. The Internet provides several layers of access available to remote users. The mail layer allows the exchange of mail between remote system users. The news layer provides various news information typically related to computers such as a new virus loose, or new release information on an upcoming system or hardware product. Telnet is used to provide remote log-on into other remote systems connected to the Internet. NFS (Network File System), RFS (Remote File System) are used to set aside at least a portion of the local system to be available as a file system on the network. Drives on a remote system defined using NFS and RFS are available for mounting by other remote systems on the Internet. Anonymous FTP (File Transfer Protocol) is also available on the Internet to access files residing on a remote system. PPC is also used to provide interconnection between a remote system and the Internet. PPC allows a remote system to be defined by the Internet with a node and is thus assigned a unique address within the Internet system to allow other remote systems to access the remote system defined using PPC.

One problem with the Internet is that a local computer can directly access the resources of another computer, thus allowing a local computer to introduce a boot sector virus, for instance, on the system disk of a remote computer such that the remote computer will become infected the next time the remote computer is booted. NFS and RFS do utilize security controls to set the discretionary (public access as set by user) and mandatory (secured access defined through system maintained security attributes for each object on the system) controls when making a local file system available to the network. A remote user with proper authorities, however, still has direct access to the remote system's storage, however, and so the opportunity exists to transport unwanted data and programs to the remote system. This problem has cause serious consequences in the past (e.g., in 1988 a WORM virus spread throughout the Internet and infected many computers).

"Local area networks" (LANS) are another common way to interconnect computers. Many businesses now store most or all of their important data on a special shared personal computer called a "file server." User computers access the shared file server over a high-speed data network called a "local area network" (LAN) or a "wide area network" (WAN). Briefly, a "local area network" interconnects data equipment within a limited geographical area, allowing user computers to communicate with each other and to share central resources such as printers, data storage, and long distance data communications. LANs are typically interconnected with coaxial copper cable, unshielded twisted pair cable, or fiber optics. Using a LAN to inter-connect computers provides a more efficient and faster means for data transfer than traditional file transfer methods. All users on a LAN can share resources such as printers, storage devices, and telecommunication links to limit costs associated with duplication of data and equipment. A LAN can also improve business functions with interconnected workstations accessing electronic mail and various shared applications such as customer service inquiry.

As an example of using a LAN to share information, suppose a user wants to edit a word processing document stored on the shared file server. The user's computer sends an electronic request for the document over the local area network. The file server receives the request, processes it, and sends the requested document over the network in an electronic message addressed to the user's computer. The user's computer then loads the document into its internal memory for editing. Once edited, the user's computer can store the document locally (e.g., on the user's computer's hard disk or floppy disk drive), or it can write the edited document back to the file server over the network where it can later be retrieved by the same or different user.

The biggest problem with a LAN in today's world is that the user transparently directly accesses resources on a different computer. This leaves open the possibility that a computer "virus" can proliferate without user knowledge and with limited detection capabilities. A computer "virus" is a special kind of computer program that takes over the operation of a computer. Computers can "catch" viruses by receiving executable computer programs from other computers. Some viruses command the infected computer to destroy all stored information. Other viruses are less harmful, but all viruses are potentially damaging in terms of wasting computer resources and annoying computer users. Virus protection software can be loaded onto computers to protect them from virus infections. Unfortunately, this anti-viral software can only protect against the particular types of viruses the software is programmed to recognize and/or behavior common to viruses. A new "strain" of computer virus can entirely escape detection. Therefore, it is necessary to update virus protection software with new versions as often as possible. This becomes expensive and time consuming, and it often becomes an administrative problem to ensure that updates are regularly applied.

Some personal computer users are able to establish connections with minicomputers such as IBM's AS/400 system and its predecessor system the IBM System 36 and System 38. The AS/400, IBM's mid-range computer system, has been successfully marketed by IBM to a wide variety of medium size businesses such as banks and law firms. Although IBM's AS/400 system is typically referred to as a "mid-range" computer, the larger models supporting more than one thousand simultaneous users are actually "mainframes" from the standpoint of storage and processing capabilities. Because personal computers are so common, IBM has developed some sophisticated "PC Support" techniques for allowing local and remote personal computers to "attach" to the IBM AS/400 minicomputer as workstations and also to send and retrieve files and other information.

IBM also introduced a "Virtual Disk" function as part of its "PC Support." This function allows users to access personal computer programs and information by accessing the mini computer as if it were a locally-attached personal computer disk drive. Thus, the minicomputer simulates a local disk drive with a "virtual" or "simulated" disk that actually comprises hardware and software resources of the mid-range computer. In other words, the mid-range computer when attached to the personal computer "looks like" a local disk drive to the personal computer. The personal computer "thinks" it is writing to a locally attached disk drive when actually its data is going through a communications (e.g., telephone) line and gets stored in the memory and/or hard disk of the minicomputer.

Because the personal computer is "fooled" into thinking that the minicomputer "virtual disk" resource is a locally attached disk drive, no significant changes to personal computer hardware and software are needed to interface the personal computer with the minicomputer. For example, it becomes possible for a standard off-the-shelf software program such as Lotus 1-2-3 or WordPerfect to, without modification, read from and write to the disk of the minicomputer. IBM has also provided a "virtual printer" facility that allows personal computers to write to printers attached to the minicomputer while "thinking" they are writing to a locally attached printer.

To install or update the "PC Support" software on a personal computer ("PC"), the user establishes an on-line session between the PC and the IBM minicomputer using special "bootup" software. This bootup software attaches, to the PC, a host virtual disk drive containing the current version of the PC Support software. The software then may be copied from the virtual disk onto the personal computer's local hard disk drive. Alternatively, the personal computer can execute the PC support software from the virtual disk.

When IBM introduced the AS/400, the "Virtual Disk" function was enhanced with the "Shared Folder" function. Shared folders typically contain various different types of files, such as: PC files (both programs and data), text documents (accessible by AS/400 and PC word processors), mail, and data created with Office Vision/400. Personal computer files maintained in a folder are stored in PC format just like PC files. When PC files are stored in a shared folder, the information can be shared by other personal computer users.

In one configuration, the IBM AS/400 can be used with dial-up telephone lines to attach "virtual disks" to remotely located personal computers. Modems are used to provide an interface between the AS/400 and standard dial-up telephone lines. The modems connect to a "communications controller" interface board within the AS/400. This "communications controller" board translates the data streams between the modem and the AS/400. Using these techniques, it is possible to have a remote personal computer call up the AS/400 over a dial up telephone line and attach to a "virtual disk" provided by the AS/400 (this requires both the remote personal computer and the AS/400 to run appropriate "PC Support" software). The personal computer assigns a drive designator (e.g., "E") to the "virtual disk." If the computer user commands the personal computer to write to the "C" drive, the personal computer will write the information to the local PC hard disk. If the computer user, on the other hand, commands the personal computer to write to the "E" (virtual) disk drive, the personal computer "thinks" it is writing to a locally attached "E" disk but is instead sending its data over the telephone line for storage in the AS/400. Reading from the "E" drive retrieves files from the AS/400. The reader is referred to the IBM documentation concerning this function, and in particular, the "PC Support" manuals relating to the IBM System/36, System/38 and AS/400. See also IBM manuals relating to TCP/IP for the IBM RISC 6000 describing the "mount" command supported under the AIX operating system.

File serving in an AS/400 environment provides added anti-viral protection because a user's personal computer never directly addresses another personal computer. Each personal computer can simultaneously access host peripherals, but it cannot directly access another personal computer through the AS/400 using standard DOS interaction. Each personal computer data request is intercepted by PC Support Router software which translates device access into workstation requests. Although a virus can be sent to and retrieved from the host system as part of a program, the virus cannot spread on its own while it is stored on the host. Furthermore, the AS/400 does not execute code stored on virtual disks. PC code does not execute in the AS/400 processor because the AS/400 operating system is different from a personal computer operating system. Moreover, one of the most dangerous types of viruses known as "boot sector viruses" (executable code stored in a "boot sector" of a physical disk drive to provide drive information for the disk to be addressed) cannot be appended to a host drive because host drives are AS/400 objects (files) accessed solely by a router to satisfy various PC requests.

The following is a non-exhaustive but somewhat representative listing of additional prior-issued patents, publications and advertisements related to on-line virtual device computer services and/or virtual devices:

| 4,649,479 | 03/87 | Advani et al. |
| 4,982,324 | 01/91 | McConaughy et al. |
| 5,023,774 | 06/91 | Sakai et al. |

-continued

| | | |
|---|---|---|
| 5,107,456 | 04/92 | Schuur |
| 5,109,515 | 04/92 | Laggis et al. |

S. Armbrust et al., *PC Tech Journal*, Vol. 3, No. 9, "Forward Looking VDI," September 1985, pp 42–53

E. R. Carpenter, *IBM Technical Disclosure Bulletin*, Vol. 34, No. 10B, "Single System Image With Network File System," IBM Corp., March 1992, pp 408–409

M. Tabes, *Datamation*, "Managing Storage Across the Enterprise," May 1992, pp 36–40

P. Korzeniowski, *Software Magazine*, "Back to the Mainframe For Storage of LAN Data," July 1992, pp 73–77

Mark Ludwig, *The Little Black Book of Computer Viruses*, American Eagle publications, 1991, pp. 11–19, 23–29, 55–68, 69–76, 159–162

R. Waterman, *Software Magazine*, "Waiting for X500," July 1992, 2 pages

R. Brown, *Systems 3X/400*, "Serving Many Masters," March 1992, pp 68–70

*PC Computing*, "Test and Evaluation Methods," June 1992, pp 238, 240, 247–248 and 262

Advertisement, "Data Rx," 1 page

Price list, "Tape Backup," 1 page

Advertisement, "Let's Talk®), Tired of the Runaround?," 1 page

Advertisement, "PC/TCP®, Plus," 1 page

Advertisement, *News 3X/400*, "Mimix Hi-Net, Lakeview Technology Inc.," September 1991, p 140

Advertisement, *Network Innovation*, "Server Based Backup," 1 page

Advertisement, *News 3X/400*, "PC File Mail," November 1991, p 74

Advertisement, "HandsOn Software, Monarch 36/400J lets PC users get their hands on mid-range data," 1 page Advertisement, Andrew, "NetLynx™: LAN Connectivity by the Numbers," 1 page Advertisement, "Innovation®, Data Processing, FDR. Your DASD Management System," 1 page Advertisement, "Maynard®, Maynard Delivers a Super Bundle," 1 page Advertisement, "Central Point Software Inc.®, Never Underestimate the Importance of Complete Protection," 1 page Advertisement, *Business Communications*, Gazelle, "Backup While You Work," June 1992, p. 436

Advertisement, "Works," 1 page

Advertisement, "Intel®, Introducing fax software that can send, receive and run with your faxes, 1 page Advertisement, "LapLink, With LapLink you're only a phone call away," 1 page M. Tischer, *PC Systems Programming*, Abacus, April 1993, pp. 157–171, 208–12, Appendix B and C Robert Jourdan, *Programers Problem Solver*, Prentice Hall, 1986, pp. 369–394, 395–406

The Waite Group, *MS-DOS Developers Guide*, Howard Sams & Co., 1989, pp. 281–354, 583, 739–748

Advertisement, *PC/Computing*, "Control up to 96 PC file servers with 1 keyboard and monitor using . . . Commander by cybex, p 433

Advertisement, *PC/Computing*, "SequeLink™, MiddleWare™: Open Windows for Client/Server Computing," p 427

Advertisement, "System Software Associates, Inc., BPCS Client/Server Application Software, 1 page Advertisement, "Rochester Software Connection, Inc., What's fast, fun and does the AS/400?" 1 page One of the greatest limitations to existing on-line services is that no provisions are available to execute host based software on the remote user's system directly or for a user's locally executing application to directly access storage on the host system. The present invention provides an on-line service and associated equipment which solves these and other problems.

A presently preferred exemplary embodiment of this invention provides the following advantageous features:

A multi-user host provides a wide variety of on-line services to a plurality of remote computers via virtual device attachment.

Virtual peripheral devices are attached to the remote customer computer via an on-line, temporary telecommunications link (e.g., a dial up telephone line) in the context of an on-line service.

Customers can load executable code stored on host virtual devices directly into customer or "replica" server memory for execution without file transfer.

Device drivers executed by the customer computer automatically manage I/O requests to replica server and host virtual devices as though they were locally attached devices.

An automated recovery feature periodically (e.g., incrementally) archives the customer computer mass storage data onto a host "virtual disk drive." When recovery is necessary (e.g., due to failure of the local mass storage device), the customer computer may be initiated using a special boot diskette to boot the computer and automatically attach to the host virtual disk—thereby permitting the customer computer to operate essentially normally despite the failure of its local mass storage device.

Software distribution can be provided on two levels. "Execute only" access to an executable program stored on host-provided virtual storage allows the user to run the program from time to time and/or permit the user to try the software out to determine whether a local copy is needed. Execute only access loads directly into the customer computer or replica server memory without creating an intermediate disk copy. Upon paying a fee, the user is granted copy access to permit downloading the file onto the customer computer local mass storage.

Virtual storage device access includes automatic anti-virus detection in real time. The most recent anti-virus software releases are provided so that new virus strains will be detected while relieving the user from having to constantly update anti-virus software.

Unattended access/attachment to the host (e.g., at a scheduled time during off peak hours) performs routine tasks such as incremental backup/archiving.

Automatic diagnostic capabilities inform the customer about hardware and/or software problems with their computer.

The host may route information between users and/or physical or virtual devices (e.g., to permit multiple users to have shared access to a common database, or customers to move information from one computer to another).

On-line virtual output facilities such as production printing, facsimile, and electronic mail can be economically provided on a "pay as you go" basis.

The host provides automatic billing capabilities and security facilities.

User authorization to access the host may be granted by a "sign-up" system.

The "sign-up" system may create a configuration file including password and other access information, and download the file to the user's workstation. Initial charges may be collected via a user-supplied credit card number. Alternatively, access to the "sign-up" system may be via a "special pay" telephone number (900) such that compensation is received by the service provider from the user via the telephone company billing system.

A sophisticated signal process.

A dialing pattern sent to a customer computer (e.g., a certain number of calls, certain number of rings each call, a certain wait period between each call) triggers the customer computer modem to switch into answer mode. Upon answer, an access code is optionally sent to the customer's computer that identifies a reason for the host call (i.e., dial back verification, host task completed on behalf of customer, mail or data waiting for download to customer, etc.). The host computer flags a customer record indicating the customer computer answered at the appropriate time (dialing pattern match), thereby allowing the customer computer to access the host. A Customer Signal file is used to queue the dial-up requests. This allows the host to trigger the customer to call the host when needed, and also allows the customer to be certain that only his computer can access the service. When the customer calls the service first, the service hangs up and queues a dialing pattern to be sent to the customer. Only when the customer computer answers after a certain dialing pattern will the host computer allow the customer entry. The customer accesses the service, but only after the host flags a dialing pattern match. If the host dials the customer first and gets a pattern match, then the customer can access the system immediately without this dialback sequence.

A computer of similar type to the customer (Off-line "Replica" Computer) performs tasks that require an identical processor type to the customer, thus freeing the customer computer to perform other activities. Request data is written by the customer and read by the Replica computer to perform these tasks. The Replica computer task has access to data secured by the user but available only to the customer and the replica task (i.e., routing disks, etc.). Prompts and information are supplied before the request is queued, and the replica computer automatically enters the necessary keystrokes to achieve the task using the prompted information stored with the request data. A Replica Request file is used for the data.

A 900 area code phone number is used for pay access to services.

A customer processor executes commands from the host. All requests for services are initiated by a host command that in turn may execute a customer computer processor command.

Host based anti-viral programs are loaded and executed in the customer processor to protect access to programs and data.

Virtual devices to allow the execution of host based software within the customer processor.

Host Request information maintained in a Host Request File causes commands to execute on the host which may in turn cause commands to execute within the customer processor.

A host based controlling command for each service option and a router security intercept program which track the start and end time for billing purposes whenever a command executes within the customer processor.

Media, documents and the like can be converted by using a replica of the customer's computer running translation or conversion software against data stored in virtual devices by the customer.

The service allows customer access to on-line service data by the customer computer processor by attaching to the data as a virtual drive.

Data and programs can be rented by using a host control program to restrict attachment to virtual disks holding the data and programs. A host command is used to direct the router to initiate execution of a specified program in the customer's processor.

Data and programs can be purchased/licensed by moving them from a restricted virtual disk to a virtual disk created for and owned by the customer using a host control program.

Automated release update services maintain a table of software owned by the customer that is allowed to be updated. Release update data and programs can be transferred from a restricted virtual disk to the customer computer disks or virtual disks using a host control program.

A security program verifies types of access to restricted virtual devices attached by a control program but currently accessed by a program executing within the customer's processor.

Control information is transferred between the host computer and the customer computer to manage on-line service requests.

A host controlling program executes programs in both the host processor and customer processor separately or at the same time within a given process to achieve desired results.

Programs residing on the host system but executed within the customer processor are executed as though they are directly available to the customer computer operating system using a host control program.

In the case of on-line service access via special charge telephone numbers, Telco's use On-line Service billing time and access charges to assess fees which appear on the customer's Telco statement.

Request completion information is maintained on the host. This information is displayed to the customer on subsequent accesses, or the customer is alerted of a completion by sending a dialing pattern and access code to identify the type of message or trigger the customer computer to call the on-line service.

The customer computer automated access program can identify a lockup condition and break out of the task to continue with additional requests.

The host computer identifies a lockup condition and cancels the program or session to allow the customer computer to continue with additional requests.

BRIEF DESCRIPTION OF THE DRAWINGS

These and other features and advantages provided by the present invention can be more completely and better understood by referring to the following written description of a presently preferred exemplary embodiment in connection with the drawings, of which:

FIGS. 16A–16C are schematic illustrations of exemplary data structures maintained by the customer computer in the preferred embodiment;

FIGS. 21A–21E together are a flowchart of exemplary program control steps performed by the host computer system in the preferred embodiment to effect the "begin customer session" block shown in FIG. 17;

FIGS. 22A–22G schematically show exemplary data structures maintained by the host computer system in the preferred embodiment;

DETAILED DESCRIPTION OF A PRESENTLY PREFERRED EXEMPLARY EMBODIMENT

I. Customer Computer On-Line Service Needs

Figure 1:
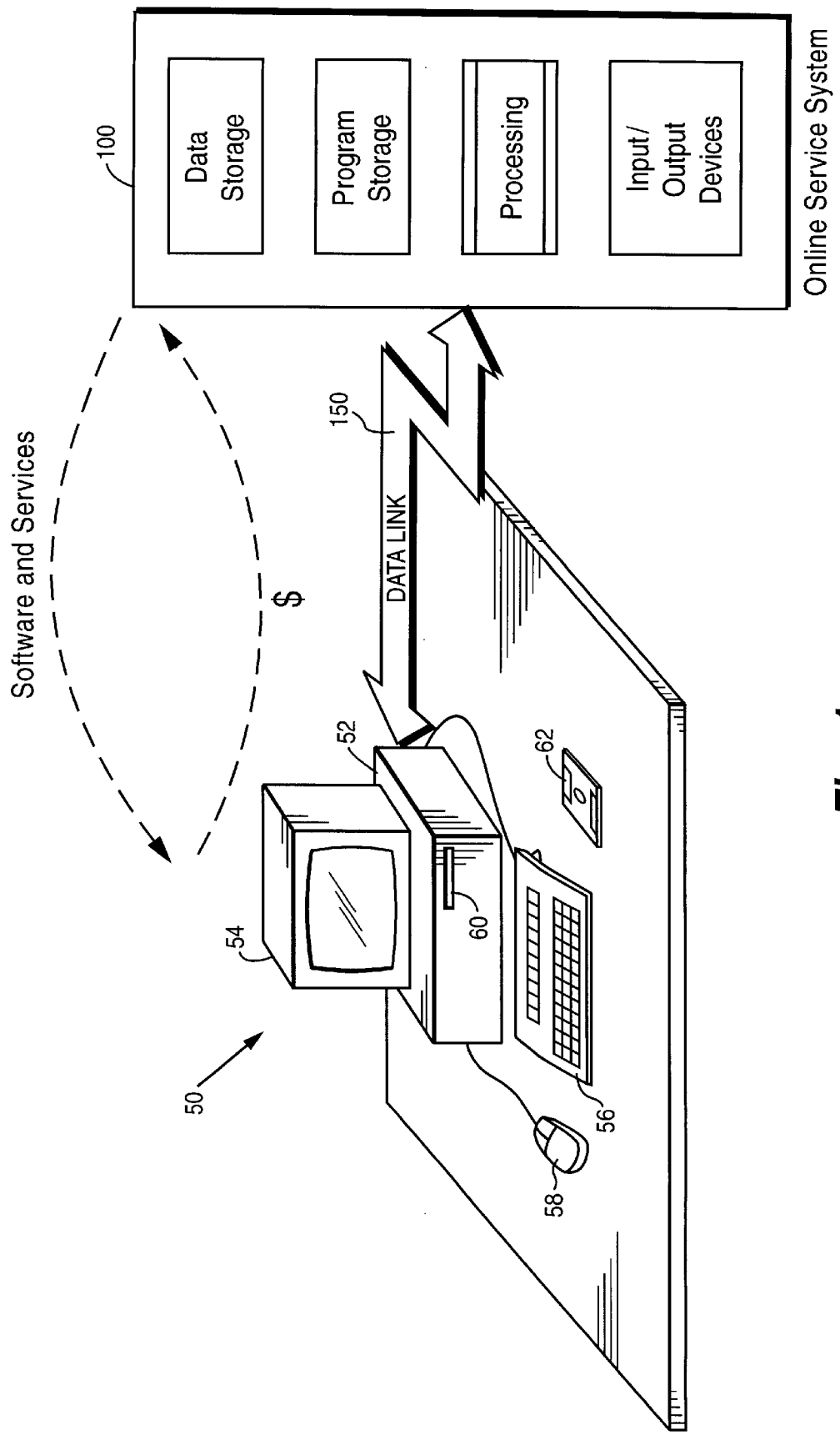
FIG. 1 schematically shows an on-line service system connected to a user's personal computer in accordance with the preferred embodiment of the present invention.

FIG. 1 shows a preferred example of a customer computer 50 accessing an on-line service system 100 in accordance with a presently preferred exemplary embodiment of this invention. Customer computer 50 may for example be a standard personal computer including a main processor unit 52, a display 54, a keyboard 56, and a mouse 58. Main processing unit 52 typically includes a floppy disk slot (drive) 60 that reads floppy diskettes 62. Customer computer 50 performs tasks for a user under software control, and displays the results of the tasks on display 54 (an optional printer can be connected to main processing unit 52 in order to print out the results). New software can be loaded onto customer computer 50 by storing the software on floppy diskette 62 and inserting the floppy diskette into disk slot 60 so that it can be read by the main processor unit 52. The user operates keyboard 56 and mouse 58 to interact with the software tasks performed by computer 50.

Customer computer 50 as described above is a self-contained, stand-alone unit that is capable of performing a wide variety of processing tasks without having to be connected to any other computer equipment. For example, the user can run a word processing program to key in new documents for storage within the main processor unit 52. The user can also perform financial calculations using a spreadsheet program, and store the results of the calculations again within main processor unit 52. Depending upon the software loaded into main processor unit 52, the user may be able to perform a wide variety of additional software tasks such as, for example, video games, check book management, graphics generation program, etc. The variety of different tasks customer computer 50 is capable of performing is determined by the availability of software needed to perform the tasks.

Although customer computer 50 is capable of doing many different tasks all by itself, it has certain limitations. For example, there may be no printer attached to customer computer 50 such that it is not possible to print out hard copy of the results of the processings performed by the customer computer. Even with a printer, it may take a very long time to print out certain results and the user may not want to tie up his printer for such a long time. Similarly, the user may not wish to spend the money to buy various expensive peripheral equipment that could be connected to customer computer 50 (e.g., Fax boards, CD ROM drives, voice boards, multi-media equipment, etc.) but would nevertheless like on occasion to have some of the capabilities associated with this added equipment.

Another serious limitation of customer computer 50 relates to the amount of storage it has. Typically, a so-called "hard disk" within main processor unit 52 is used to store all of the data generated by the customer computer 50 as well as all of the software to be executed by a customer computer. Auxiliary storage capabilities are provided by floppy disk slot 60 and floppy diskettes 62. Unfortunately, the hard disk internal to main processor unit 52 may run out of space to store additional data or programs, or it may fail and lose all of the data it previously stored. The user can "back up" the data stored on the internal hard drive using floppy diskettes 62, but this can be a long and tedious process and the user may sometimes forget to do it. The user could, of course, upgrade his customer computer 50 by adding additional internal or external storage devices, but this would be expensive and might not be cost effective. Nevertheless, the limitations on the storage capabilities of customer computer 50 may be troublesome to the user at times (e.g., if a hard disk failure does occur, of if the user wants to try out a new program but does not have the space on his hard drive to load the new program onto it).

Another limitation of customer computer 50 relates to the variety of different software it can run. Customer computer 50 can only run software that has been loaded onto it. In order to perform a new function or task, the user must obtain floppy diskettes 62 containing a new program from a software store, and then use floppy disk slot 60 to input the new software to main processor unit 52 (e.g., to load the new software onto the internal hard drive within the main processor unit 52). If the new software is a big program, this loading process can take a lot of time. In addition, the loading process may be confusing to the user. Moreover, there is no convenient way to "try out" or temporarily rent or use software with customer computer 50. For this reason, the user of customer computer 50 may only be able to run a relatively small number of programs, and it is difficult to add new programs to that limited repertoire.

Another problem that the user of customer computer 50 commonly confronts is outdated software. Most software companies are constantly improving their offerings. Each time a new version of software becomes available, the user must obtain the software on floppy diskettes and go through the time-consuming and sometimes confusing process of loading the software onto main processor unit 52 via diskettes 62 and floppy disk slot 60. This is especially a problem with certain software that must be updated constantly in order to remain effective. For example, it is a good idea for the user to run virus detection software on customer computer 50 in order to prevent the computer from catching viruses introduced when new software is loaded onto the computer. Because new "strains" of viruses are always being developed, and because virus protection software is typically effective only against those particular strains it has been programmed to recognize, it is essential for the virus protection software to be updated as often as possible so as to be able to detect even the newest strains. This is very inconvenient for the user, since it requires the user to constantly procure updated versions of the virus protection software and load them onto customer computer 50.

II. On-Line Services Give Customer Computer What It Needs

These and other problems and difficulties are eliminated when customer computer 50 connects to an on-line service system 100 provided by the preferred embodiment of the present invention via a data link 150 as shown in FIG. 1. Data link 150 may comprise a dial up telephone line or other similarly convenient telecommunications link that allows customer computer 50 to be located remotely to the on-line service system 100. The on-line service system 100 provides various capabilities (e.g., data storage, program storage, processing, and input/output devices) that enhance the operations of customer computer 50 in order to solve the drawbacks and problems mentioned above. On-line service system 100 provides software and computing services to customer computer 50 in return for fees. Such software and services can be extremely valuable to the user of customer computer 50 in that they provide enhancements to the operation of the customer computer that were available either not at all or only through great expense and/or inconvenience.

Figure 2:
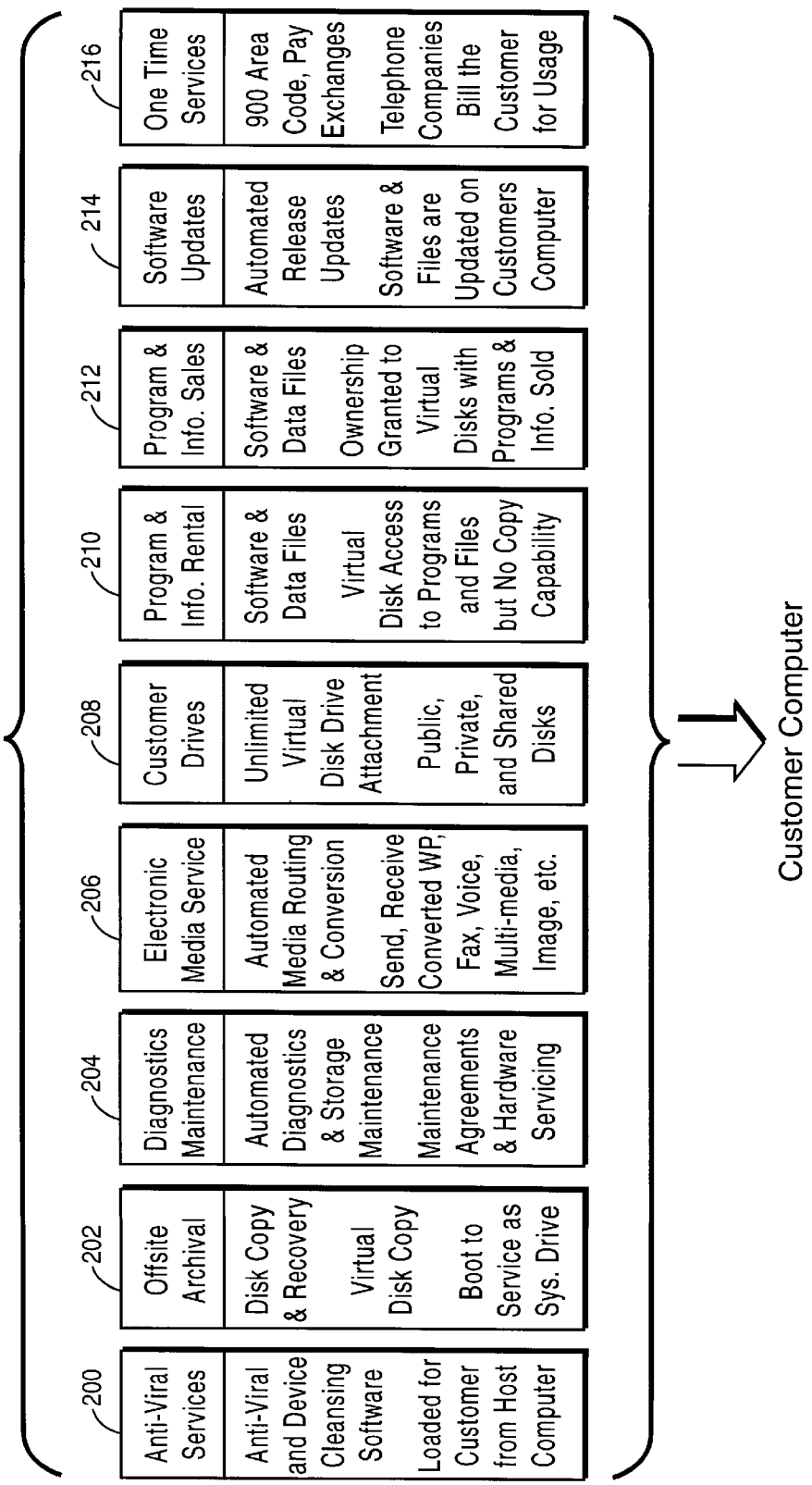
FIG. 2 illustrates various examples of services provided by the preferred on-line service system of FIG. 1.

FIG. 2 is a schematic illustration of some of the various capability enhancements that on-line service system 100 can provide to customer computer 50, including the following:

Anti-Viral Services (block 200) are provided by accessing anti-viral software stored on virtual disk. Anti-viral programs can be copied or executed directly. Anti-viral updates offer customers the latest anti-viral technologies.

Offsite Archival Services (block 202) are performed by accessing virtual disk drives. Customer files inactive for a specified period are automatically copied to on-line service virtual disks for offsite archiving. Many disks of varying size can exist for each customer. Virtual disks are mounted and customer files are copied to their original customer disk for restoration. Virtual disks inactive for a specified period can be copied to on-line service tape for long term offsite archival. A virtual disk can be considered an offsite archival storage area. Every customer file could be stored on virtual disk with directory structures maintained. A diskette 62 can be provided to boot a customer computer and connect to the on-line service and boot a virtual disk copy of the customer computer system disk. An advantage virtual disks provide for offsite archival is that remote storage is accessible as if locally attached.

Diagnostics and Maintenance Services (block 204) include various programs stored on virtual disks to checkout, troubleshoot, and enhance the customer computer 50. Diagnostic programs can detect problems with memory or system board components. Peripheral management programs can be used for testing, alignment, storage maintenance, etc., to improve device throughput. Hardware errors detected by diagnostic programs during a customer automated session can trigger repair service based on a maintenance agreement.

Electronic Media Services (block 206) are designed to facilitate media transport by using an on-line service with virtual disks. Files stored in originating media format (WP, Fax, Image, etc.) can be copied to a customer "routing" virtual disk. A customer computer 50 accessing a virtual disk can convert a file from one media format to another (i.e., Fax to WP, WP to voice, etc.). On-line service peripherals provide further services such as transmitting to a fax unit or distributing a printed report.

Customer Drive Services (block 208) allow customer access to virtual disks under on-line service session control. A customer can have multiple virtual disks mounted at the same time. During the course of an on-line session, a customer can mount and dismount many different virtual disks. Virtual disks can be shared by multiple users or by groups of users. Virtual disks can be made public to all, or secured for single user access.

Program & Information Rental Services (block 210) are provided by offering secured access to host virtual disks with rental programs and data. Access security software protects against unauthorized copying. One time, per use, and/or time charges are assessed for information and program access.

Program & Information Sales Services (block 212) are provided by copying software from a protected virtual disk to a customer's local or virtual disk upon receipt of payment. Demos can be offered by copying software to a temporary customer virtual disk. The temporary disk is deleted if payment is not received within a specified period. Demos common to all customers can be provided by accessing a shared, execute only virtual disk.

Software Update Services (block 214) are provided by attaching to virtual disks and copying files to customer disks. A control program automatically determines the software or data to update. Batch files are typically used to automate the release update process, particularly when changes in configuration definition are required.

"One Time" Services (block 216) describes services for providing undefined users access to on-line services. Charges for a one time customer on-line service access appear on the customer telephone bill. Customer access for one time services is also provided by generic user ID. These generic user JD's are only allowed when the controller's modem is attached to a Telco pay exchange phone number in the preferred embodiment. The one time customer can access most on-line services except offsite archival.

III. Preferred System Architecture

Figure 3:
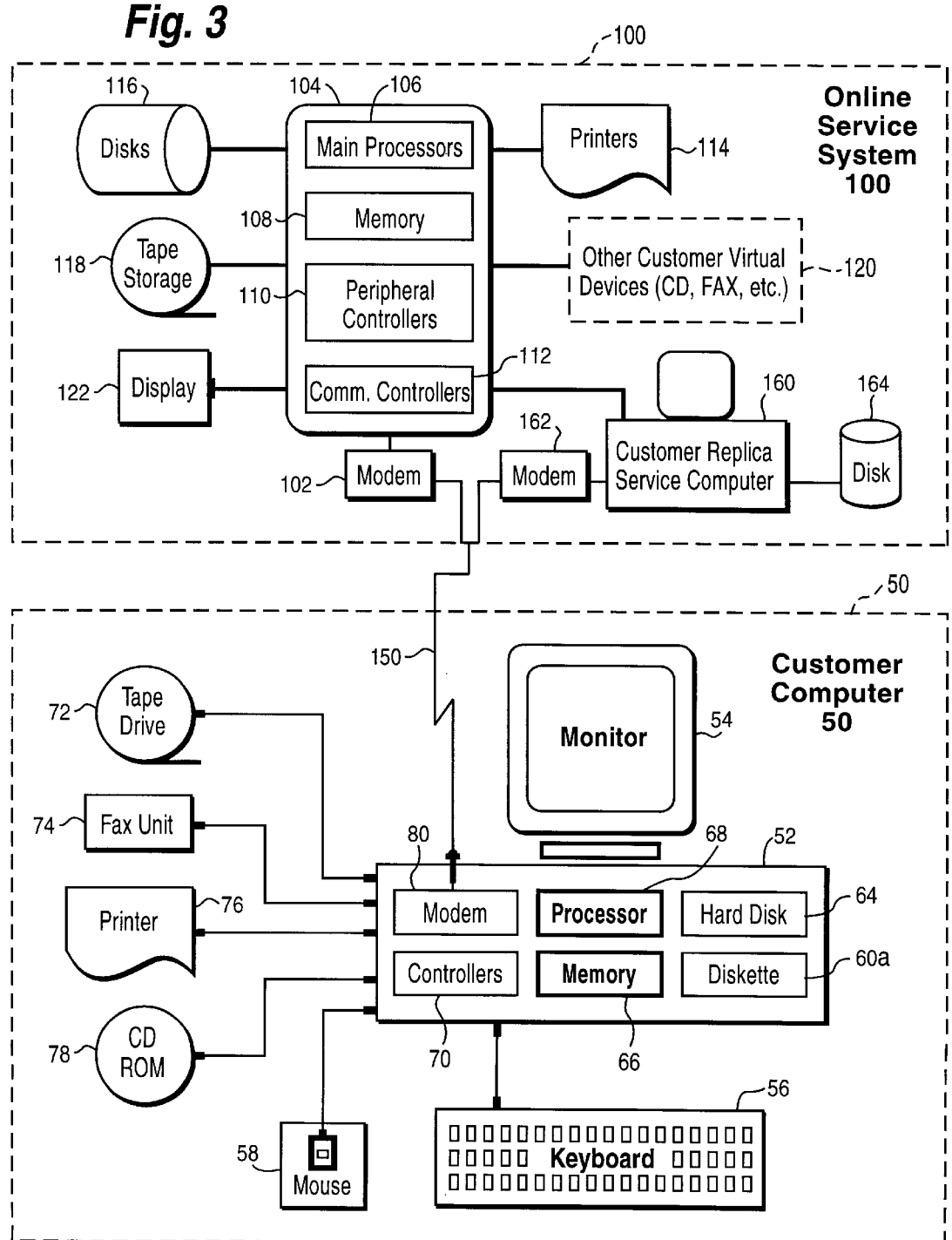
FIG. 3 schematically illustrates the components within the preferred on-line service system and the customer computer.

FIG. 3 is a schematic illustration showing internal components within customer computer 50 and on-line service system 100. As described above, customer computer main processor unit 52 includes a floppy diskette drive 60a having the slot 60 shown in FIG. 1. In addition, the main processor unit 52 includes an internal hard disk 64, internal random access memory 66, a processor 68 and input/output ("I/O") controllers 70. I/O controllers 70 allow communication between the main processor unit 52 and external peripherals such as keyboard 56, mouse 58, and additional optional external peripheral equipment (e.g., a tape drive 72, a Fax unit 74, a printer 76, and/or a CD ROM drive 78) Main processor unit 52 also includes a modem 80. A modem is a conventional device which allows customer computer 50 to communicate over data link 150 with another computer having a similar modem. In the preferred embodiment, on-line service system 100 includes a modem 102 that is connected between data link 150 and a host computer 104.

Host computer 104, which comprises an IBM AS/400 in the preferred embodiment, includes one or more main processors 106, internal random access memory 108, peripheral controllers 110, and communication controllers 112. Peripheral controllers 110 allow main processor 106 to communicate with various peripheral devices such as, for example, one or more high-speed printers 114, one or more mass storage disks 116, and other mass storage devices such as a tape storage device 118. Additional peripheral devices such as CD ROM drives, Fax machines and the like (block 120) may be also be provided and coupled to main processor 106 via the peripheral controller 110. In addition, one or more local display devices 122 may be connected to host computer 104 to allow local control over the host computer. The AS/400 is preferred as host computer 104 in the preferred embodiment due to its flexibility in terms of providing a multiprocessor system with object based security, workstation emulation, and virtual device access. However, other types of computers providing the required functionality could be used instead.

Figure 4:
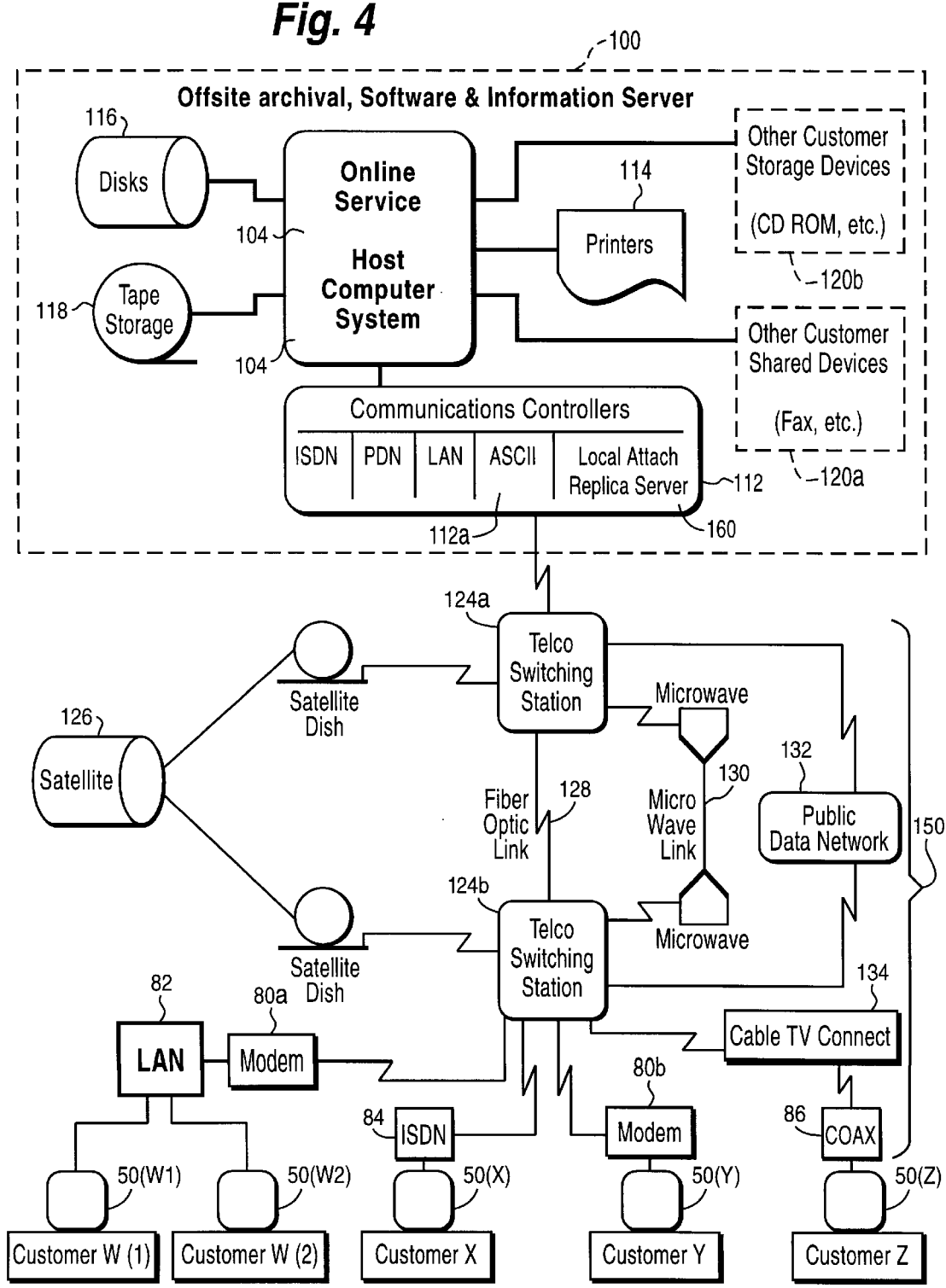
FIG. 4 is a detailed schematic diagram showing various different arrangements for connecting the on-line service system to customer computers.

FIG. 4 represents some common communication links 150 available to on-line service customers. A host computer 104 is shown with various attached peripherals including disk 116, tape 118, and printers 114. Communications Controllers 112 attached to the host computer 104 include digital (ISDN), Public Data Network (X.25), LAN Attachment Card, ASCII controller 112a, and customer replica computer 160 running host workstation emulation software. Each controller 112 is connected (with or without modem 102) to a telecommunication relay station 124a. Data may be transmitted between two switching stations 124a, 124b by several means including satellite 126, fiber optic link 128, microwave link 130, Public Data Network 132, or cable TV link 134.

For example, Customer computer 50(W) accesses system 100 via LAN attachment card 82 connect or remote session gateway connect (not shown). Customer computer 50(X) connects to the host with an ISDN digital link 84. Customer computer 50(Y) uses a modem 80b to connect to the host computer ASCII workstation controller 112a or the replica server computer 160. Customer computer 50(Z) connects to the on-line service using a coax cable connection 86.

FIG. 4 shows that data link 150 may comprise up to three different "layers" of connection: the first layer or sub-link connects host computer 104 to switching station 124a; the second "layer" connects switching station 124a to switching station 124b; and the third "layer" connects switching station 124b to a customer computer 50. A customer may connect the on-line service system 100 by many different methods. These methods may evolve as advances in telecommunications become available. For example, each of the various layers may comprise any of ISDN link, LAN/WAN connect, a "front end controller," another computer, a telephone company connection, a direct connection, a fiber optic link, a cable television link, cellular link, a satellite link, a radio frequency link and/or a PDN connection. The three layers can also comprise varying cable mediums and software bridges, gateways, routers and/or emulations.

On-line service system 100 also includes at least one (and typically many) "replica computer" 160. Replica computer 160 is connected to host computer 104 via communication controllers 112, and is also capable of connecting directly to customer computer 50 via a modem 162. Replica computer 160 is the same type of computer as is customer computer 50 and thus may be used to perform the same types of processing that customer computer 50 is capable of performing. This replica computer 160 adds processing capabilities to host computer 104 (which may be a different type of computer not capable of executing the same software that customer computer 50 is capable of executing).

In the preferred embodiment, replica computer 160 is capable of operating in an on-line mode or in an off-line mode. In the on-line mode, the replica computer 160 communicates interactively with customer computer 50 to perform processing tasks. In this on-line mode in the preferred embodiment, the customer computer 50 and the on-line replica computer 160 cooperate to support processing in either and/or both processors (shared access to data buffers and a record locking scheme is used to ensure safe access). In the off-line mode, replica computer 160 performs personal computer tasks in response to direction from host computer 104 without having an on-line, interactive link with customer computer 50.

In the preferred embodiment, the replica computer(s) 160 is locally attached to host computer 104 using workstation emulation hardware/software (e.g., a 5250 emulation card for connection to an AS/400 host computer). The replica computer 160 connects to the customer computer 50 with personal computer communications software using modems connected to communications ports COM1 on each of the computers.

The on-line replica computer 160 is used to facilitate customer access to host computer virtual disks by seamlessly integrating a replica of the customer computer into the communications link 150. The replica computer 160 loads device drivers and runs communications software to establish a host session and access host virtual disks. "Dual redirection" of drives provides the replica computer 160 with access to drives of customer computer 50, and also provides customer access to replica drives (including, for example, host virtual disks). The presently preferred exemplary embodiment of this invention provides a disk sharing utility between replica computer 160 and customer computer 50. In this unique arrangement, the local hard drive 164 of the replica computer 160 can be "attached" to customer computer 50, and the customer computer local hard drive 64 can be "attached" to the replica computer 160. This allows the replica computer 160 to write to and read from the customer computer local hard drive 64 and also allows the customer computer 50 to write to and read from the replica computer local hard drive 164. Combined with controlled redirection of keyboard, mouse, video and printing, execution during a replica computer 160 on-line session can occur in the customer computer 50 or replica computer with user transparency.

The off-line replica computer 160 performs tasks on behalf of the customer without a customer connection. Batch requests including parameters and script file data are stored in a Replica Request file (maintained by host computer 104 in the preferred embodiment) with a date/time to execute. The Off-line Replica computer 160 accesses the host computer with special authorities to certain customer virtual disks. The Off-line Replica computer 160 reads Replica Request data and when the time condition is met, the request is processed as if it were performed by the customer.

IV. "Virtual" Disks

In the preferred embodiment, host computer 104 may provide one or more "virtual" disk drives to customer computer 50. In addition, in the preferred embodiment on-line replica computer 160 may provide one or more "virtual" disk drives to customer computer 50, and the customer computer may provide one or more "virtual" disk drives to the on-line replica computer. In the context of this patent specification, a "virtual device" is an arrangement that "simulates" or "emulates" a locally-attached, physical device. For example, a "virtual disk drive" can be an arrangement (e.g., some combination of local and/or remote hardware and/or software) that "looks like" a physical disk drive. In the preferred embodiment, "virtual disk drives" allow the customer computer 50 to access resources as if those resources were actually a physical disk device locally attached to the customer computer. Since the customer computer 50 and its associated operating system and application software is already conditioned to efficiently access locally attached physical disk drives, the customer computer 50 can very easily access the "virtual disk drives" without any change in operating system or application software or additional overhead (other than software needed to support the virtual disk drive). Since the "resources" that emulate the locally attached physical drive to create the "virtual disk" can comprise, in part, a data link 150 and resources remotely located to the customer computer 50, virtual disks can provide great flexibility in allowing customer computer 50 to very efficiently access remotely located computer storage. Since in the preferred embodiment, the host computer 104 and/or replica computer 160 controls this remote storage, "virtual disks" provide an efficient means to allow the customer computer 50 to have access to particular data in a manner chosen by the operators of system 100.

One example of a "virtual disk drive" provided by the preferred embodiment is a "virtual disk drive" that host computer 104 attaches to customer computer 50. Although host computer 104 may have several physical disk drives 116, those drives typically are not directly accessible by the operating system of customer computer 50, and in any event are remote to the customer computer and hence cannot be directly accessed by the customer computer as one of its local drives. Host-provided "virtual disks" are actually "objects" (e.g., files or some other data structure) stored by host computer 104. These objects may be physically stored on host disk 116 and/or host random access memory 108. Through software executed by host computer 104 and cooperating software executing on customer computer 50 and/or replica computer 160, these virtual disks can be "attached" to customer computer 50 and/or replica computer 160, and appear to those computers 50, 160 as additional, locally attached physical drives. In other words, the operating systems of computers 50, 160 can access these virtual disks in the same way they access a locally attached physical disk drive. Thus, customer computer 50 operating system can write to and read from a virtual disk in essentially the same manner that it can write to and read from its own local hard disk 64. In addition, the host computer 104 can supply commands and/or programs on the virtual disk for execution by the customer computer 50 in order to provide remote control features. For example, control programs stored on host computer 104 read-only virtual disks can be used to set "processor flags" on the customer computer 50 and the replica computer 160. Other control parameters on the customer or replica computers are similarly changed by control programs stored on host virtual disks. These programs are typically called by a command issued by host computer 104 used to execute personal computer commands in the attached personal computer (replica computer 160 or customer computer 50).

Host computer 104 can create a "virtual disk" from memory resources, disk resources or typically, both memory and disk resources. Information written by customer computer 50 to a host computer "virtual disk" is typically temporarily stored within host computer memory 108, and is eventually more permanently stored on host physical disk ("DASD") 116 for later retrieval by the host, the customer computer that stored the information, or some other customer computer. The operator of system 100 can, of course, store information onto host virtual disks (e.g., by inputting the information via a replica computer 160) so that the information can be accessed by customer computer(s) 50. Communications software and device driver programs executing on customer computer 50 cooperating with communications and other software executing on host computer 104 make it possible for the customer computer to access these host computer memory and disk resources as if they were a physical, locally attached disk device. Although the host computer 104 can also manipulate and process data objects stored on such "virtual disks," it typically cannot execute an executable PC file stored on the virtual disk because in the preferred embodiment the host computer has a different operating system than does customer computer 50A.

Host computer 104 provides "virtual disk drives" to customer computer 50 and replica computer(s) 160 in the preferred embodiment through use of conventional software available from IBM. In the preferred embodiment, host computer 104 comprises an IBM AS/400 mid-range computer providing "PC Support" virtual disk, print and other associated functions. As explained above, the IBM-provided PC Support Software makes it easy to attach a "virtual disk" or virtual printer to a remote or local personal computer such as customer computer 50. For DOS machines, "PC Support" requires that certain device drivers (EIMPCS.SYS and ECYDDX.SYS) are resident in the memory of the customer computer 50 or replica computer 160 to provide memory management and PC to AS/400 routing support (of course, this technique can be used with other operating systems such as OS/2, Unix, etc. using appropriate virtual device and workstation software). These device drivers are loaded from the PC CONFIG. SYS file during the PC IPL process. Other programs are loaded during host session initiation to provide workstation and virtual device access. Different "shared folder" types (0, 1 and 2) provide different performance based on different overhead requirements (e.g., personal computer memory usage). The AS/400 allows a personal computer to attach to a "shared folder" as a "Folder Drive" this allows the PC user to assign a drive letter to a specific folder, or as a "System Drive" (this allows the PC user to assign a drive letter to all the folders the user is authorized to access). Using this method, the DOS Change Director (CD) command can be used to change from one virtual disk drive to another, and normal operating system commands can be used to access and manipulate the virtual disks.

The preferred embodiment of the present invention also makes "virtual disk drives" available to customer computer 50 in the context of an on-line session between a customer computer 50 and an on-line replica computer 160A. In the preferred embodiment, for example, a customer computer 50 can access a disk drive that is locally attached to on-line replica computer 160, and the on-line replica computer can access a disk drive that is locally attached to the customer computer. In the preferred embodiment, the resources that form the basis of the virtual disk may comprise a physical disk drive locally attached to one of the computers (e.g., the hard drive 64 of customer computer 50), or it may comprise a "virtual drive" (e.g., RAM disk, host-provided virtual disk, etc.).

In the preferred embodiment, these drives are shared between two computers (e.g., customer computer 50 and replica computer 160) so as to allow each computer to seamlessly access the disk drive(s) of the other computer. For example, assume that customer computer 50 has designated its local floppy diskette drive 60 as its "A" drive, and has designated its local hard disk 64 as its "C" drive. The user of customer computer 50 has become accustomed to these designations, and it would be very confusing to change them for when the customer computer connects to on-line replica computer 160. Nevertheless, it would be useful to allow the customer computer 50 to access some or all of the disk drives (physical and/or virtual) of replica computer 160 during an on-line session as if those replica computer disk drives were local to the customer computer. In the preferred embodiment, the normal disk drive mapping of the customer computer 50 is not disturbed (i.e., "A" remains the local floppy diskette drive 60, and "C" remains the local hard disk 64). Instead, the disk drives of the replica computer 160 are "attached" to the customer computer 50 as "virtual disk drives," and are given designations by the customer computer that do not conflict with the designations reserved for customer computer local drives (e.g., the floppy diskette drive of the replica computer might be designated "D," and the replica computer hard drive might be designated "E"). Each of the customer computer 50 and the replica computer 160 is able to access execution resources (i.e., processor) and drive resources (i.e., shared virtual disk(s)) made available by the other computer.

Where a particular command is executed depends on the state of a "processor flag" stored on the computer from which the command originated. Thus, commands inputted at the customer computer keyboard 56 will be executed by the customer computer processor 68 if the "processor flag" at (i.e., maintained by) the customer computer is set to "customer computer". On the other hand, commands inputted at the customer computer keyboard 56 will be executed by the replica computer 160 processor if the "processor flag" at the customer computer 50 is set to "replica computer". Similarly, commands inputted at the replica computer 160 keyboard (or passed to the replica computer by host 104 for execution via a "PC Execution" command for example) will be executed by the replica computer processor 68 if the "processor flag" at the replica computer is set to "replica computer"; and such commands will be executed by the customer computer 50 if the "processor flag" at the replica computer is set to "customer computer."

In the preferred embodiment, the states of the customer computer and replica computer "processor flags" are initially determined by a default value (e.g., stored in a non-volatile table from the last session and/or as part of a default configuration). The "processor flag" can be dynamically changed by executing a program from a read only virtual disk provided by the host computer 104 (this allows the host computer to override a previously established processor flag state to ensure that a subsequent command is executed in a desired one of the customer and replica processors). The "processor flag" may also be changed when the user of customer computer 50 (or replica computer 160) changes his "command prompt."

In DOS for personal computers, each "command line" is preceded by a "command prompt" specifying one of plural drives to be accessed by the personal computer. When a DOS operating system command is inputted on the command line, the drive specified by the command prompt is accessed first to locate an executable file that meets the description of the inputted command (in the absence of a "PATH" command, this is the only drive that will be looked to). The user can change the default drive by simply typing the designation of the drive to which the default drive is to be changed. For example, if the command prompt "C>" is displayed, the user can change the default drive from the "C" drive (e.g., the local hard drive) to an "E" drive (e.g., a virtual disk supplied by the replica computer) by simply typing "E:" and pressing the ENTER key.

The preferred embodiment uses this specified prompt to optionally change the "processor flag" to the one of customer computer 50 and replica computer 160 corresponding to the newly selected default drive designator. Thus, for example, a customer computer 50 user can deselect local processing and instead select processing by the processor of replica computer 160 by simply changing his command prompt in the preferred embodiment from a local drive (e.g., "C>") to a virtual drive (e.g., "E>"). Similarly, for example, a customer computer 50 user can deselect replica processing and instead select local processing by the processor 68 of customer computer 50 by simply changing his command prompt in the preferred embodiment from a virtual drive (e.g., "E>") to a local drive (e.g., "C>").

The preferred embodiment also uses a technique called "drive translation" to automatically translate drive designators. Typically, commands inputted by a user of customer computer 50 will specify one or more drive designators (e.g., "COPY A:*.* C:" commands the computer to copy all files within a particular portion of a drive called "A" to a particular portion of another drive called "C"). Because any command can execute on either the customer computer 50 or the replica computer 160 in the preferred embodiment, an ambiguity exists since the same physical drive assignments may exist at each computer (e.g., the customer computer and the replica computer may each have their local floppy diskette drive assigned as "A" and their local hard drive assigned as "C"). Drive translation provides the ability to dynamically reassign a local drive designator. For example, with drive translation off, if the user of customer computer 50 issues the command "COPY A:*.* C:" (for example) with the processor flag set to "customer computer", this will have the effect of copying information from the customer computer ("A") local floppy diskette drive 60 to the customer computer ("C") local hard drive 64. On the other hand, if the user of customer computer 50 issues the command "COPY A:*.* C:" with drive translation on, the command is translated into a new command in which the drive designators "A" and "C" are replaced with different values, e.g., "D" and "F", specified by a mapping (e.g., stored in a "drive translation table" for each processor flag in the customer computer). This mapping typically maps local customer drive designators into "equivalent" virtual drive designators accessed by the replica computer 160 (e.g., the customer computer floppy drive designator maps into the drive designator the replica computer uses to access the customer floppy drive as a virtual drive). Drive translation is performed in the preferred embodiment on the computer that originates the commands, and not on the computer which receives the commands remotely (host "PC Execution" commands are considered local to the replica computer). This feature of automatically translating drive designators based on certain default machine selections facilitates a user's ability to conveniently and easily access desired drives of a "virtual machine" without unduly interfering with the user's ability to access the drives associated with his customer computer 50 "physical machine."

In the preferred embodiment, the drive translation tables maintained by customer computer 50 and replica computer 160 for commands executed remotely are oppositely symmetrical. That is, the drive translation table entry for customer computer 50 remote processing is the (reversed) mirror image of the drive translation table entry for the replica computer 160 remote processing. Thus, in the preferred embodiment, when each of customer computer 50 and replica computer 160 assigns ("appends") drive designators to virtual drives provided by the other computer, it (the assigning computer) sends a list of its assignments to the other computer—and vice versa. As an example, if the customer computer 50 drive translation table entry for remote processing is set as:

A→J
B→K
C→L
X→A
Y→B
Z→C then the replica computer 160 drive translation table entry for remote processing may be set as:

J→A
K→B
L→C
A→X
B→Y
C→Z.

Using these drive translation tables, when a command "COPY A:*.* C:" is issued by the customer computer 50 with the processor flag set to "customer computer" and with drive translation off, the command is executed by copying from the customer's local floppy diskette drive ("A") to the customer's hard drive ("C"). When the same command is issued by the customer computer 50 with drive translation on, it is translated into "COPY J:*.* L:". If this translated command is executed by the replica computer 160 (which accesses the customer's floppy diskette drive and customer's hard drive as virtual drives "J" and "L"), it will copy from the customer's local floppy diskette drive ("A") to the customer's hard drive ("C")—thus achieving the same result without the user of customer computer 50 having to know or use the drive designators that the replica computer must use in order to access the customer computer drives as virtual drives.

Figure 5:
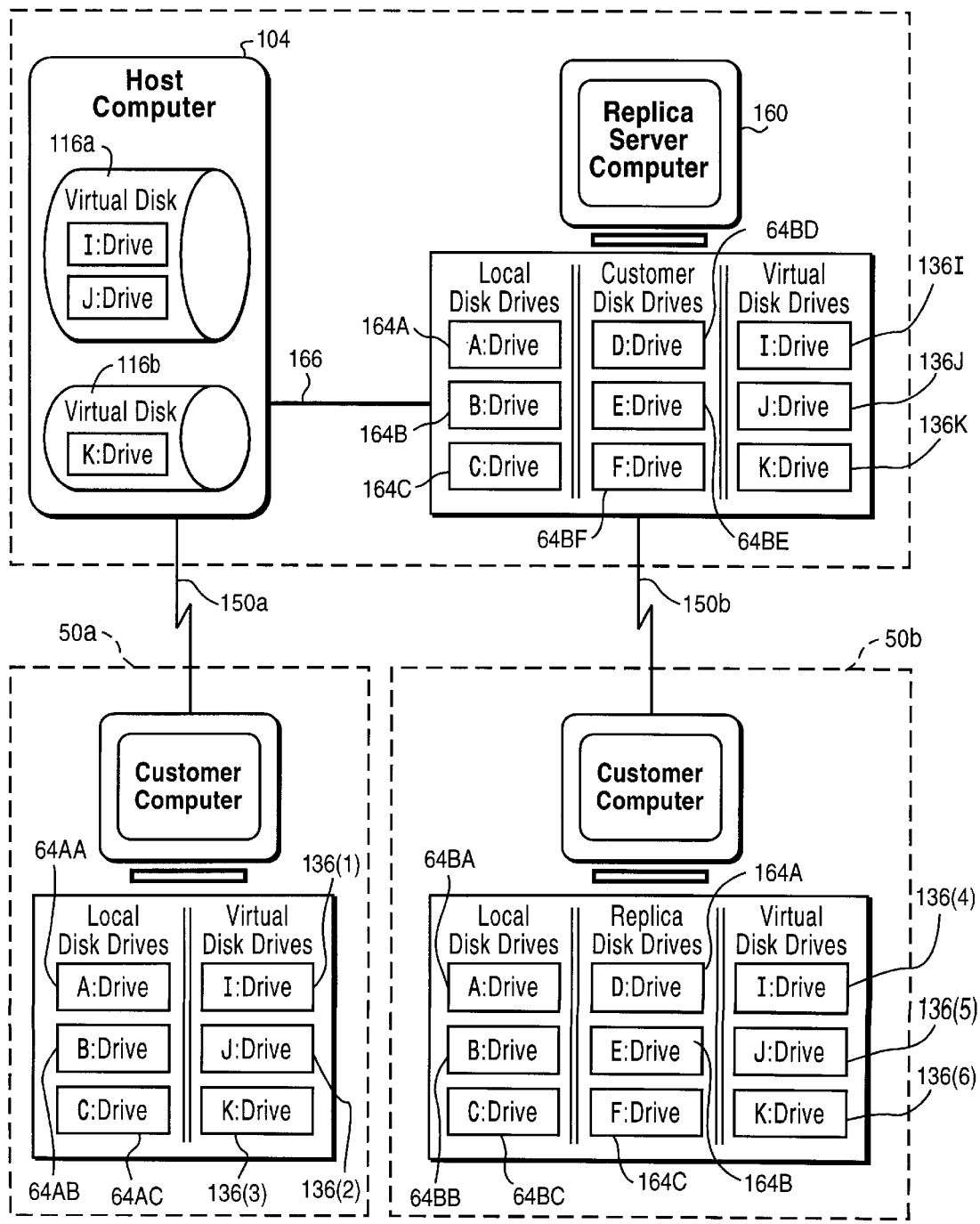
FIG. 5 is a schematic diagram showing one example of remote disk drive sharing in the preferred embodiment.

FIG. 5 provides an overview of an example of the virtual disk drive attachment capabilities of the on-line service system 100. Two physical disk drives 116a, 116b are shown connected to the host computer 104. The host computer 104 is shown as a customer disk repository with host system disks 116a, 116b logically divided into customer virtual disks. Host computer physical disk drive 116a stores information associated with two different virtual disks (I:Drive and J:Drive), and host computer physical disk drive 116b stores information associated with a further virtual disk (K:Drive). The host computer 104 is shown with a communication link to the replica server computer 160 and a customer computer 50*a*. Two columns of drives shown within customer computer 50*a* identify the devices addressable by the customer processor. The first column, "Local Disk Drives," identifies the physical drives 64AA–64AC physically attached to the customer computer 50*a*. The second column, "Virtual Disk Drives," identifies the disk drives 136(1)–136(3) created from logically divided host storage (this may be the same or different storage is used to create virtual disk drives 136I–136K).

Three columns of drives shown within the replica computer 160 identify the devices addressable by the replica computer. The first column, "Local Disk Drives," identifies the drives 164A–164C physically attached to the replica computer (A:Drive, B:Drive, C:Drive). The second column, "Customer Disk Drives," identifies the disk drives 64BD–64BF physically attached to the customer computer 50 that have been redirected to the replica computer 160 as remote virtual disks (D:Drive, E:Drive, F:Drive) (these may be the customer computer A:Drive 64BA, B:Drive 64BB, C:Drive 64BC). The third column, "Virtual Disk Drives," identifies disk drives 136I–136K created from logically divided storage of host computer 104. Disk drives 136I, 136J and 136K can be redirected to the customer computer 50 as remote virtual disks (I:DRIVE 136(4), J:DRIVE 136(5), K:DRIVE 136(6)). Although each column shows three drives, this is not meant to limit the number of attachable devices. The replica computer 160 is shown with a communication link 166 to the host computer and another communication link 150*b* to a customer computer.

Note that both the customer computer 50*b* and the replica computer 160 each access their local, physical disk drives as "A," "B" and "C." However, in the preferred embodiment the customer computer 50*b* accesses the replica computer 160's local drives as "D," "E" and "F," whereas the replica computer 160 accesses the customer computer 50*b*'s local drives as "D," "E" and "F." This ability to "redirect" drives and "append" them to the nominal "drive list" of each computer provides a seamless, transparent interface to the virtual drives of the other computer without interfering with accessing local, physically attached disk drives in the same manner that they are normally accessed. Since all drives for both systems are directly available to both systems and local drives for both systems are already assigned (and it is undesirable to change the drive designators on local drives because they are already well known), each system has different drive designators (A: B: C:) to represent the same physical device. When a command is identified as originating from the customer and the processor flag is set to "replica computer" and customer command line translation is "yes," drive references on the command line are translated to their equivalent in the replica, i.e., a command at prompt C: of "copy A: B:" is same as (with command line translation) a command at prompt E: of "copy D:. E:".

Each computer needs to identify where commands actually originated, and also needs to keep track of where commands are supposed to execute. A "processor flag" maintained by each of customer computer 50 and replica computer 160 is used to keep track of where commands are supposed to execute. The processor flag can optionally be set to replica or customer each time the default drive prompt is changed by the operating system. Thus, commands inputted by a user at the customer computer 50 when the customer's drive designator is set to a customer drive will execute in customer processor. Commands inputted by a user at the customer computer 50 when the customer's drive designator is set to a replica drive will execute in replica processor. The processor flag ultimately determines where a command will execute. If a user at the customer PC keys commands while the drive designator is set to customer drive, the commands will execute in the customer processor if the processor flag is set to customer. Similarly, when a user at the replica PC keys commands while set to customer drive, the commands execute in the customer processor if the processor flag is set to customer. When a user at the replica PC keys commands while set to replica drive, the commands execute in the replica processor if the processor flag is set to "replica computer."

V. On-line and Off-line Task Handling

Figure 6A:
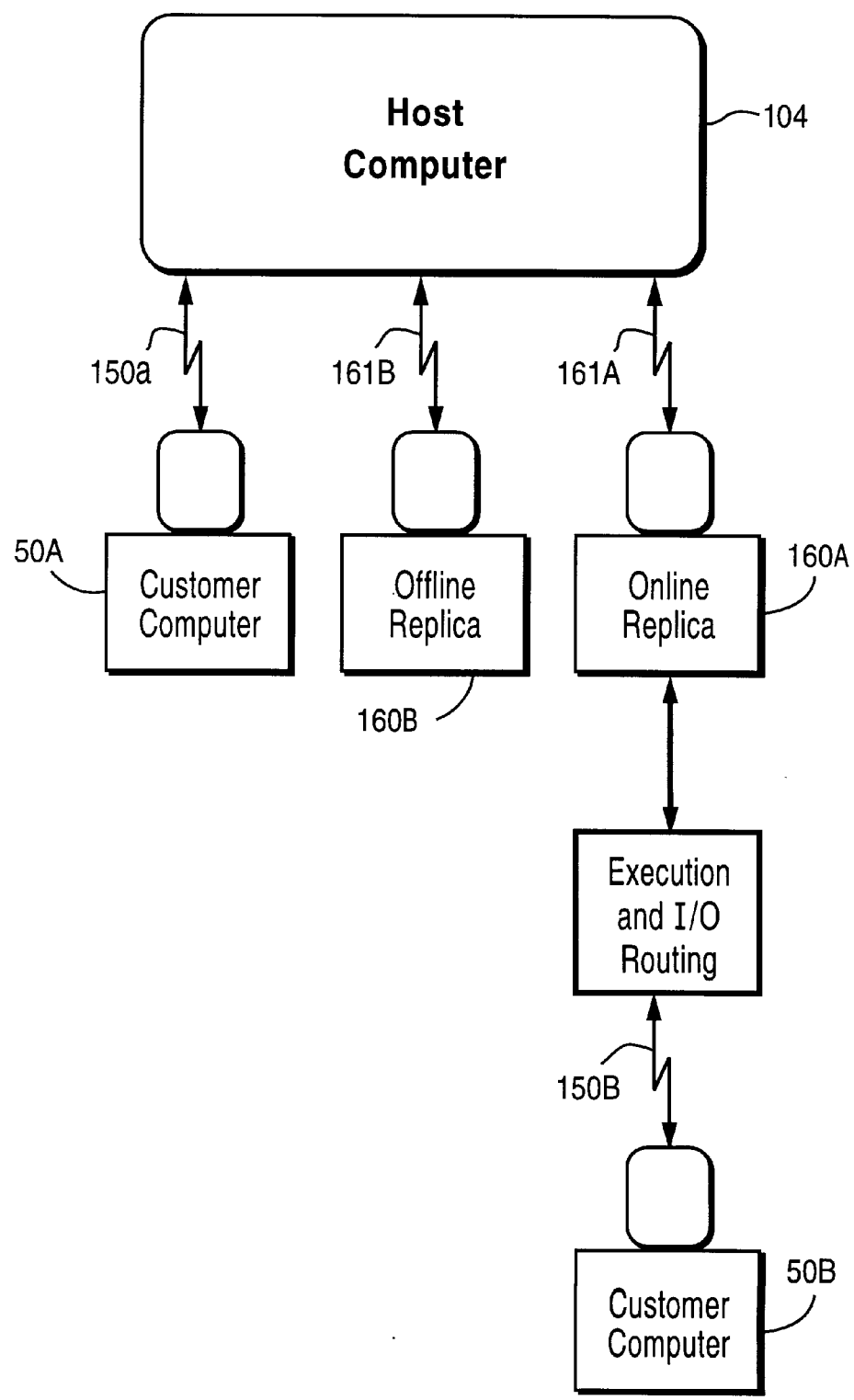
FIG. 6A schematically illustrates overall functional connections provided by the preferred embodiment on-line computer system to make virtual devices available to the customer computer and other system components.

FIG. 6A schematically shows some of the various connections provided by the preferred embodiment to attach virtual devices such as disks. In FIG. 6A, customer computer 50A is shown connected to host computer 104 with an on-line connection via data link 150*a*. Through this on-line connection and appropriate software executing on both customer computer 50A and host computer 104, a "virtual disk" made available by the host computer is "attached" to the customer computer. The customer computer 50A can read from and write to this "virtual disk" as if it were a physical disk locally attached to the customer computer. When the on-line connection between customer computer 50A and host computer 104 terminates, the information stored on the "virtual disk" continues to reside in the storage of host computer 104. This information can be made available to the same or different customer computer 50A (or to a replica computer 160A, 160B) by reattaching the "virtual disk" to that computer.

FIG. 6A also shows an on-line replica computer 160A connected to host computer 104 via a local data link 161A (e.g., a coaxial "twinax" line or twisted pair cable). As explained above, on-line replica computer 160A can (and preferably does) have its own local hard disk(s), memory, and peripheral devices. In addition, on-line replica computer 160A and an on-line customer computer 50 in the preferred embodiment runs "workstation emulation" and "PC Support" software that allows it to attach locally to, and communicate with, host computer 104. The workstation session control program is specified as the sign-on program in the customer user profile on the AS/400. The profile is configured to sign-off the workstation when the control program ends. This program displays menu options and allows certain command input. Customer commands and menu requests are received and validated. Upon validation, commands and programs are executed by calls to system programs such as QUSCMDLN or QCMDEXC. These commands may include commands to cause execution in the personal computer processor. This PC execution may include running a secondary command processor (Command.Com) to provide the customer or replica computer user with a personal computer command prompt. This secondary command processor is ended with control returned to the caller when "Exit" is keyed. On-line replica computer 160A can attach to virtual disks made available by host computer 104 so that it can read from and write to the virtual disks. Replica computer 160A can also access other virtual devices (e.g., printers, etc.) made available to it by host computer 104.

As shown in FIG. 6A, a customer computer 50B can have an on-line connection (via data link 150*b*) with on-line replica 160A. Through this on-line connection, on-line replica computer 160A can "attach" some or all of its resources (including those made available to the replica computer by host computer 104) to customer computer 50B. For example, on-line replica computer 160A can remotely attach some or all of its own local disk drives to customer computer 50B. On-line replica computer 160A can also remotely attach to customer computer 50B some or all of its virtual disk drives (e.g., RAM disks and/or virtual disks made available by host computer 104). In addition, on-line replica computer 160A can remotely attach to and access the local drives of customer computer 50B as virtual disk drives. As explained above, the way drives are remotely attached and shared between customer computer 50B and on-line replica computer 160A provides a seamless interface allowing a user of either computer to easily access the information stored by the other computer without having to perform file transfers or other complicated processes.

FIG. 6A also shows an off-line replica computer 160B connected to host computer 104 via a local data link 161B (e.g., a coaxial "twinax" line or twisted pair cable). In the preferred embodiment, off-line replica computer 160B runs appropriate software that cooperates with the software running on host computer 104 to allow the off-line replica computer to access host virtual devices such as disk drives and the like.

Off-line replica computer 160B performs processing requests made by host computer 104 (e.g., in response to service requests made by customer computers 50A, 50B) without requiring an on-line connection with a customer computer. The results of the processing by off-line replica computer 160B are reported back to host computer 104, which may then "signal" the appropriate customer computer 50 in order to report the results.

Figure 6B:
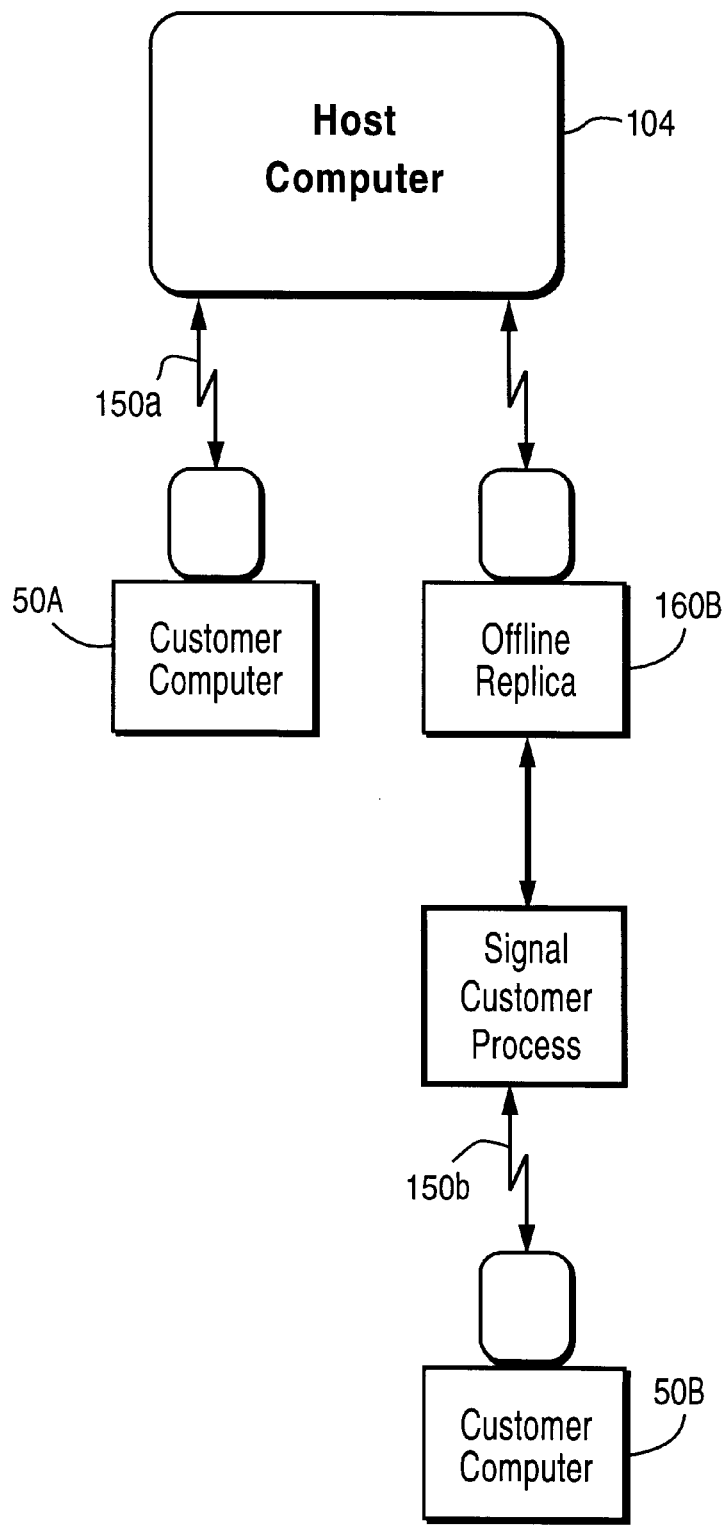
FIG. 6B schematically illustrates overall functional connections provided by the preferred embodiment on-line computer system to process customer computer signalling.

FIG. 6B schematically shows the "signal customer processing" performed by system 100. In the preferred embodiment, system 100 sometimes needs to report completed results of "off-line" processing requests to a customer computer 50. In addition, system 100 occasionally has a need to automatically establish contact with a customer computer 50 (e.g., to perform a regularly scheduled backup or software update operation). Also, system 100 may have messages or information from other users (e.g., electronic mail) that it needs to deliver to a customer computer 50. Instead of waiting until the user of customer computer 50 decides to initiate an on-line session with system 100, in the preferred embodiment system 100 is able to initiate a contact with a customer computer it needs to contact. In the preferred embodiment, system 100 initiates such a communication by "signalling" the specified customer computer 50. This signalling can be a request for the customer computer 50 to call system 100, or the signalling itself can provide the transfer of information that is needed (e.g., system 100 can "signal" a customer computer 50 with a "completion message" indicating that a particular processing task has been completed). As shown in FIG. 6B, such "signalling" can occur through a "signalling" connection between customer computer 50A and host computer 104, or it can occur via a "signalling" connection between a customer computer 50B and a replica computer 160. In the preferred embodiment, such "signalling" connections are not true "on-line" connections because there is no ability for the user of customer computer 50 to interact with system 100. Rather, for security and other reasons, a true on-line connection (which may occur automatically in response to the signalling contact from the host) is established subsequently to the signaling connection and is initiated by the customer computer 50. Preferably requiring on-line connections to be initiated by customer computer 50 in the preferred embodiment increases security and also may make the customer feel better about security (since typically a great deal of very sensitive data may be stored on the customer computer).

Figure 6C:
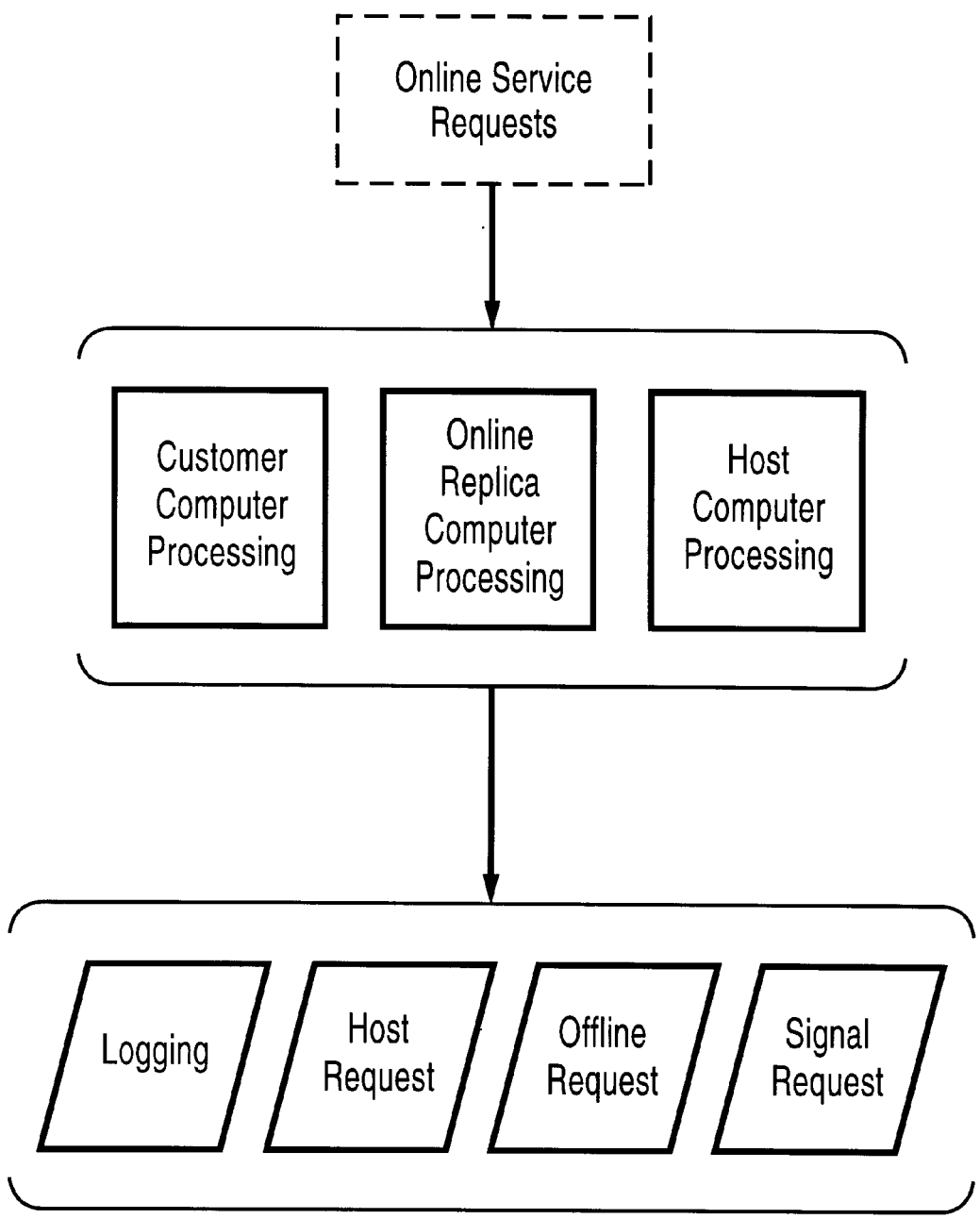
FIG. 6C schematically illustrates, on a high level, the basic way in which the preferred on-line computer system handles on-line service requests.

FIG. 6C schematically shows, in generic terms, the different functions performed by system 100 associated with on-line service requests. As shown in FIG. 6C, an on-line service request can be performed by customer computer 50, on-line replica computer 160, or host computer 104. The results of such on-line service processing may comprise any one of the following:

logging;

generation of a host computer request;

generation of an off-line request for handling by off-line replica computer 160; and/or generation of a signal request.

Figure 6D:
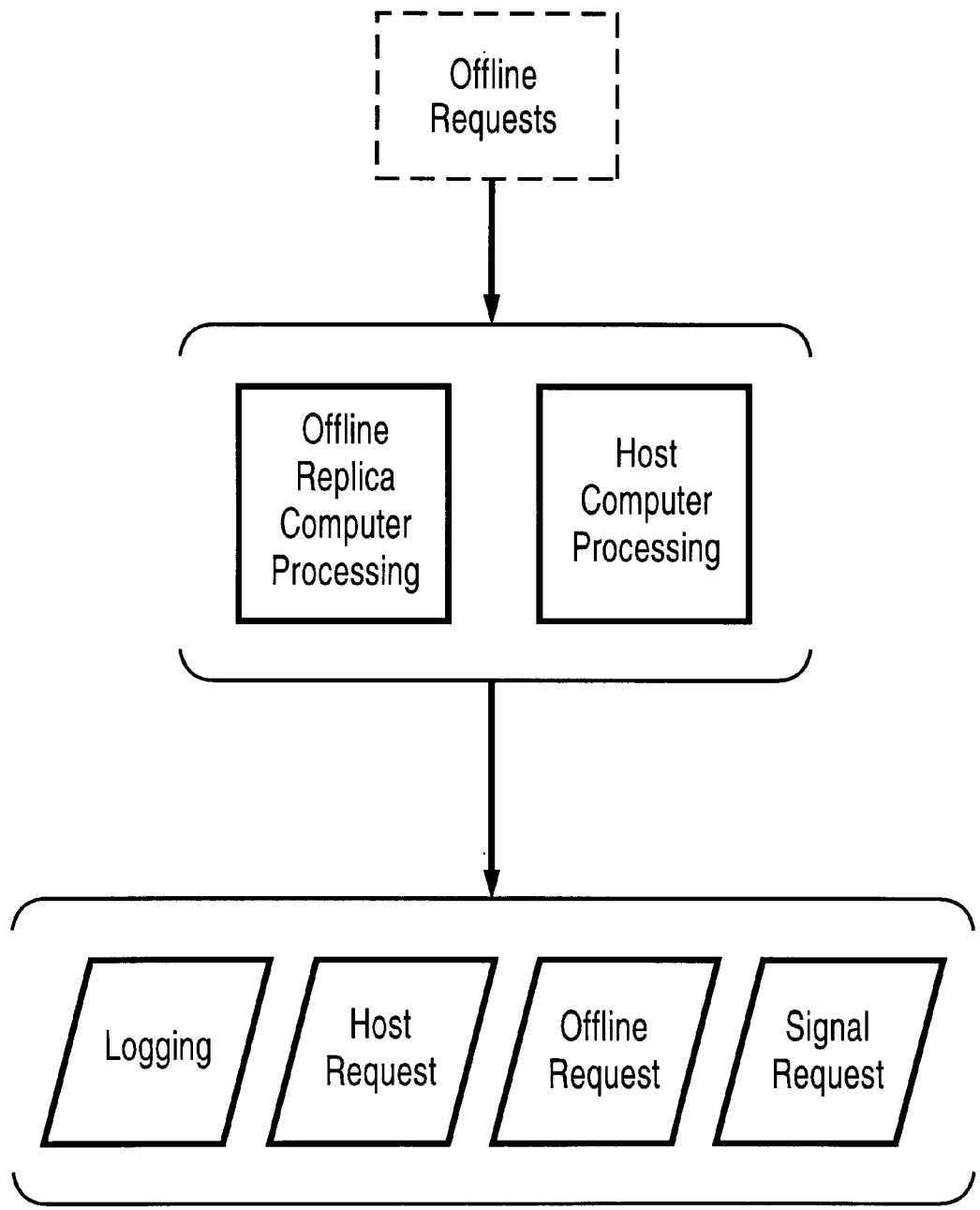
FIG. 6D schematically illustrates, on a high level, the basic way in which the preferred on-line computer system handles off-line service requests.

FIG. 6D schematically shows, in generic terms, the different functions performed by system 100 associated with off-line service requests. As shown in FIG. 6D, an off-line service request can be performed by off-line replica computer 160 or host computer 104 in the preferred embodiment. The results of such off-line service processing may comprise any one of the following:

logging;

generation of a host computer request;

generation of an off-line request for handling by off-line replica computer 160; and/or generation of a signal request.

Figure 6E:
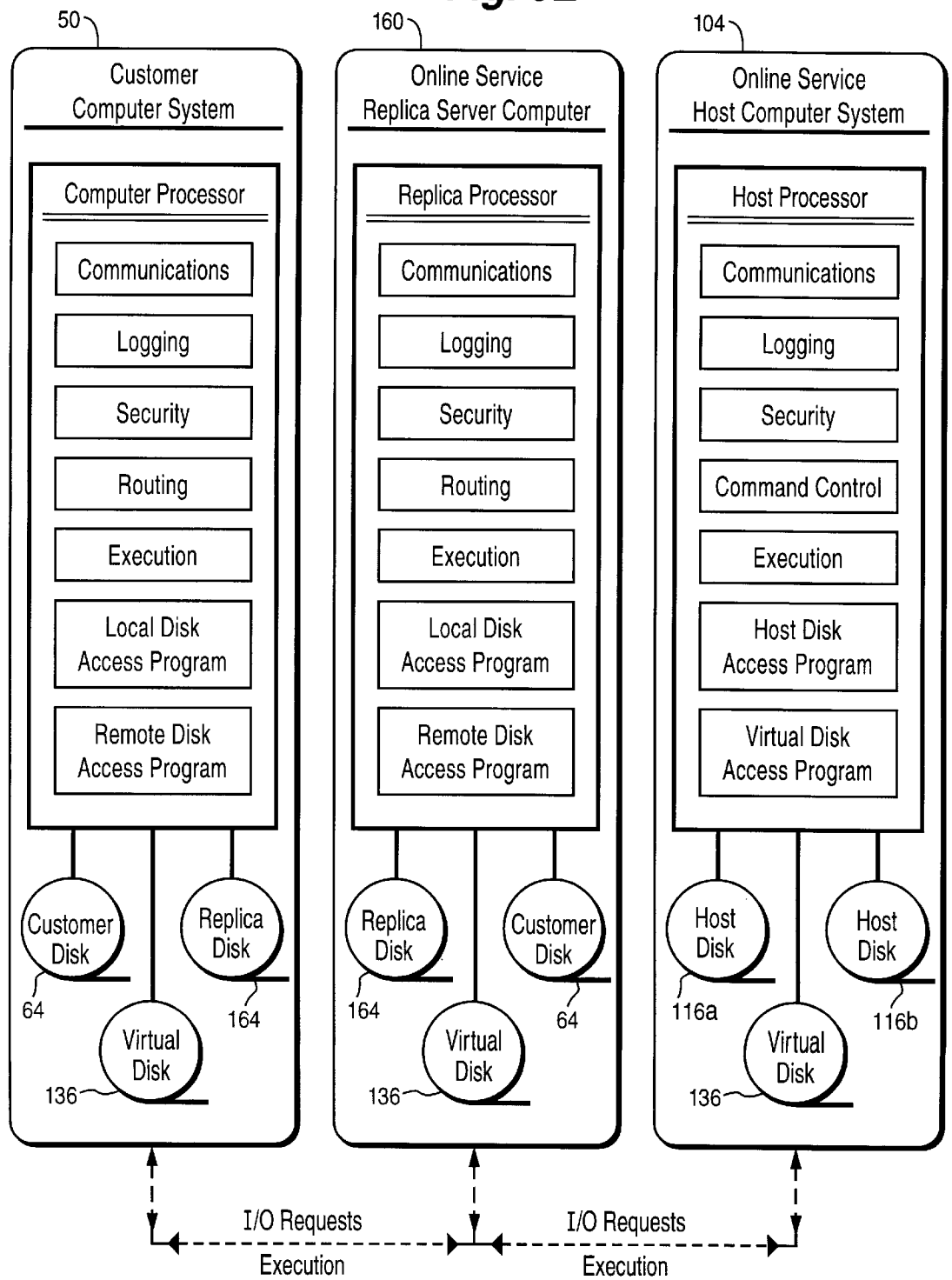
FIG. 6E schematically illustrates different processing functions performed by the host computer, replica computer and customer computer in the preferred embodiment.

FIG. 6E schematically shows some of the more important high level tasks performed by each of the main components within the preferred embodiment (i.e., customer computer 50, host computer 100, and replica computer 160). Each of these tasks are performed under software control, and certain of these tasks may communicate with other tasks being performed by other computers. The customer computer 50 in the preferred embodiment supports the high-level functions of communications, logging, security, routing, program execution, local disk access, and remote disk access. The on-line service host computer 104 supports communications, logging, security, command control, program execution, host disk access and virtual disk access. The on-line and off-line replica computers 160 in the preferred embodiment each support communications, logging, security, routing, program execution, local disk access, and remote disk access. Each of the computers 50, 104 and 160 is provided with local physical mass storage disk. Thus, customer computer 50 has its local hard disk 64, host computer 104 has its local hard disk 116, and replica computer 160 has its local hard disk 164.

Figure 7:
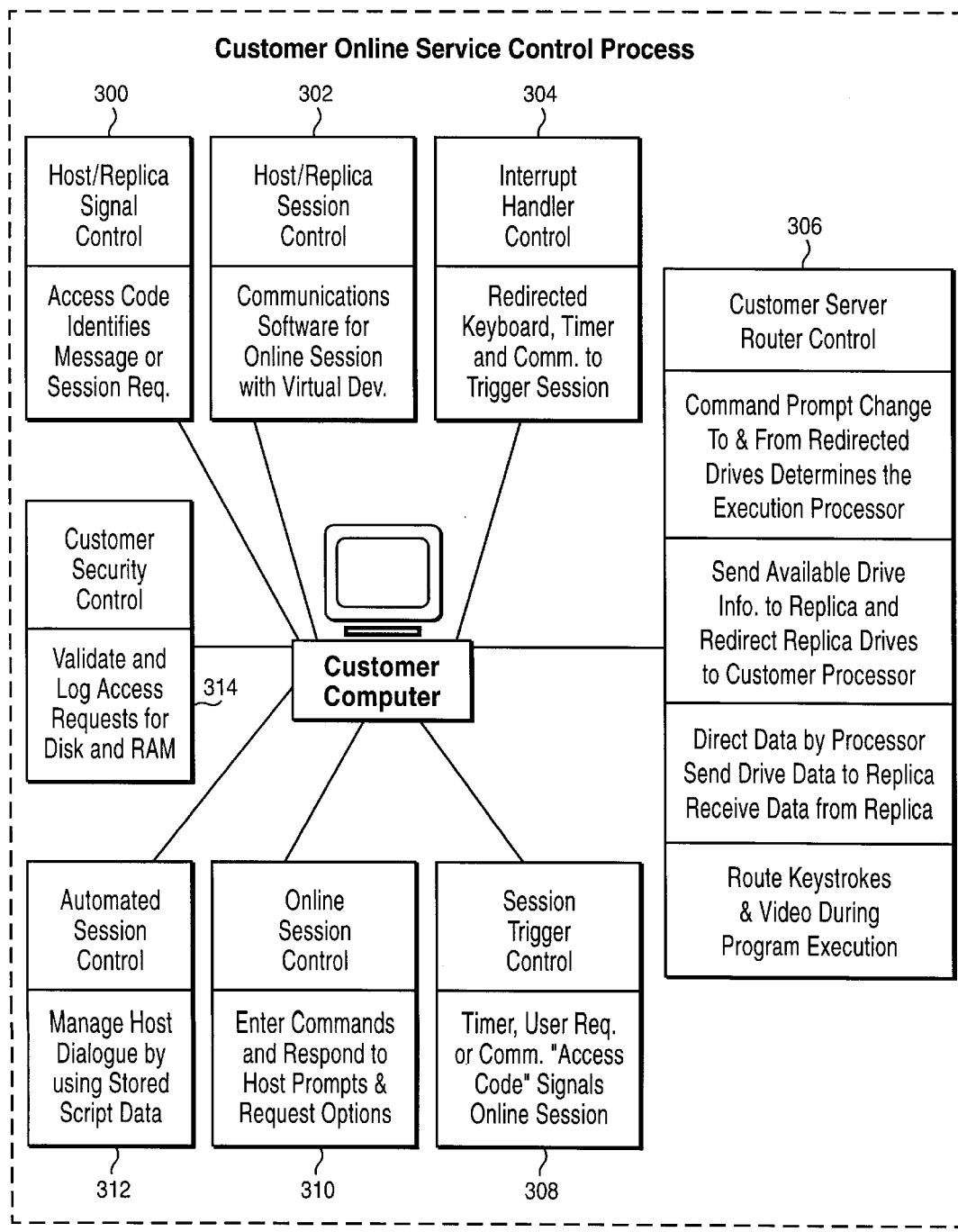
FIG. 7 schematically illustrates, on a more detailed level, some of the major tasks performed by the customer computer in the presently preferred embodiment.

FIG. 7, Customer On-line Service Control Process, provides an overview of on-line service control software executed within the customer computer 50. The customer computer 50 is shown in the center, surrounded by boxes representing various control processes. Clockwise from top left, block 300 describes Host/Replica Signal Control processing. The customer computer 50 tracks a signal pattern sent by the on-line service system. If a predetermined signal pattern match occurs, the customer computer 50 connects to the on-line service (without user ID and password) to receive an access code. This access code is used to determine the reason for access and default response (send message or trigger on-line session). A typical example would be for the on-line service 100 to send telephone ringing signals to the customers location. The customer computer 50 receives these ringing signals from the modem 80. The ringing signals are tracked and when a correct pattern is received, the customer computer 50 sends a modem command to switch to answer mode. The customer computer 50 then connects to the on-line service and receives an access code before disconnecting.

Block 302 describes Host/Replica Session and Virtual Disk System software. This refers to software used to maintain an on-line session. Regardless of the type of link, communications software is needed to connect to the on-line service. When connecting directly to the on-line service host computer 104, device drivers are needed to provide session and virtual device support. When connecting to the on-line service with the replica server computer 160, device drivers are needed to provide replica server remote disk support.

Block 304 references the redirected keyboard, timer, and communication interrupts. Keyboard interrupts are redirected for a number of purposes. Hot keys can be configured to activate the on-line service control program or to initiate an on-line service session. Automated session support is managed by storing script file data in the keyboard buffer upon matching video criteria or some other test (timeout, etc.). A replica server 160 on-line session requires redirection of keyboard and video interrupts to cause the customer computer 50 and replica server computer 160 to appear as one computer. The timer interrupt is redirected to allow on-line service sessions to be triggered when a specified date/time condition is met. The serial port interrupts are redirected to support the signal control process.

Block 306 describes Replica Server On-line Session Control processes. These services are available to customers that wish to connect to the on-line service with an intermediate computer interfaced. The advantages are faster data transfer rates for some functions because the customer computer 50 and replica server computer 160 are of the same type; the ability to access a more powerful processor of the same type as the customer; the ability to access peripherals attached to the replica server that would otherwise be unavailable.

One feature of the Replica Server On-line Session Control process (block 306) refers to the relation between the command prompt current drive and the processor for subsequent execution. When the customer computer 50 command prompt is set to a local customer disk drive 64, the next command is executed locally. When the customer computer 50 command prompt is set to a replica server remote disk 164, the next command is executed within the replica computer 160 with keyboard and video redirected to appear as if the command was locally executed. This includes translating drive designator references to replica system equivalents before sending a command to the replica keyboard buffer.

The second feature in block 306 refers to configuration information sent between the customer computer 50 and replica server computer 160. Both the customer computer and replica computer 160 have access to drives of the other computer as remote virtual disks. Every time a drive is mounted on one system (including virtual disks mounted on the replica server 160), the drive needs to be configured (mounted) as a remote disk on the other computer. The Replica Server On-line Session Control process sends and receives configuration requests to cause drive mounts and dismounts on both computers.

The third feature of block 306 refers to the management of I/O requests for remote drive data. Since the remote drives can reside on either system, the router not only performs read/write requests on local disks for the replica processor, but also issues read/write requests for replica disk data for the customer processor.

The last feature of block 306 refers to redirecting keyboard and mouse input and video and printer output.

Block 308 describes Session Trigger Control. The reference is to service control programs chained into redirected interrupts. An on-line session can be triggered by keyboard input, a date/time or date/interval time, or by an access code received from the on-line service. The on-line service delivers this access code by sending a signal pattern to the customer computer 50 (pattern of telephone ringing signals). If the signal pattern matches, the customer computer 50 connects to the on-line service (command is issued to switch modem 80 to answer mode). Finally, the access code is received and the customer computer 50 disconnects.

The block 310, On-line Session Control, describes the process of interactively accessing an on-line service with virtual disks. Since access is under control of the on-line service, the customer computer 50 needs to respond to certain requests such as user ID, password, and request option. The on-line service allocates resources and maintains billing information based on customer interaction.

Block 312 describes the Automated Session Control process. Control programs are used to manage an on-line session without user interaction. Data is stored in the keyboard buffer when required. Various actions take place based on predetermined events (i.e., perform a function based on video buffer contents, or perform a function based on a timeout condition).

Block 314 describes the Customer Security program. This program is used to validate requests for disk access and disable unauthorized copying of data stored in the customer computer RAM. The main purpose is to prevent customers from copying data and programs accessed on mounted virtual disks, particularly execute only software and rental information.

VI. Host Processor Tasks

Figure 8A:
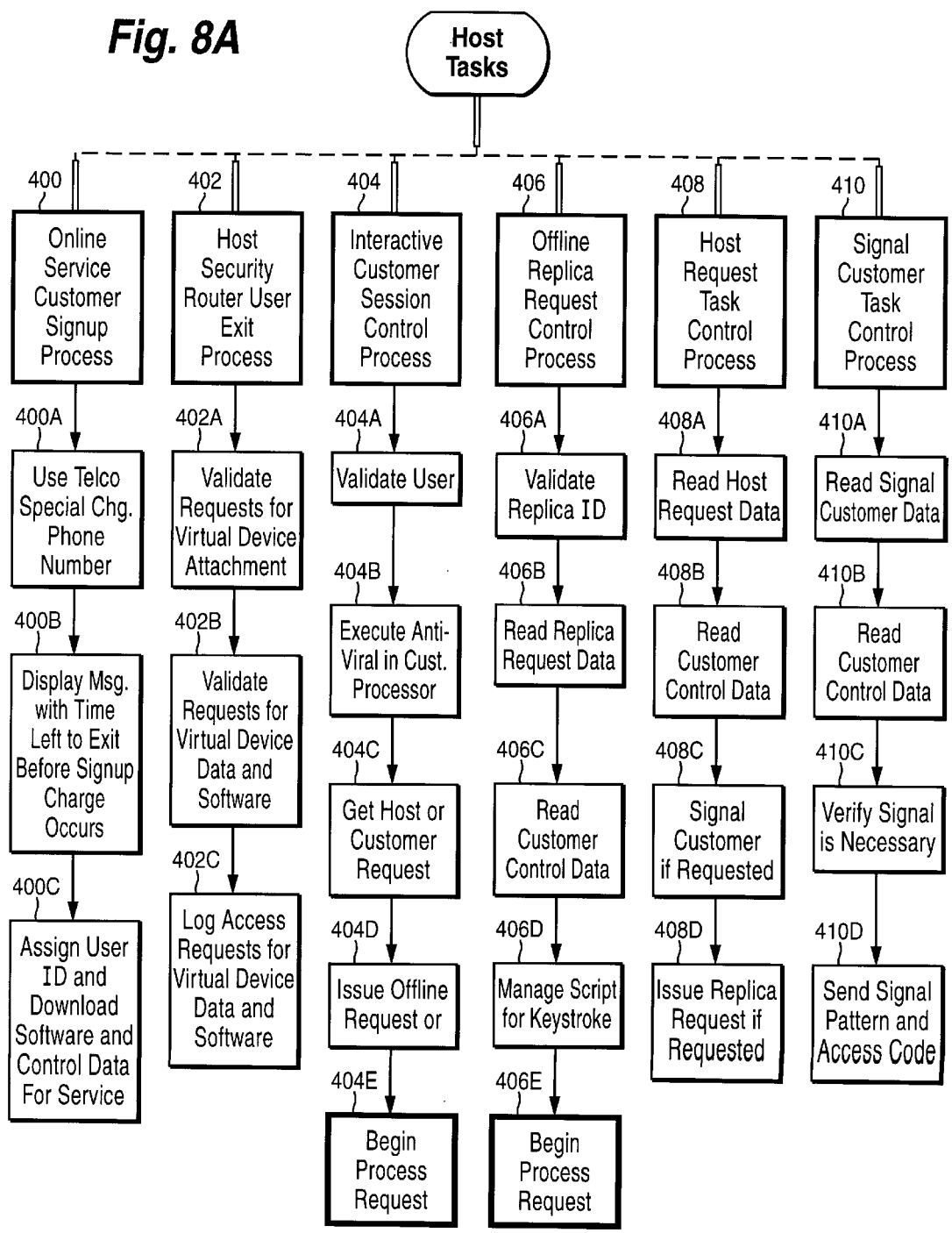
FIGS. 8A and 8B schematically illustrate, on a more detailed level, some of the major tasks performed by the host computer system in a preferred embodiment.

FIG. 8A offers an overview of on-line service control software executed within the on-line service host processor.

Block 400 shows the On-line Service Customer Signup Process. Access is provided by dialing a special charge telephone number (block 400A). A message is displayed describing the services and charges for signup, and the amount of time left to exit before a signup charge is issued (block 400B). If the customer stays connected and responds to signup information, a user ID/password is assigned, software and control information is downloaded to the customer computer 50, and customer control information is stored on the host system 100 (block 400C). This control process can be performed by the on-line service computer 104 or the replica server computer 160. The latter is preferable because the link to the signup computer can be performed with standard communications software.

Block 402 describes the Host Security Program. This program is used to validate access requests for virtual disks. Host system security provides secured access to control unauthorized virtual disk mounts. Host system security also controls virtual disks access as read-only or read/write devices. The Host Security program is used to control customer or replica server computer execution and copy access to virtual disk data. All requests for virtual disk data and programs are validated (blocks 402A, 402B) and logged (block 402C). It should be noted that a similar validation program resides in the host computer 104, the replica server computer 160 (if used), and the customer computer 50. The customer computer 50 and replica server computer 160 use a modified version of this function with code to prevent unauthorized access to virtual disk data and programs residing in RAM.

Block 404 is the main control process for customer access. The Interactive Customer Session Control Process is used to manage the on-line session. Activities are initiated under control of this process. After each user is validated (block 404A), anti-viral code is executed in the customer processor (block 404B). Session information is tracked for billing and security. Customer and host requests are managed by this process. If a Host Request Data entry is found for the customer, and the date/time condition is met (block 404C), and the request is not for off-line replica processing, the host request is processed by the customer on-line session as if the customer had issued it directly (block 404C). The Session Control Process also allows commands to be directed to an off-line replica computer for later execution (block 404D). Parameters and script file data is stored along with a date/time to perform the request. For interactive requests, the Begin Process Request (block 404E) performs the request.

Block 406 describes the Off-line Replica Request Control process. This process is somewhat similar to the Interactive Customer Session Control Process except that no user interaction occurs. Requests are read from the Replica Request Data (block 406B). If the date/time condition is met, then Customer Control Data (block 406C) is accessed and interrupts are redirected to manage the request using script file data available from the Replica Request (block 406D). The Begin Process Request (block 406E) function is then called to perform the actual request. An off-line replica computer 160 connects to the host 104 with a special user ID (block 406A). This user ID provides access to customer disks used for routing files, and provides access to on-line service programs stored on virtual disks.

Block 408 describes the Host Request Task Control Process. The purpose of this control process is to generate requests for the off-line replica computer 160, and to signal a customer to establish an on-line session. Host Request Data is read (block 408A), and if the date/time condition is met, the Customer Control Data is read (block 408B). If the customer computer is connected to the on-line service, the request is bypassed. The Host Request Notify Method field determines if the customer should be signalled before the request is performed (block 408C). If so, Signal Customer Data is written for the customer. If the request is for off-line processing, a Replica Request is written for the customer (block 408D).

Block 410 describes the Signal Customer Task Control Process. This process can execute in the host computer 104 or the off-line replica computer 160. Signal Customer Data is read (block 410A). When the date/time condition is met, Customer Control Data for the customer is read (block 410B). If the customer is signed on, a host request is issued (block 410C). Otherwise, the Signal Customer Data Access Code is used to get a signal pattern stored on the Customer Control Data. This signal pattern (pattern of telephone rings) is then sent to the customer computer (block 410D). If the customer computer answers at the correct time, the access code is transmitted to the customer computer. If the access code is used to trigger an on-line session, then the sign-on allowed flag on the Customer Control Data is updated to allow sign-on without dialback.

Figure 8B:
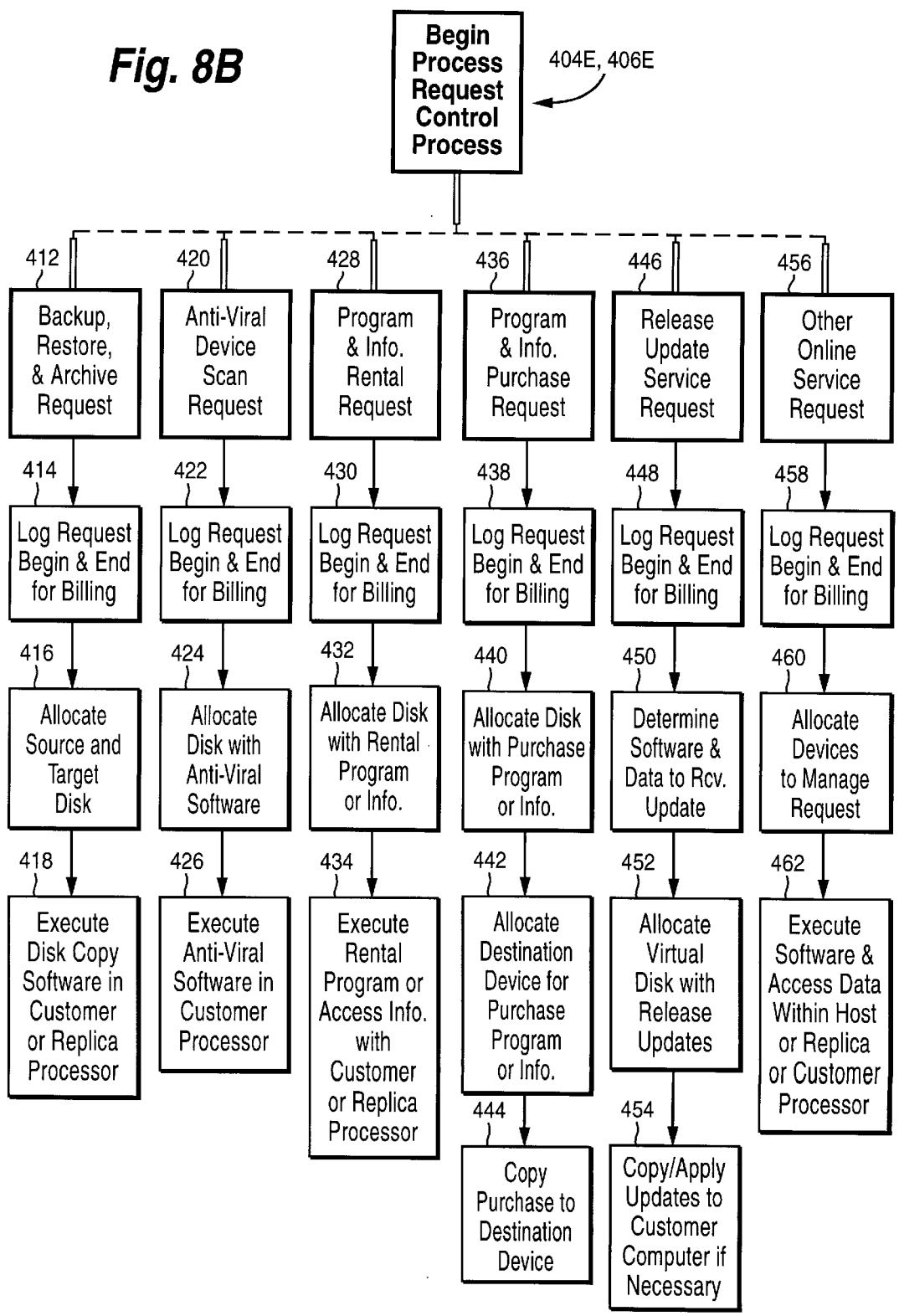

FIG. 8B shows the Begin Process Request routine shown in FIG. 8A with an expanded view by type of service.

As shown in FIG. 8A, blocks 404D and 406D each obtain a request to be processed and pass that request to the "begin process request" block (404E, 406E). The request is processed by host computer 104 and/or replica computer 160, depending on the request. The host computer 104 and on-line replica computer 160 each execute different software, but in the preferred embodiment each can perform all of the functions shown in FIG. 8B (some of the functions are, however, performed differently depending on whether the host or the replica performs them).

If the request is for "backup, restore and archive" services (block 412), host computer 104 logs certain information (e.g., user, begin time, etc.) for billing and security purposes (block 414), and then allocates ("mounts") the appropriate virtual disks containing the software needed to satisfy the request (block 416). The process of copying the information is performed in the preferred embodiment by customer computer 50 and/or replica computer 160 by copying information to and/or from a virtual disk (block 418). The end time is preferably then logged by host computer 104 for billing purposes (block 414).

If the request is for anti-viral scan (block 420), the request is logged (block 422) and a read-only virtual disk storing anti-viral software is then attached to the appropriate computer (e.g., customer computer 50) (block 424). The anti-viral software is then executed in the customer computer 50 and/or replica computer 160 as appropriate (block 426).

If the request is for program or data rental (block 428), the appropriate information is logged as before (block 430), and the virtual disk storing the program or data to be rented is then allocated to the appropriate computer (e.g., customer computer 50 and/or replica computer 160) (block 432). A "host" security program is executed by the host computer 104 to prevent unauthorized copying of the virtual disk contents, and a similar program executes in the customer computer 50 and replica computer 160 to prevent unauthorized access to virtual disk data and programs residing in random access memory. The customer computer 50 and/or replica computer 160 executes the rental program or accesses the data (block 434). Meanwhile, host computer 104 keeps track of beginning and ending times of access to ensure that the customer can be billed based on the amount of time he has used the contents of the virtual disk (block 430). A customer can also be billed on a per use basis or a monthly charge basis.

In the preferred embodiment, the user may request to "purchase" a particular program or data (block 436). For example, the user may want his own copy of the program or data locally stored or he may wish to modify it such that it is not feasible to merely rent it. If the request is for a "purchase," logging is performed as before (block 438), and then the host computer 104 allocates the appropriate virtual disk containing the program or information to be purchased (block 440). Host computer 104 also allocates a destination device for receiving the purchased program or information (block 442). This destination device may be, for example, the local hard disk 64 within customer computer 50. The selected software is then copied to the destination device in order to complete the purchase (block 444). This copying operation is preferably performed only upon receipt of payment from the customer (e.g., by checking credit card authorization and charging the associated license fee to the customer's credit card account). Software demonstrations of the programs not requiring secured customer data can be made available to all customers by providing access to a shared, execute-only virtual disk. Demos allowing secured customer data can be provided by copying programs or information stored on a secured virtual disk to a temporary virtual disk with customer execute-only access. If payment is not received within a specified period, the virtual disk can be deleted. Upon receipt of payment, the temporary virtual disk ownership can be transferred to the customer for complete access. This enables the customer to obtain immediate access to the desired software while allowing the service provider to later revoke access if payment is not received.

If the request is for release update services (block 446), the request is logged as before (block 448), and host computer 104 also determines whether the customer is entitled to release update and also whether this particular customer wants or needs the release update (block 450). Assuming that the customer is authorized to receive, wants and needs the update, host computer 104 allocates a virtual disk storing the release update (more than one may be transferred at the same time) (block 452), and then copies and/or applies the updates to customer computer 50 (block 454). When necessary, a program can be executed to perform special services such as configuration changes to customer computer 50.

Blocks 456–462 provide a generic description of additional user request handling. Beginning and ending times are logged for billing and security (block 458), appropriate virtual disks and/or other virtual devices are allocated to handle the request (block 460), and appropriate software is executed and data is accessed within host computer 104 and/or replica computer 160 and/or customer computer 50 to handle the request (block 462).

VII. Replica Computer Tasks

Figure 9:
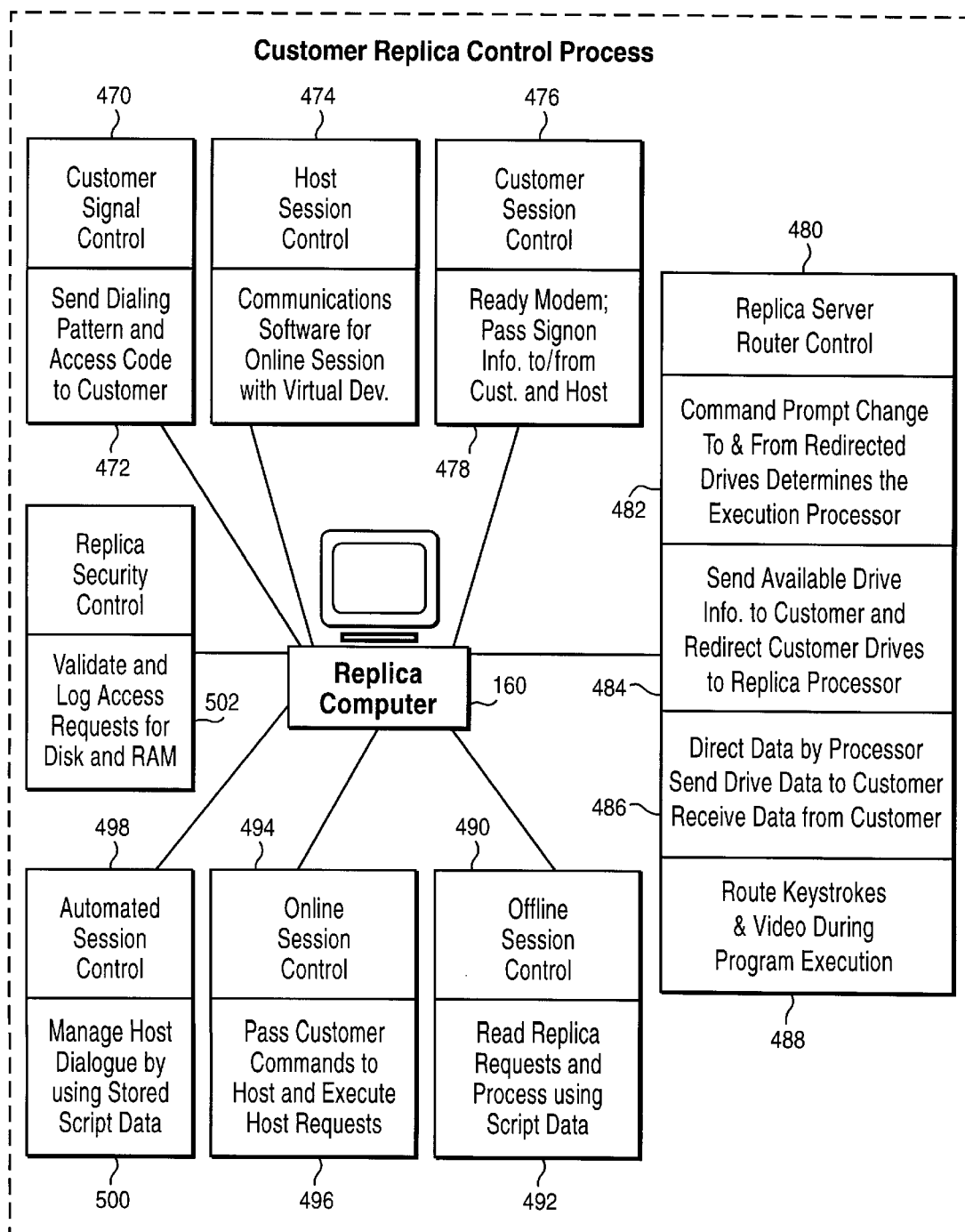
FIG. 9 schematically illustrates, on a more detailed level, some of the major tasks performed by the replica computer in the preferred embodiment.

FIG. 9, Customer Replica Control Process, provides an overview of service control software executed within the on-line and off-line replica computers 160. The replica computer 160 is shown schematically in the center, surrounded by blocks representing various control processes. Block 470 describes the Customer Signal Process. This process can also be executed by the host computer. Ringing patterns are sent to a customer computer 50 to cause a monitor control program to change the customer modem 80 to answer mode (block 472). When the customer modem 80 answers, an access code is transmitted to the customer computer 50. This access code is used to trigger an on-line session or send a message to the customer computer 50.

Block 474 refers to host session and virtual disk system software needed to maintain an on-line session with virtual devices. This software consists of device drivers and workstation emulation software.

Block 476 describes the Customer Session Control process. This communications software is used to connect the customer computer 50 to the replica server computer 160. The replica server modem 162 is set to answer mode, while a customer connection is awaited. Upon connection, the host sign-on display is redirected to the customer computer 50. Customer sign-on information redirected to the replica server keyboard buffer is passed to the host computer 104 (block 478).

The Replica Server Router Control Process is described in blocks 480–488. Since drives for both systems are remote to each other, the Router Control process is needed to manage I/O data requests (block 486), drive configuration requests (block 484), execution requests (block 482), and keyboard, mouse, video and printer redirection requests (block 488).

Block 490 describes Off-line Session Control processing performed by an off-line replica computer. Replica Request Data is read and requests are performed without a customer connection (block 492). When the request is created, parameters and script file data are stored. The stored data is used by this process to satisfy the request.

Block 494 describes the On-line Session Control. Customer keyboard input redirected to the replica server keyboard buffer are received by workstation emulation software and passed to the host computer (block 496). The host computer issues requests to execute software within the replica server processor during an on-line session.

Block 498 describes Automated Session Control. This process is used to provide keyboard input to manage a request without user intervention. Parameters and script file data are moved to the keyboard buffer with a control program linked by interrupt chain (block 500).

Block 502 describes the Replica Security program. This program is used to validate requests for disk access and disable unauthorized copying of data stored in the replica server computer RAM. The main purpose is to prevent customers from copying data and programs accessed on mounted virtual disks, particularly execute only software and rental information.

VIII. Detailed Description of Customer Computer Tasks and Data Structures

Figure 10:
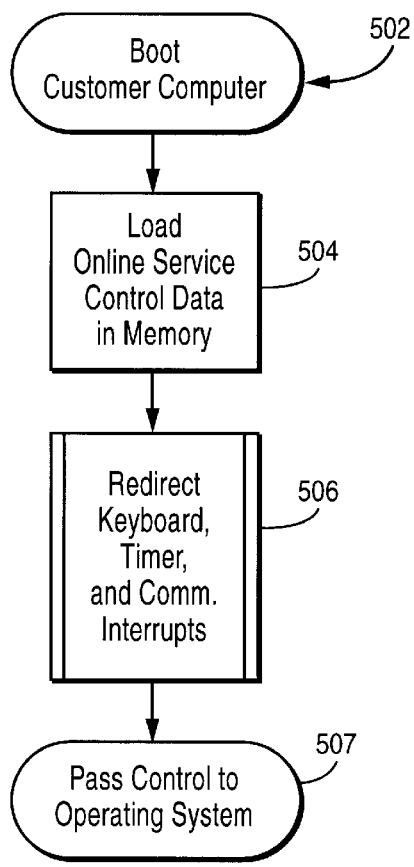
FIG. 10 is a high level flow chart of exemplary tasks performed by the customer computer in the preferred embodiment during startup.

FIG. 10 is a flowchart of exemplary program control steps performed by customer computer 50 in the preferred embodiment in order to interact with on-line service system 100. The steps shown in FIG. 10 can be performed by customer computer 50 with the "CONFIG.SYS" and "AUTOEXEC.BAT" files in a DOS environment or then can be performed with a batch file on request. In any event, in the preferred embodiment, device drivers are loaded into customer computer memory 66 to support the virtual device "PC SUPPORT" facility of host computer 104 or to support remote access to the on-line replica computer 160.

When customer computer 50 is first turned on or "booted," (block 502), it first loads an on-line service control data table into its memory 66 (block 504). An exemplary format for this on-line service control data table 501 is shown in FIG. 16A. This data table 501 in a preferred embodiment contains the following information:

On-line Service Control Data Table 501:

Hardware Configuration Data 600
Basic information on the type of computer used by customer.

Customer Profile Data 602
Standard Customer Information used to sign on and identify the customer.

Host Signalling Parameters 604
Table Occurs, Host Access Code, Host Phone No., Host reason, Response Default
For each host signal access code, there is an associated on-line service phone number, reason for being signalled, and default response for the customer.
Host reasons include: Dialback request, route request, option complete, replica complete.
Response defaults include: Immediate dialback, set interval time, display message.
Other host reasons and response defaults can be created.

Session Active Flag 606
Indicates an on-line session is active.

Host/Replica Session 607
Indicates whether the customer is connected directly to the host or replica.

Automated Session Flag 608
An on-line session with automated keystrokes.

Service Control Program Hot Key 610
Accesses the control program to display and change service options and configuration data.

On-line Service Session Initiation Hot Key 612
Can be used to start an on-line Session (session can also be started by timer or signal from on-line service).

Command Prompt Drive Change Hot Key 613
Can be used to change to a different command prompt (and possibly different processor).

Redirected Interrupt Table Occurs 614
Used to maintain the status of interrupt routines that have been redirected for on-line service functions.

Automated Session Table Occurs 616

Four variable length tables can exist by date/time, day/time, date/interval period, and day/interval period. For each table entry, service options can be stored for automatic processing.

Ringing Pattern Stores Table Occurs 624

The dialing patterns the on-line service can send to the customer are stored. When a pattern match occurs, the customers modem switches to answer mode and receives an access code from the host to determine why the on-line service sent a signal. Wait time is used to calculate the time till the next call in the pattern.

Tolerance allows for fuzzy logic for number of rings (i.e., +or −2 rings on calls) or interval period between calls (i.e., +or −15 seconds).

Backup Parameters 626

Backup Option Flag, Incremental Flag, Full Backup, Backup File List

The backup option flag is used to indicate a backup request. Backup can be incremental, full backup or based on a file list. File list includes target location information.

Restore Parameters 628

Restore Option Flag, Incremental Flag, Full Restore, Restore File List

Same as backup list above except files are restored from the on-line service. Data may be on Virtual Device or Archived to tape or other media.

Anti-viral Parameters 630

Anti-viral Option Flag, Device Cleansing List, Build Anti-Viral Environment

Indicates a request for Anti-Viral Services. The device cleansing list identifies drives, subdirectories, and devices that should be scanned for viruses during the on-line session. Build anti-viral environment is used to set up and maintain a current anti-viral environment on the customer's session that will run at all times (when on-line session is not active).

Media Routing Parameters 632

Media Routing Option Flag, Default Customer & Host Storage Locations by Media Type Indicates a request to route data. Storage locations identify where the data is currently stored (customer hard disk, customer fax unit, on-line service virtual device, etc.) and identifies the type of media to be routed.

Media Origination Parameters 634

Media Origination Table, Device, Location, Allocate Device, Read Device Flag

This table provides the means to use a peripheral device to send media. The device type, its addressable location, whether allocation is required, and whether the device should be accessed is provided.

Media Destination Parameters 636

Media Destination Table, Device, Location, Allocate Device, Write to Device Flag This table is similar to the media origination table except it is used to manage requests to receive media. For instance, routing data can be printed on a fax unit if desired.

Media Conversion/Routing Parameters 638

Inter-Routing Media Option Flag, Media Conversion Table Occurs, From Media, To Media This option is used when media is to be converted before being received from a routing request. The on-line service can convert the media to the customer's preferred media before the routing data is received.

From and To Media can include: Fax, WP, Voice, Image, Multi-media, Other.

Diagnostic Parameters 640

Diagnostic Option Flag, Diagnostic Function List

Used to indicate diagnostics are to be performed. The function list identifies the diagnostics to be performed such as memory test. Response options are included to determine how to manage the results of each test.

Data Compression Parameters 642

Disk Compression Option Flag, Compression Method

Used to indicate that compression is to be used. The method is identified and may include software compression performed on the customer and/or on-line service computer.

Disk Encryption Parameters 644

Disk Encryption Option Flag, Encryption Method

Used to indicate that encryption is to be used. The method is identified and may include software encryption performed on the customer and/or on-line service computer.

Disk Management Parameters 646

Disk Management Option flag, Management Functions

Used to indicate that disk management services are to be performed. Management functions identify the services such as making file data contiguous or performing disk optimization functions.

Release Update Parameters 648

Release Update Option Flag, Software and Info List

Used to indicate that released updates are to be performed when necessary. The software and info list identifies the software for which release updates are to be performed. This list is used to indicate what updates are desired, an update will only occur if the customer is entitled to a release update. A table on the on-line service which the customer cannot change identifies the software and information for which the customer is allowed to receive updates.

Processor Flag 649A

Indicates which processor (customer computer 50, replica computer 160 or host 104) is to execute the next task).

Processing Control Table Default Settings 649B

Figure 16B:
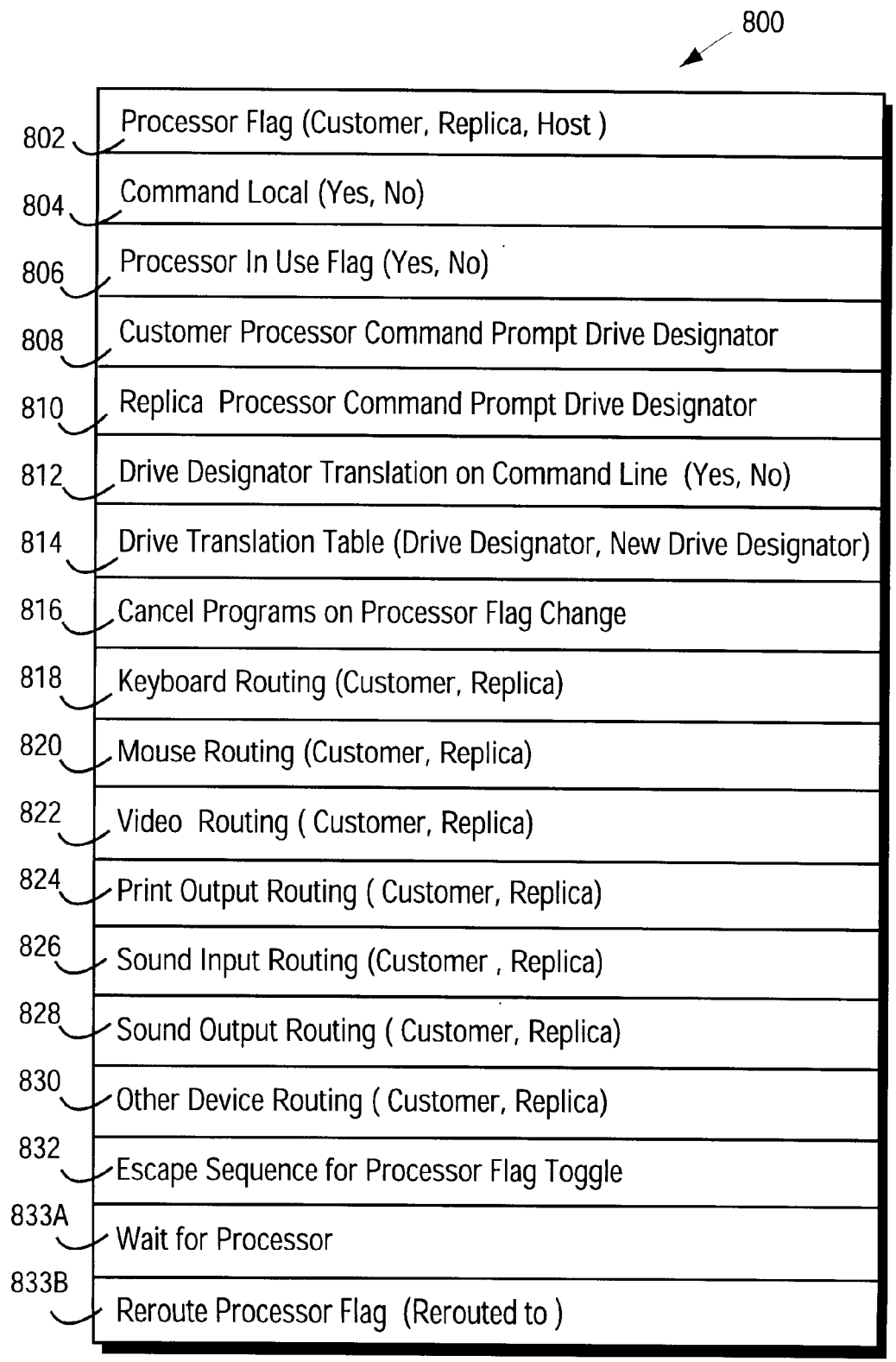

Provides default settings for the data structure shown in FIG. 16B.

Customer Processor Command Prompt Drive Designate 649C

Specifies the current command prompt drive designator for the customer computer.

Replica processor Command Prompt Drive Designate 649D

Specifies the current command prompt drive designator for the replica computer.

Drive Control Table Default Settings by Disk Type 649E provides default settings for each type of disk.

The on-line service control data table 501 is stored locally on customer computer hard disk 64, and is loaded into customer computer memory 66 each time the customer computer is booted. The on-line service control data table 501 is used to control interaction with on-line service system 100, and to maintain default and other parameters relative to that interaction.

Once the on-line service control data table 501 has been loaded, customer computer processor 68 redirects its keyboard interrupt, timer interrupt and communications interrupt (block 506). As is well known, personal computers such as preferred embodiment customer computer 50 communicate with various devices attached to its processor 68 via an arrangement called "interrupt." If a device wishes to "talk" to processor 68 and/or get access to a shared resource such as the data bus or hard disk 64, the device sends an "interrupt" to processor 68. In response to receipt of this interrupt, processor 68 stops doing what it was doing (i.e., it interrupts itself), and executes a special "interrupt" handler routine that determines the source of the interrupt and then takes appropriate action in response to the interrupt. In a preferred embodiment, software executed by customer computer 50 overrides the default interrupts of processor 68 by "redirecting" them. This allows the preferred embodiment software to intercept all depressions at keyboard 56 keys, all automatically-generated timer interrupts, and all automatically-generated communication interrupts—and examine those interrupts to see whether or not they are related to the tasks associated with communications to on-line system 100.

Figure 11:
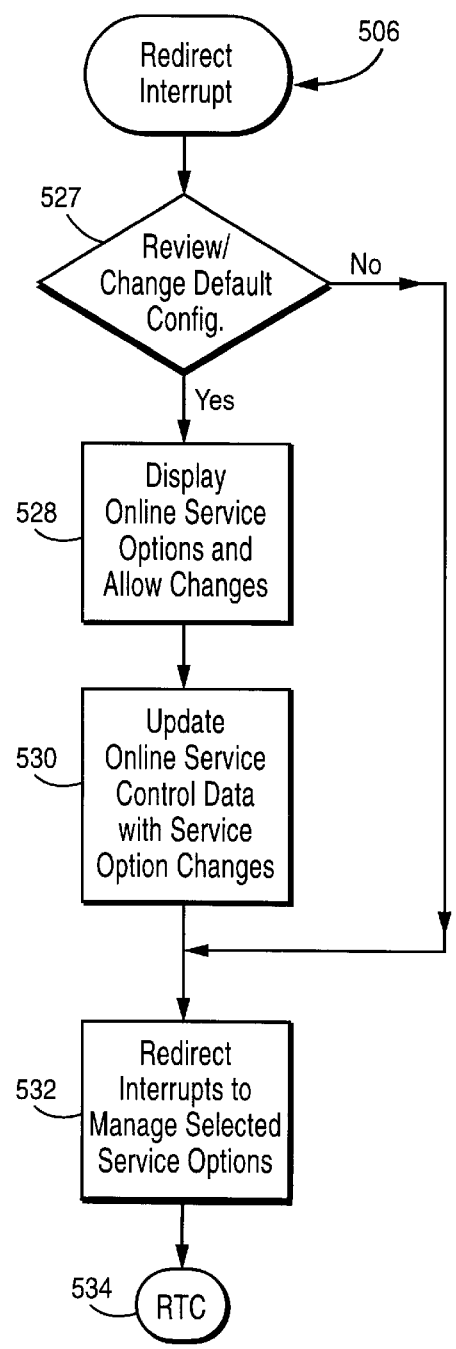
FIG. 11 is a schematic flowchart of the "re-direct interrupt" block of FIG. 10.

FIG. 11 is a flowchart of exemplary program control steps performed by the "redirect interrupt" block 506 shown in FIG. 10. Upon entering routine 506, the routine in the preferred embodiment may first prompt the user to determine whether the user wishes to review and/or change the default configuration (decision block 527). If the user does wish to alter the default settings ("yes" to decision block 527), customer computer 50 accesses the appropriate information within the on-line service control data table 501 (e.g., blocks 610–624 and possibly other information as well) and displays it on customer computer display 54 (block 528). An editor may permit the user to move the cursor to each of the displayed parameters and to change those parameters as desired (block 528). Once the user is finished editing the configuration, the user may so indicate and routine 506 will update the on-line control data table 501 with the service options changes selected by the user (block 530). Then (for both "yes" and "no" exits to decision block 527), based upon the current interrupt settings within the on-line service control data table 501, routine 506 redirects the processor interrupts by loading new interrupt handlers into the processor memory 66 (block 532). These interrupt routines will receive and process the various interrupts provided to the processor and "screen" them to determine whether a function related to accessing the on-line system 100 needs to be performed. The interrupt handlers will initiate such a function if necessary, and will otherwise be transparent to the normal operations of customer computer 50. Once the interrupts have been redirected appropriately, control is passed (block 534) to the customer computer operating system (block 507) to permit the user to start up whatever he desires. All further interaction with the preferred embodiment software is in response to interrupts generated by a depression of a key of keyboard 56, by a timer, and/or by a communications line.

Figure 12A:
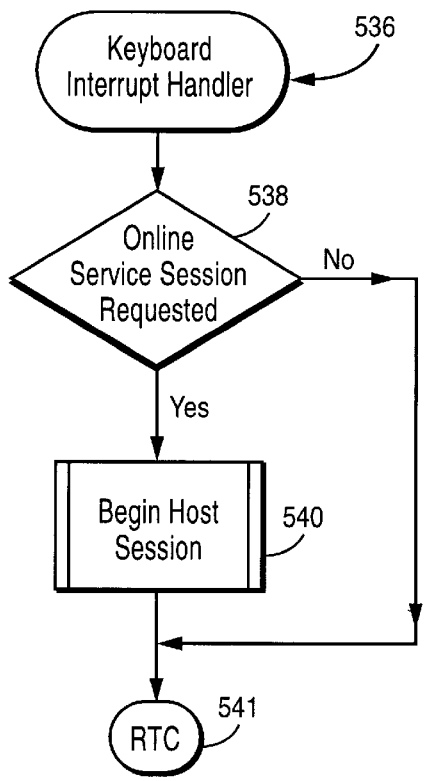
FIG. 12A is a schematic flowchart of exemplary keyboard interrupt handler tasks in the preferred embodiment.
Figure 12B:
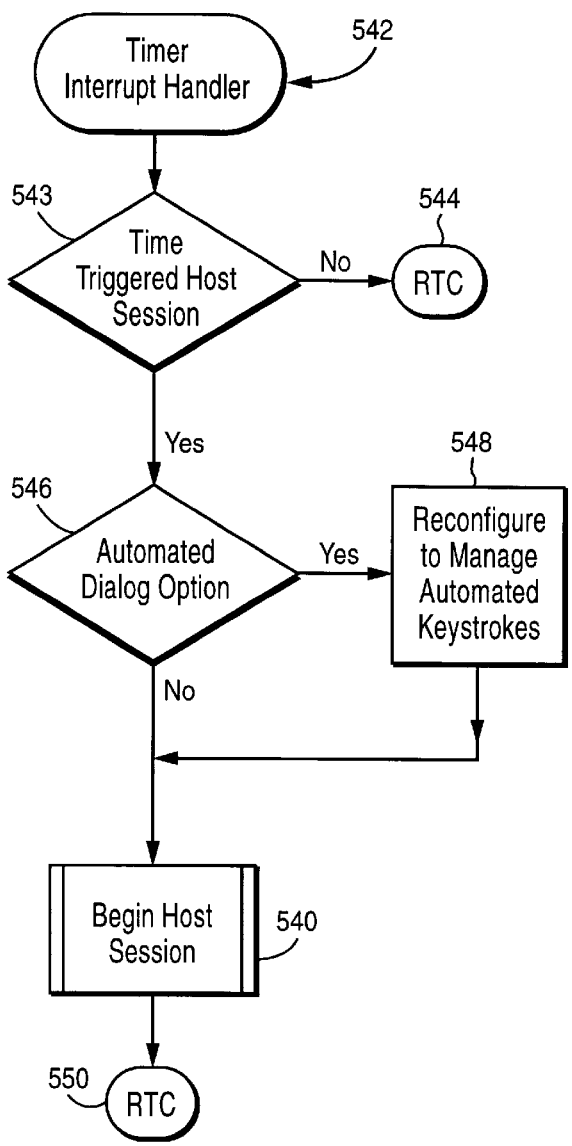
FIG. 12B is a schematic flowchart of exemplary timer interrupt handler tasks in the preferred embodiment.
Figure 12C:
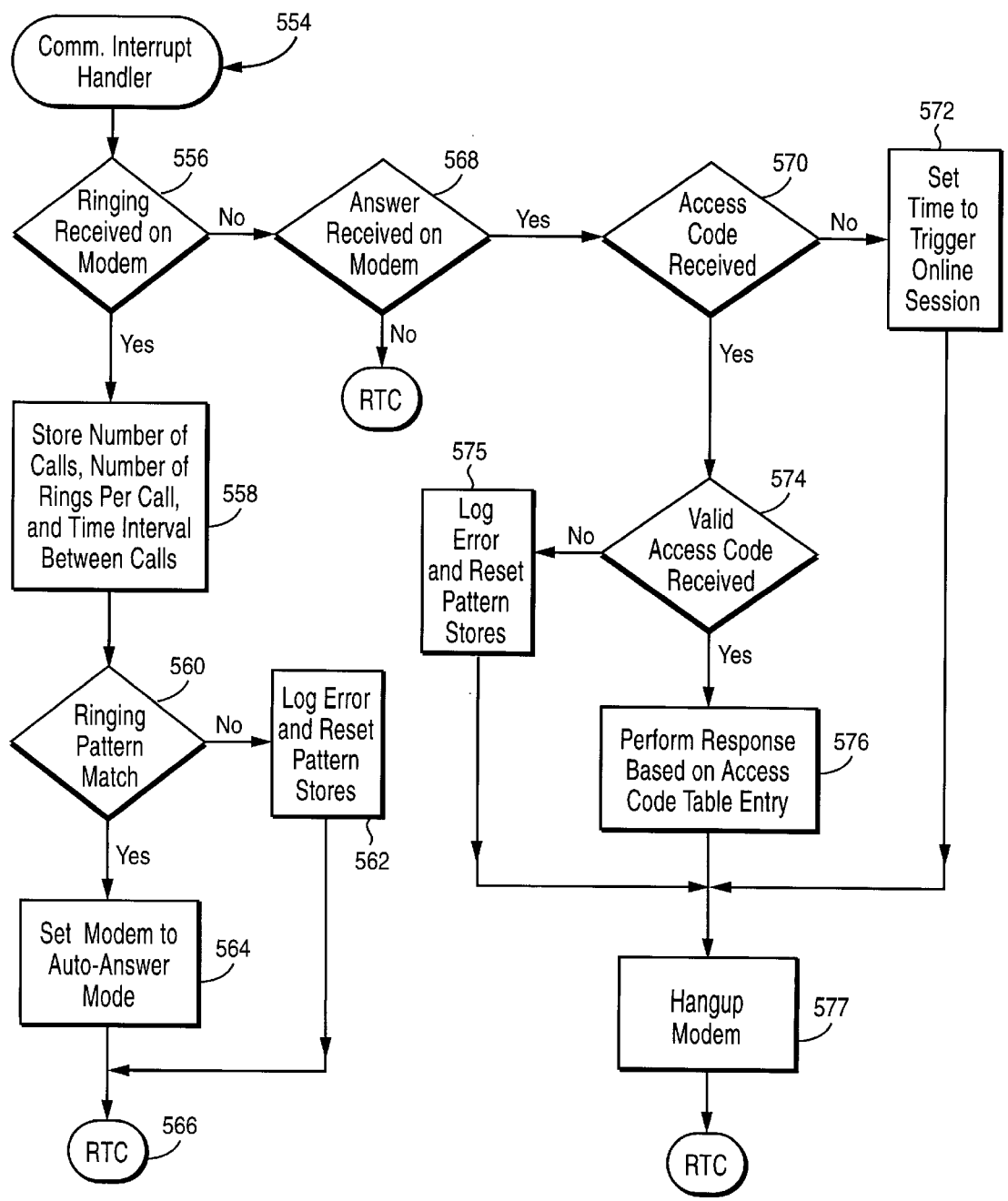
FIG. 12C is a schematic flowchart of exemplary communications interrupt handler tasks in the preferred embodiment.

FIGS. 12A–12C are, respectively, flowcharts of exemplary program control steps embodied within the preferred embodiment. The keyboard interrupt handler 536, the timer interrupt handler 542, and the communications handler 554. Looking first at FIG. 12A (the keyboard interrupt handler 536), whenever a key of keyboard 56 is depressed, this routine is invoked to test the depressed keystrokes, and then returns (block 541). If routine 536 determines that the user has depressed a particular unique "hot key" combination of keys requesting an on-line session ("yes" to decision block 538), then a routine 540 is called to begin a host session. If the "hot key" was not depressed ("no" to decision block 538), then the interrupt handler takes no action. The user can select the particular hot key keystrokes she desires to prevent interference with other application's programs ("yes" to decision block 527 of FIG. 11). The use of a "hot key" sequence has been widely used in the past to allow users to invoke special or supervisory functions while at the same time running other software. In the preferred embodiment, this "hot key" facility based upon keyboard interrupt handler 536 is used advantageously to allow the user to initiate an on-line session with on-line service system 100 without interrupting the currently executing application's software.

FIG. 12B is a flowchart of exemplary program control steps performed by a timer interrupt handler routine 542 in response to receipt of regularly generated timer interrupts within customer computer 50. Customer computer 50 in the preferred embodiment, like most personal computers, has a conventional hardware timer that periodically interrupts processor 68 to allow timing-related functions to be performed. This is analogous to having someone interrupt you once every 15 minutes to tell you that a quarter of an hour has gone by so that you can check your schedule to determine whether some new activity needs to be started. In the preferred embodiment, the timer interrupt handler routine 542 makes use of these regularly-generated timer interrupts by comparing the current time with a time stored in block 616 specifying a pre-scheduled automated on-line service session time (block 543). If the current time does not match any of the pre-scheduled automated session times stored in data block 616 of FIG. 16A, then the timer interrupt handler 542 passes the timer interrupts on to other conventional functions of customer computer 50 (block 544). On the other hand, if there is a match ("yes" exit to decision block 543), then the timer interrupt handler 542 automatically calls routine 540 to begin a host session (block 540) and returns (block 550). Decision block 546 provides an option to allow an on-line session to occur without the user being present (e.g., in the middle of the night). The "service options" portion of on-line service control data table block 616 specifies whether the session is to be attended or unattended, and it is this information which is tested by decision block 546 in a preferred embodiment. If the session is to be unattended ("yes" exit to decision block 546), then the configuration of customer computer 50 is altered so that "keystrokes" that would normally come from keyboard 56 may be provided under program control automatically (block 548). If the session is to be attended ("no" exit to decision block 546), then routine 540 is called without changing the customer configuration to handle automated keystrokes.

FIG. 12C is a flowchart of exemplary program control steps included within a communications interrupt handler 554 in the preferred embodiment. This routine is executed in the preferred embodiment in response to an interrupt generated by receipt of a ringing signal by customer computer modem 80 (decision block 556). In a preferred embodiment, communications interrupt handler 554 responds to only certain predetermined ringing signal indications by modem 80. The communications interrupt 554 will only answer once a specified ringing pattern has been received (the specified number is stored within on-line service control data table 501 within record 624). Communications interrupt handler 554 stores the number of calls, the number of rings per call and the time interval between calls (block 558) and then compares those parameters with ringing parameters stored within on-line service control data table ringing parameter block 624. The following is an example of one possible ringing pattern that could be used:

(1) host rings modem 80 with six rings, then hangs up;
(2) host waits 43 seconds after last ring;
(3) host rings modem 80 with three rings, then hangs up;
(4) host waits 20 seconds;
(5) host rings with ten rings (customer computer picks up on tenth ring).

Such a complex ringing pattern allows the customer computer 50 to authenticate that an incoming call is coming from on-line service system 100. Other callers (hackers) would not know the particular ringing pattern that customer computer 50 expects to receive, and thus could not induce the communications interrupt handler 554 to answer the incoming call. This also allows the communication line to be used for voice communications without concern that customer computer modem 80 will answer. For added security, it is possible for on-line service system 100 to alter the expected call pattern parameters within data block 624 each time the on-line service system establishes contact with customer computer 50. The example above is just that—only an example of one possible ringing pattern that might be used. While any number of calls and any number of rings can be used to specify the pattern, the call on which the customer computer 50 answers cannot be specified in terms of exact number of rings but only "within at least x number of rings." For this reason, it is desirable for an optimum level of security that each ringing pattern consist of at least two different calls from on-line service system 100 to permit the customer computer 50 to detect: (a) a particular number of rings in the first call; and (b) a time interval between the first call and the second call.

As mentioned above, decision block 560 compares the ringing pattern received on modem 80 with the prestored ringing pattern parameters within data block 624. If there is no match, communications interrupt handler routine 554 logs the error and resets the pattern store established by block 558 (block 562). If there is a match, on the other hand ("yes" exit of decision block 560), communications interrupt 554 sets the modem 80 to "auto answer" mode (block 564) and then returns (block 566). Modem 80 will then automatically answer the line the next time it rings, and this will again invoke the communications handler 554. On this invocation of communications handler 554, the test of decision block 556 will fail because the communications interrupt handler was not invoked by ringing received on the modem ("no" exit to decision block 556). Then communications interrupt handler 554 tests for answer received on modem. If modem 80 has not answered the telephone line ("no" exit to decision block 568), then communications handler 554 returns. Since now modem 80 will have answered the telephone line ("yes" exit to decision block 568), communications handler 554 then determines whether an access code has been received by modem 80 (this "access code" may comprise a set of digital bits specifying a unique combination specifying why on-line service system 100 has called customer computer 50) (decision block 570). If no access code has been received, then communications interrupt handler 554 assumes that the reason on-line service system 100 was calling was to schedule a subsequent on-line connection to be established by customer computer 50 ("no" exit to decision block 570). In this circumstance, communications interrupt handler 554 sets data block 616 to within on-line service control data table 501 to trigger an on-line session (block 572), and then hangs up the modem 80 (block 577). This arrangement in the preferred embodiment of requiring customer computer 50 to "dial back" the on-line service system 100 in response to a contact initiated by the on-line service system provides an added degree of security. The on-line service system 100 can time the interval which passes between when it called customer computer 50 and when it receives a call in order to authenticate that the call is coming from that particular customer computer.

If on-line service system 100 sends an access code ("yes" exit to decision block 570), communications interrupt handler 554 tests whether the received access code is valid (decision block 574). If the received access code is invalid, communications interrupt handler 554 logs an error and resets the pattern store (block 575). On the other hand, if the received access code is valid ("yes" exit to decision block 574), the communications interrupt handler performs a response based on the particular access code (block 576). For example, one access code may require customer computer 50 to immediately initiate a call back to on-line service system 100. Another access code (a range of access codes) may simply require the customer computer 50 to display information (e.g., a completion message or mail waiting message) to alert the customer that he should initiate manually a call to on-line service system 100 in order to retrieve processing results, electronic mail, etc. This "access code" feature provided by the present invention is thus very useful in allowing limited communications to occur between on-line service system 100 and customer computer 50 with very little overhead and yet with a relatively high degree of safety.

Figure 13:
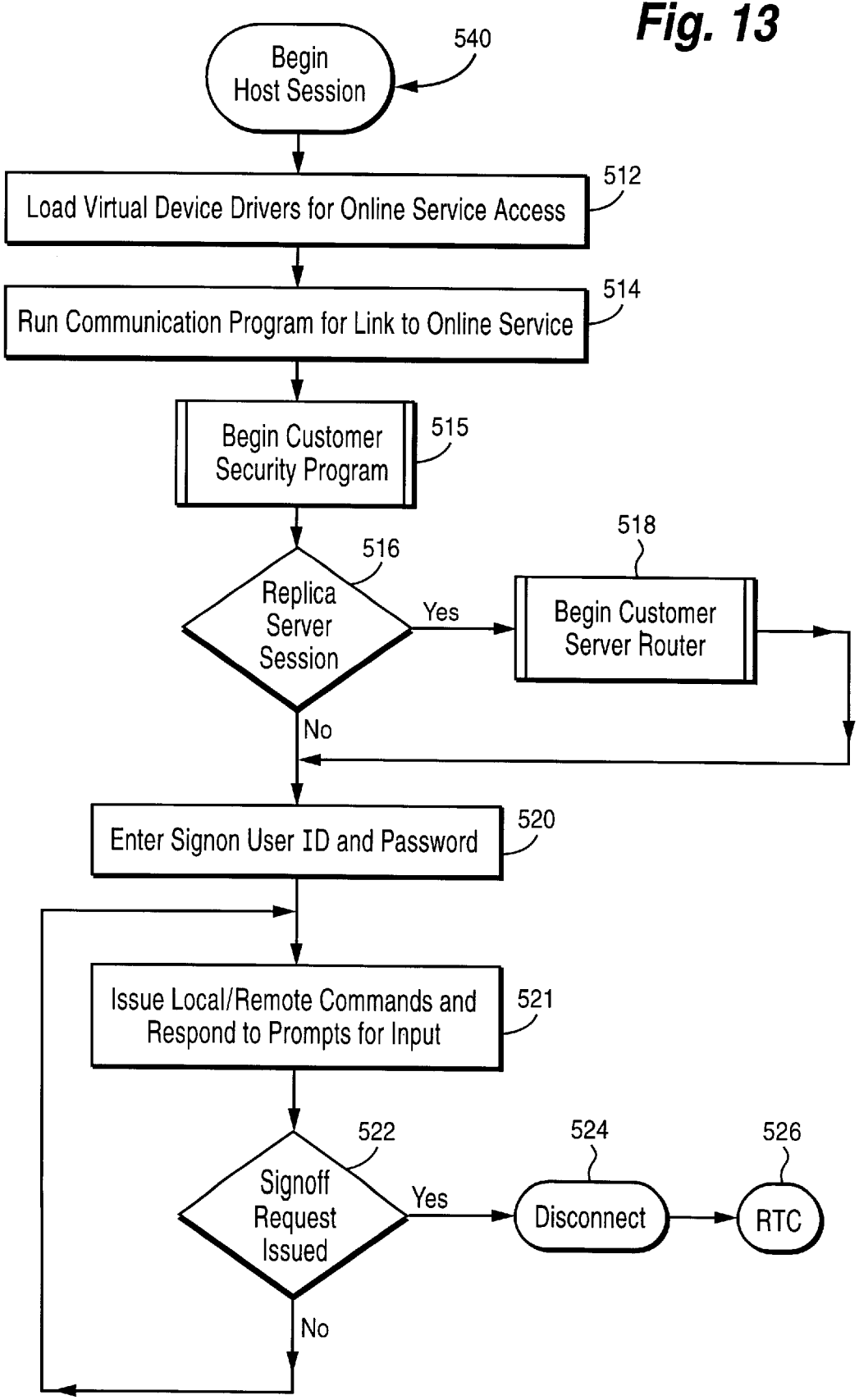
FIG. 13 is a schematic flowchart of exemplary tasks performed by the customer computer during an on-line session with the on-line service system in the preferred embodiment.

FIG. 13 is a flowchart of exemplary program control steps performed by customer computer 50 to initiate an on-line session with on-line service system 100. As can be seen from FIGS. 12A and 12B, in the preferred embodiment this on-line session can be initiated either manually when the customer depresses an "hot key" sequence on keyboard 56, or automatically at a prescheduled time in response to scheduling information stored within control data table 501. To begin a host session, customer computer 50 first loads the appropriate device drivers for virtual disk access into its memory 66 that are required to attach to on-line service system 100 with virtual device access (block 512). A communications routine for linking to on-line service system 100 is then performed (block 514). The Customer Security Program (routine 590 in FIG. 15) is then started (block 515). In the preferred embodiment, all on-line service access is controlled by an on-line service session program including requests for the customer computer 50 command prompt. The customer may be accessing her computer 50 normally, but the customer is actually under control of an on-line service program in the preferred embodiment. During this procedure, the customer computer determines whether a replica computer session is required (decision block 516). If a replica computer session is required ("yes" exit to block 516), then customer computer 50 begins a replica server routine 518 in order to establish connection with the customer replica service computer 160 via data link 150 and modem 162 (block 518). Otherwise, connection is established via data link 150 with on-line service host computer 104 via modem 102 ("no" exit to block 516). The customer enters user ID and password in block 520. The customer computer 50 during such communication responds to prompts and request options from the on-line service (block 521). This continues until a sign-off request is issued by either the customer or on-line service system 100 (as tested for by decision block 522). When a sign-off request is issued, the customer computer 50 automatically disconnects (block 524) and returns control to the operating system again (block 526).

Figure 14A:
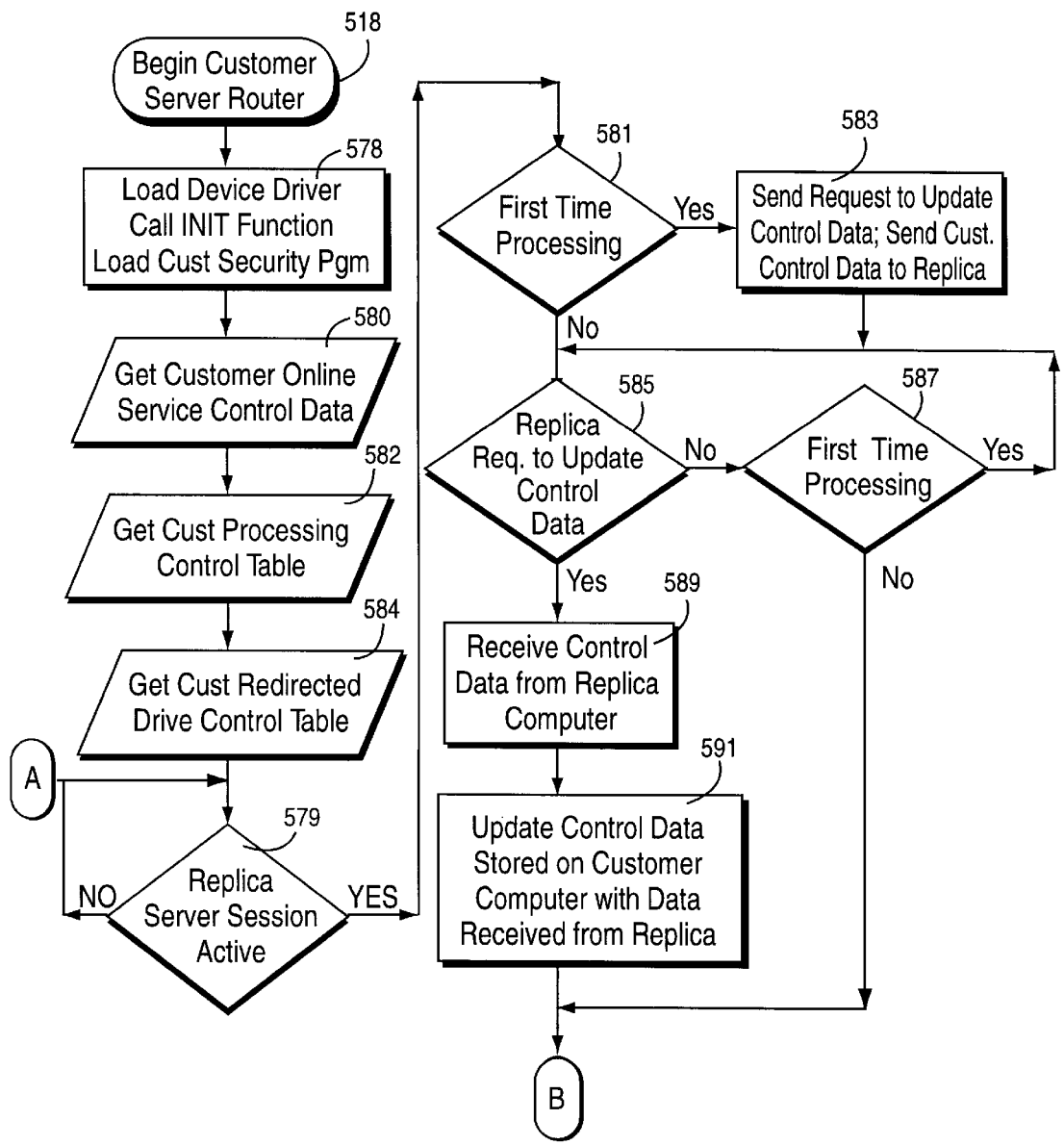
FIGS. 14A–14H are more detailed schematic flowcharts of the "begin customer server router" block of FIG. 13.

FIGS. 14A–14H are together a flowchart of exemplary program control steps performed by customer computer 50 at FIG. 13, block 518 to establish a connection with replica computer 160. This routine 518 is performed when customer computer 50 determines that it is to establish a connection with replica computer 160 via modem 162 and data link 150, and executes for the duration of such a connection. Referring to FIG. 14A, customer computer 50 first loads an appropriate device driver, calls an "initialization" ("INIT") function, and then loads the router user exit security program used to validate access during the on-line session (block 578). The customer computer 50 then retrieves the on-line service control data table 501 (block 580) as well as a processing control table (block 582) and a redirected drive control table (block 584).

The processing control table 800 (which is shown in FIG. 16B) includes various stored parameters associated with establishing a connection with replica computer 160. Such parameters include, for example, a processor flag 802, a command local flag 804, a processor in use flag 806, a customer processor command prompt drive designator 808, a replica processor command prompt drive designator 810, a drive designator translation on command line flag 812, a drive translation table 814, a cancel program on processor flag change field 816, a keyboard routing parameter 818, a mouse routing parameter 820, a video routing parameter 822, a print output routing flag 824, a sound input routing flag 826, a sound output routing flag 828, other device routing parameters 830, an escape sequence field 832, a wait for processor flag 833A, and a rerouted processor flag 833B. The processor flag 820 indicates where execution takes place. Initially, the processing control table 800 is set from customer control data entry and based on default values. It will dynamically change when command prompt drive change occurs if the redirected drive control entry says "YES" in set default processor flag field. The "command Local" flag 804 exists in a table on both customer and replica. It identifies where commands actually originated so that command line translation will not occur twice (on originating and destination processor for command). The "Processor in Use" flag 806 is set when command begins. It is cleared when command ends. The customer processor command prompt drive designator 808 indicates the system drive customer computer is currently set to. The replica processor command prompt drive designator 810 indicates the system drive replica computer is currently set to. The drive translation on command line field 812 specifies whether drive letters found on the command line are changed before command routing/execution. In the preferred embodiment, many of the inputs and outputs of customer computer processor 68 may automatically be routed to/from replica computer 160 for handling. Thus, for example, it is possible to automatically route all keystrokes inputted on customer computer 50 keyboard 56 to replica computer 160, and for to automatically reroute all display generated by the replica computer 160 to customer computer monitor 54. Processing control table 800 controls these and other functions.

Figure 16C:
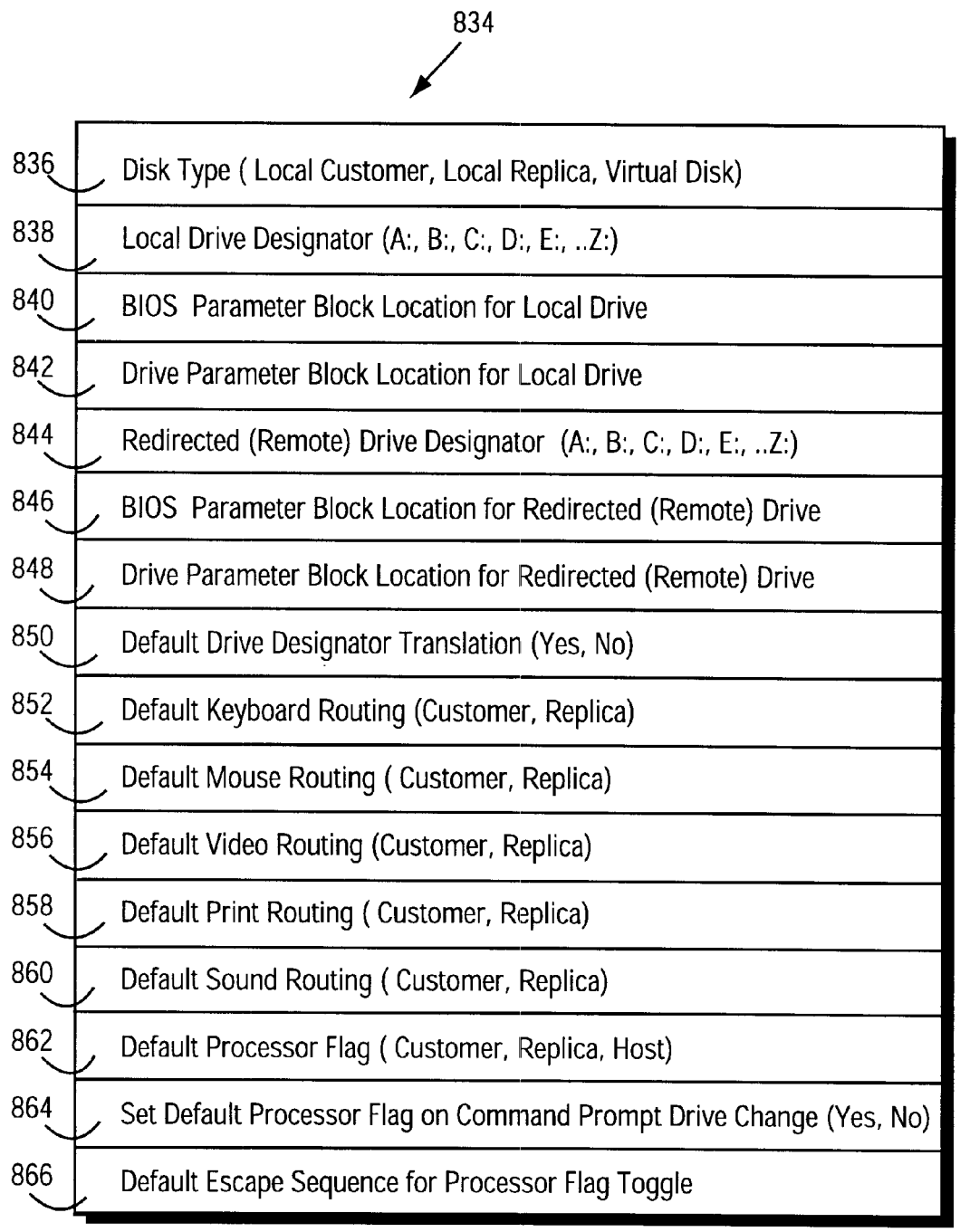

The redirected drive control table 834 is schematically shown in FIG. 16C. The redirected drive control table 834 controls the redirection of virtual and physical drives in the preferred embodiment. An exemplary format for the redirected drive control table 834 in FIG. 16C includes a disk type field 836, a local drive designator field 838, a BIOS parameter block locator for the local drive 840, a drive parameter block locator for local drive 842, a redirected remote drive designator 844, a BIOS parameter block locator for redirected remote drive 846, a drive parameter block locator for redirected remote drive 848, a default drive designator translation flag 850, a default keyboard routing flag 852, a default mouse routing flag 854, a default video routing flag 856, a default print routing flag 858, a default sound routing flag 860, a default processor flag 862, a set default processor flag on command prompt drive change flag 864, and a default escape sequence for processor flag toggle 866. The redirected drive control table 834 includes some default information for loading into processing control table 800 (e.g., fields 852–866 get loaded into processing control table fields 818–832), and also includes additional information about how various virtual and physical drives are to be designated within the environment of customer computer 50.

Referring again to FIG. 14A, once the customer computer 50 has retrieved/constructed its basic data structures (blocks 580–584), it waits for a replica server session to become active (decision block 579). Once a session becomes active, the customer computer 50 tests whether such processing is being performed for the first time within the current on-line session (decision block 581). If it is first time processing ("yes" to decision block 581), then the customer computer sends a request to the replica computer 160 to update the customer computer control data block stored by the replica, and then sends its customer computer on-line service control data block (FIG. 16A) to the replica (block 583). Otherwise, it is not first time processing ("no" exit to decision block 581), and control proceeds to decision block 585 to test for a replica request to update control data. Customer computer 50 then determines whether the replica computer has requested to update control data (block 585), or if the replica is supposed to provide such an update due to first time processing within this on-line session (decision blocks 585, 587). Referring now to decision blocks 585 and 587, if a replica request to update control data has not been received ("no" exit to block 585), then decision block 587 is tested for first time processing. The "yes" exit for decision block 587 is looped until a replica request to update control data is received. If no update was received from the replica computer 160 (block 585) and this is not first time processing ("no" exit to decision block 587), then control proceeds to block 593A of FIG. 14B to check for a replica device configuration request. Assuming the replica has asked to, or is supposed to, send control data ("yes" exit to decision block 585), the customer computer receives the control data (block 589) and uses it to update its own control data block as shown in FIG. 16A, 16B (block 591).

Figure 14B:
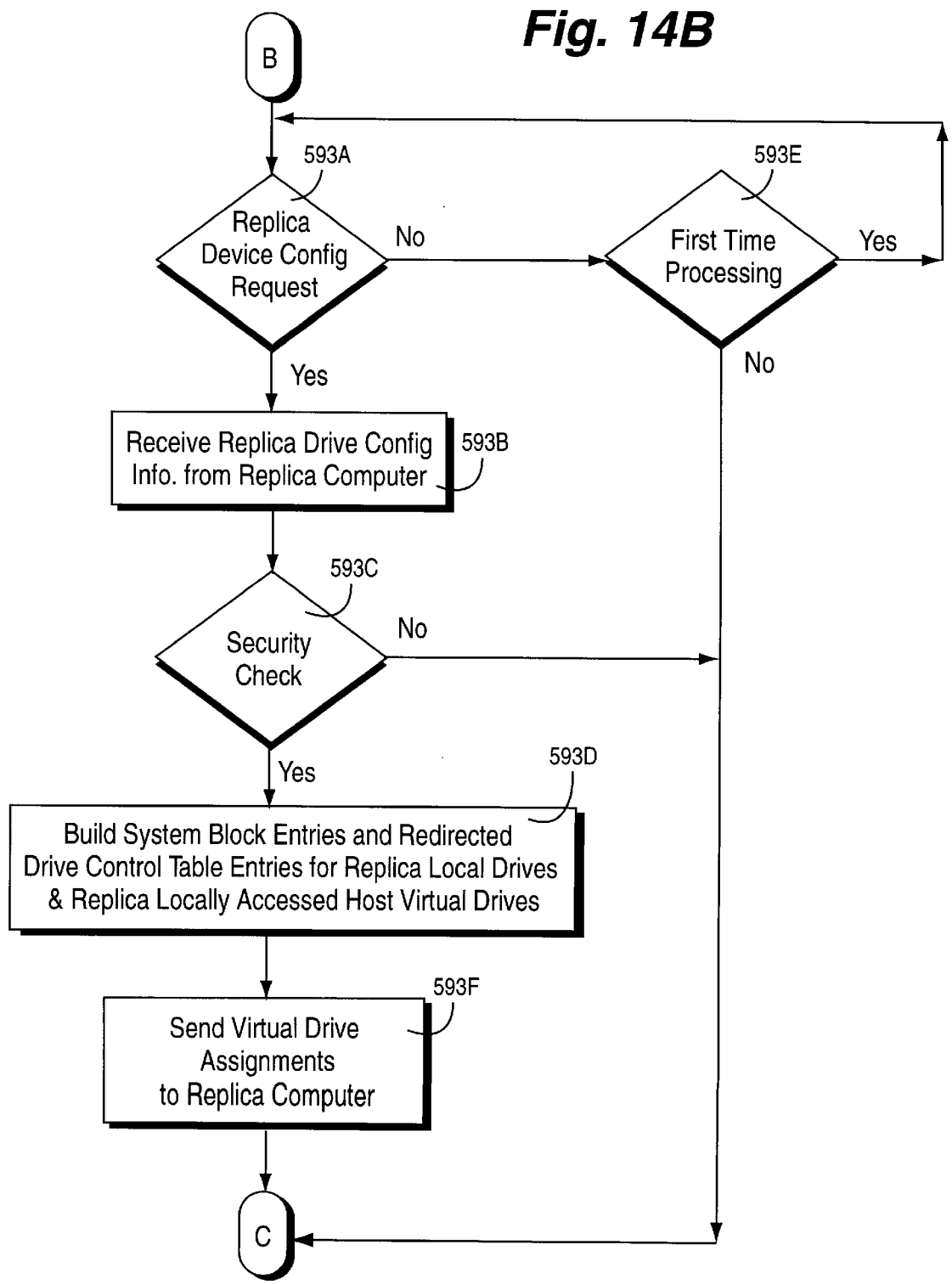

Referring now to FIG. 14B, similar procedures are performed to receive replica drive configuration information (blocks 593A, 593E, 593B), from which the customer computer builds its redirected drive control table 834 and drive translation table (see FIGS. 16B and 16C) (block 593D). Referring now to decision blocks 593A and 593E, if a replica device configuration request has not been received ("no" exit to block 593A), then decision block 593E is tested for first time processing. The "yes" exit for decision block 593E is looped until a replica device configuration request is received during this first time processing cycle. If no device configuration request was received from the replica computer 160 (block 593A) and this is not first time processing ("no" exit to decision block 593E), then control proceeds to block 598 of FIG. 14C to check for a customer device configuration change. Now if a device configuration request is received from the replica computer 160 ("yes" exit to decision block 593A), then the replica drive configuration information is received from the replica computer 160 (block 593B). Next, routine 518 performs the customer security program 590 (block 593C) to validate the request.

If the replica drive configuration request is not allowed ("no" exit to security check decision block 593C), then the configuration request is bypassed and control proceeds to block 598. Assuming the request is allowed ("yes" exit to security check decision block 593C), routine 518 uses the drive configuration information and on-line service control defaults to build a new redirected drive control table 834, an BIOS parameter block and drive parameter block entries for replica local disk drives and replica locally accessed virtual disk drives (block 593D). The customer computer 50 also sends its virtual drive assignments to the replica computer 160 (block 593F) so that the replica computer can construct its own redirected drive control table and drive translation table.

The redirected drive control table changes when the command prompt changes in the preferred embodiment. Thus, in the preferred embodiment a customer can access his local environment from one prompt (e.g., "L:"), and change to accessing a "virtual" on-line environment by simply detecting a different command prompt (e.g., "E:"). The on-line service control data processor flag 649A (see FIG. 16A) determines processor control table 800 active entries at session startup. When the user selects a different drive, this changes the processing control table active entry only when flag 864 (FIG. 16C) is "yes." Block 584 loads the redirected drive control table 834 into customer computer memory 66, with entries for local drives only. These entries do no yet have information used to determine the replica equivalent drive designator (e.g., "E:" means replica). Block 589 provides relevant information about virtual disks provided by the replica computer 160. Block 593D builds the redirected drive table entries for replica physical drives (e.g., creating a drive parameter block used by the personal computer operating system to identify a BIOS parameter block to identify the location of the data management program used to access the device identified by the BIOS parameter block (physical and logical drive characteristics).

Figure 14C:
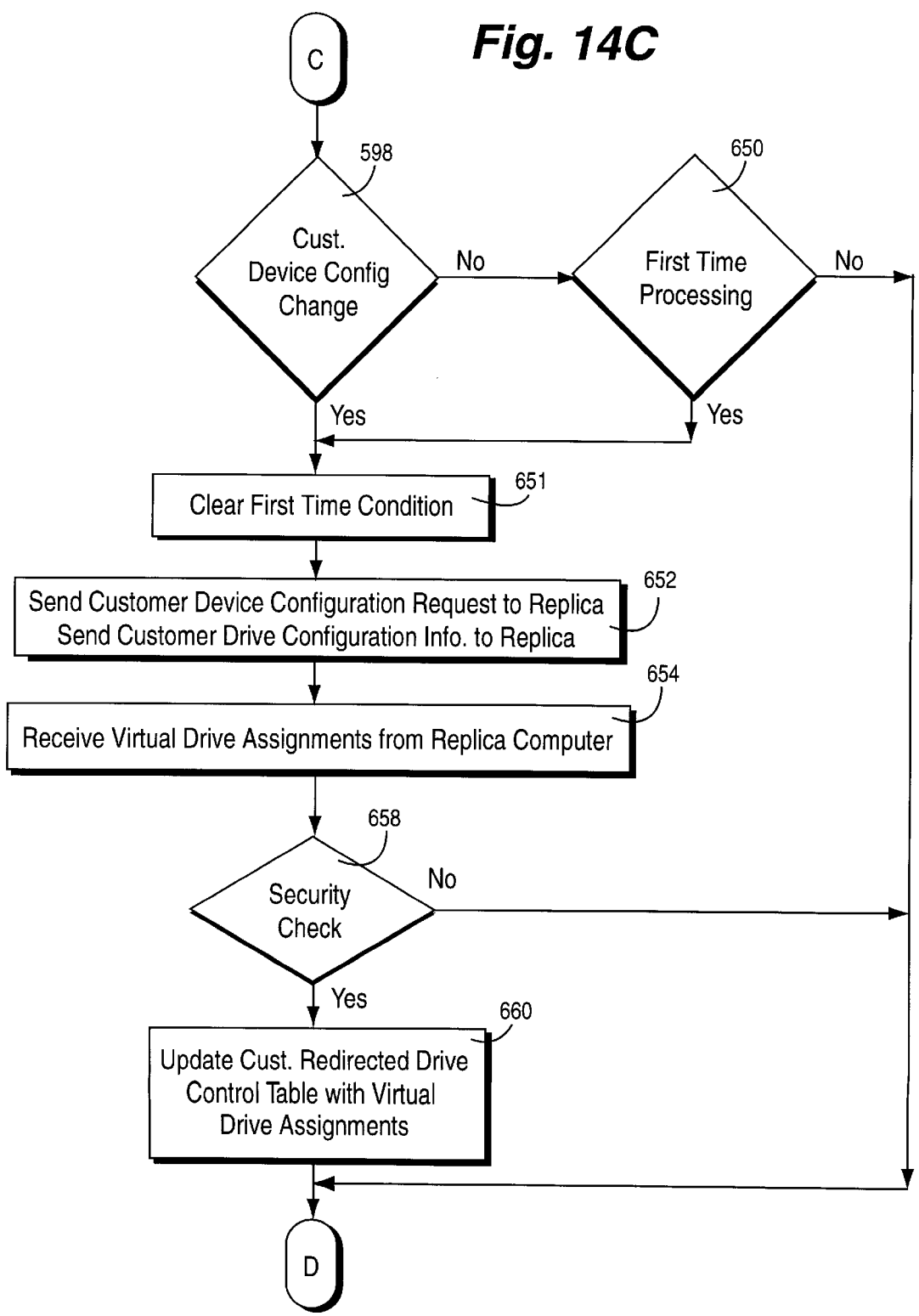

Referring now to FIG. 14C, routine 518 next tests whether the customer has requested a device configuration change (decision block 598). If a change has not been requested ("no" exit to decision block 598), and this is not first time processing ("no" exit to decision block 650), then the change request is bypassed and control proceeds to test for a replica request for customer data (decision block 664 in FIG. 14D). If a change has been requested ("yes" exit to block 598) (or if a change was not requested ("no" exit to block 598) but this is the first time customer computer 50 has ever invoked routine 518 ("yes" exit to decision block 650)), then routine 518 sends a device configuration request and the local drive information corresponding to customer computer 50 to replica computer 160 (block 652). Block 651 is performed to clear the first time condition. In response, customer computer 50 receives redirected customer drive information from the replica computer (block 654). Routine 518 then performs the customer security program 590 (block 658) to validate the request. If the request is not allowed ("no" exit to decision block 658), then the update is bypassed and control proceeds to block 664 in FIG. 14D to test for a customer device configuration change. If the function is allowed ("yes" exit to-decision block 658), then customer computer 50 uses the received redirected customer drive information and on-line service control data to update redirected drive control entries for customer local drives with the replica equivalent drive designator within the redirected drive control table 834 (block 660).

Figure 14D:
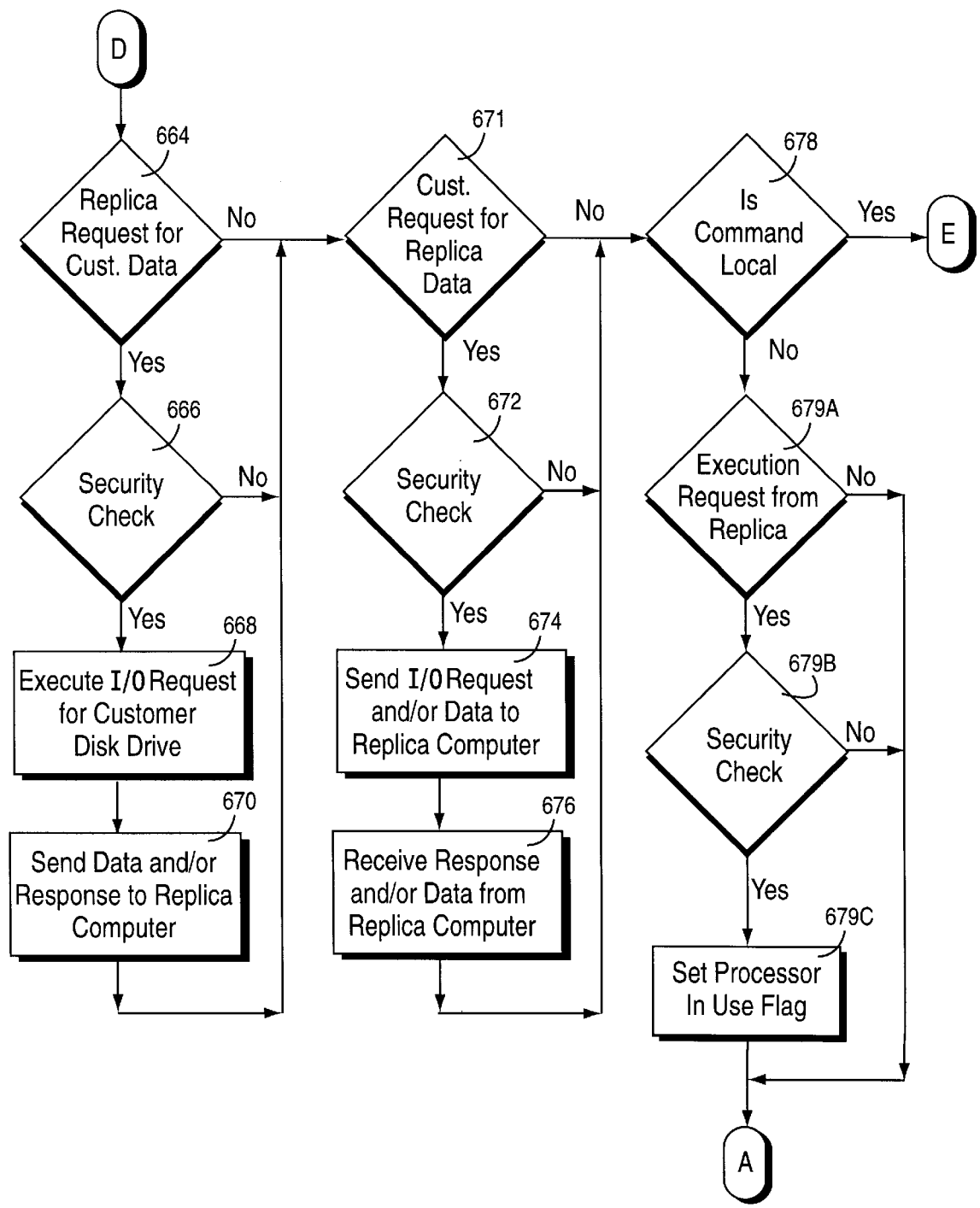
Figure 14E:
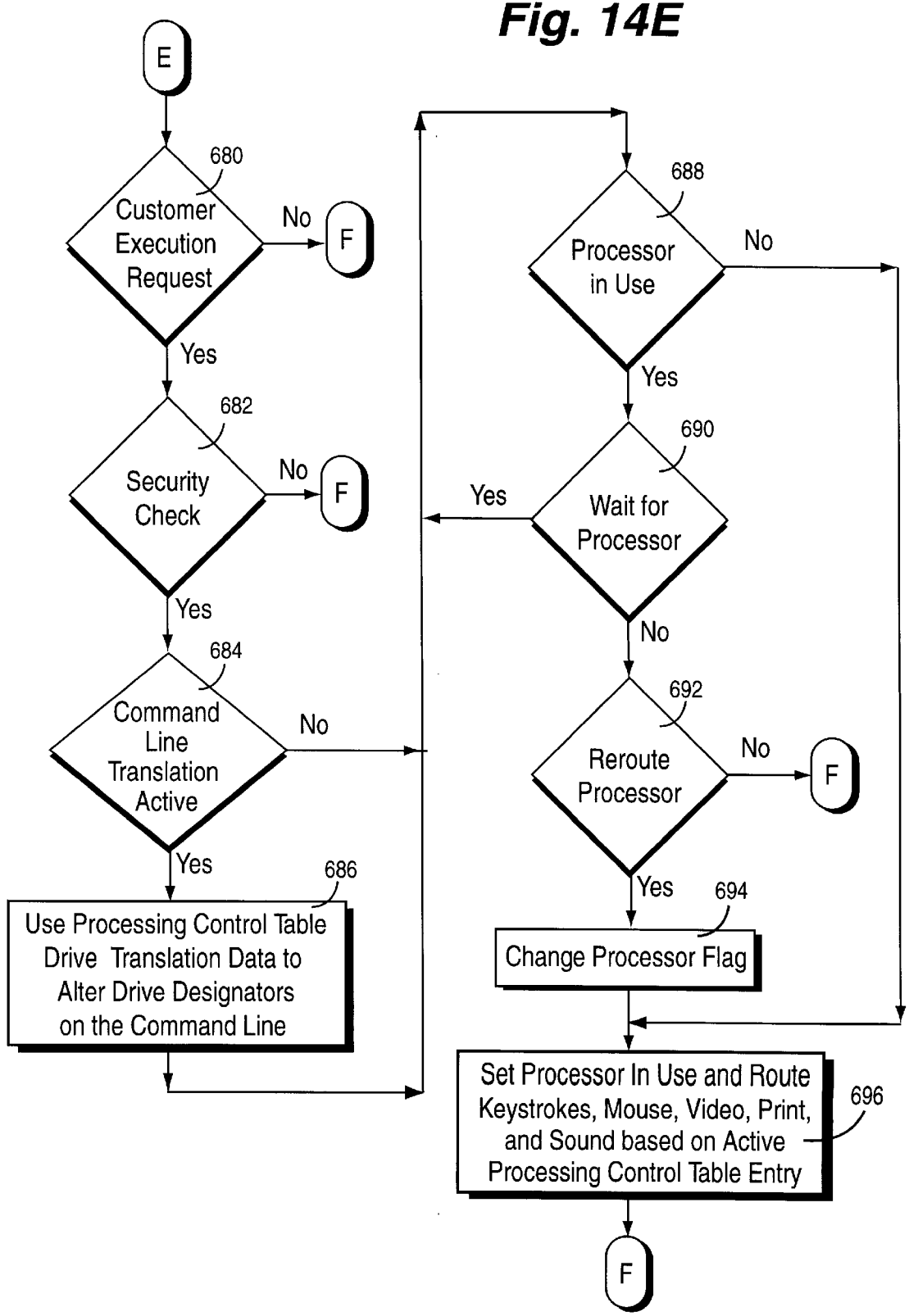
Figure 14F:
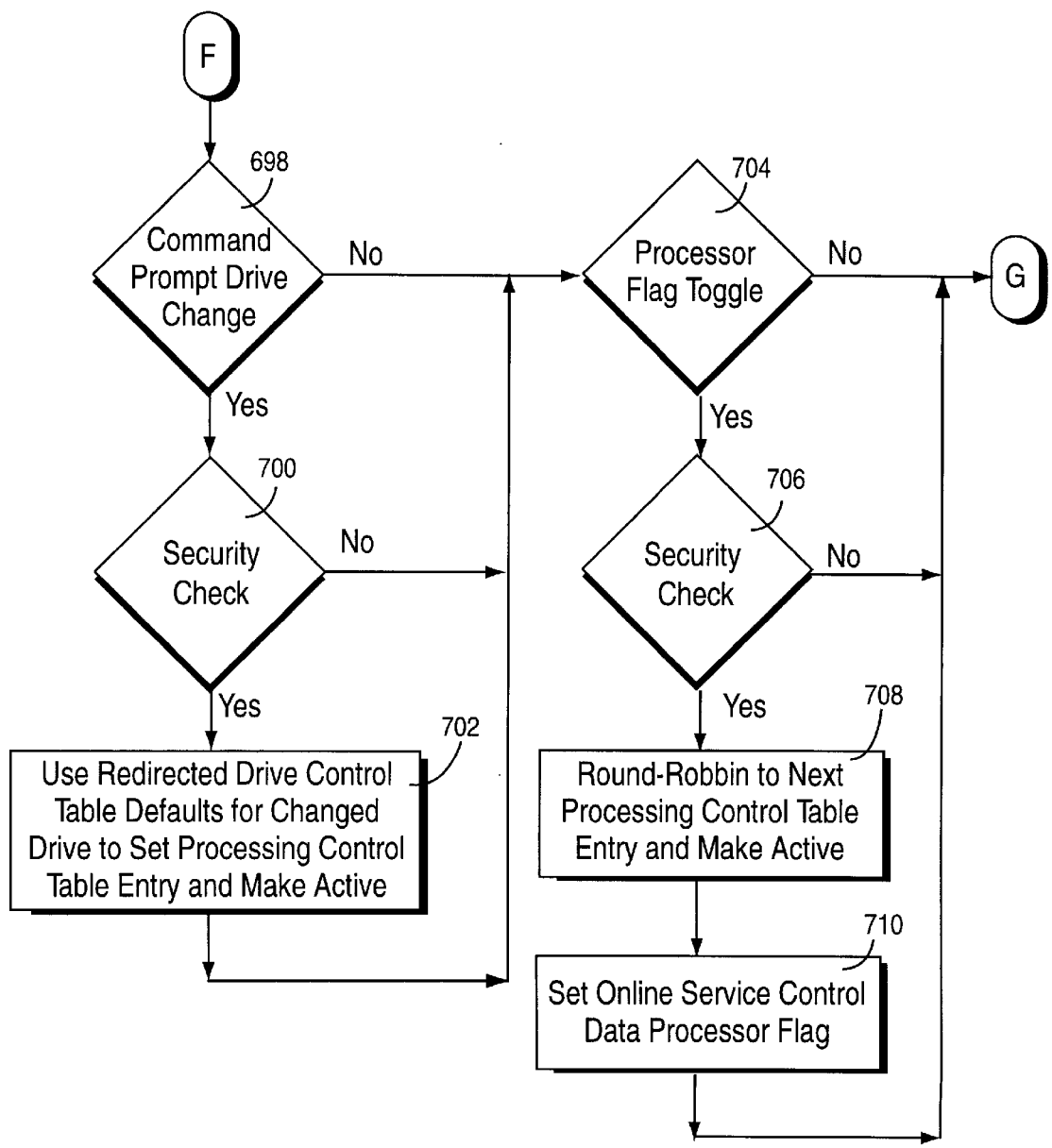

Referring to FIG. 14D, routine 518 determines whether the replica computer 160 has made a request for data stored on customer computer 50 (decision block 664). If so, the customer security program 590 is performed to validate the request, and if the function is validated (decision block 666), then the data is actually transferred from the customer computer 50 to the replica computer 160 by executing an I/O request for the appropriate customer computer disk drive 64, 60a (block 668) and sending the data and/or response to the replica computer 160 (block 670). Once the request is completed (block 670), or if the replica computer 160 has not made a request for data stored on the customer computer 50 ("no" exit to block 664), or in the case where a request was issued ("yes" exit to decision block 664) but the security check determines the request is not allowed ("no" exit to decision block 666), then control proceeds to test for a customer request for replica data (block 671).

If there is a request for data stored on replica computer 160 to be transferred to customer computer 50 (block 671), the customer security program is performed to validate the request, and if the function is validated (block 672), then the data is actually transferred by executing an I/O request and/or data to the replica computer 160 (block 674) and receiving the response and/or data from the replica computer to the customer computer (block 676). Once the request is completed (block 676), or if the customer computer 50 has not made a request for data stored on the replica computer 160 ("no" exit to block 671), or in the case where a request was issued ("yes" exit to decision block 672) but the security check determines the request is not allowed ("no" exit to decision block 672), then control proceeds to test whether a command has been issued locally (block 678).

Decision block 678 tests whether a command has been initiated locally or remotely. If the command is not "local" ("no" exits to decision block 678), then the command was issued by the replica computer 160 and blocks 679A–679C are performed to handle a request from the replica computer. Decision block 679A tests whether the replica computer 160 requested execution in the customer computer 50. If not, blocks 679B and 679C are skipped. If the replica did request customer computer execution, decision block 679B makes sure the replica computer 160 is allowed to invoke execution of this table on the customer computer 50. If it is allowed, block 679C sets the "processor in use" flag 806 (see FIG. 16B) to indicate that the customer computer processor is in use, and the customer computer executes the task based on commands provided by the replica computer 160 to the keyboard buffer of the customer computer. Now if the request is not allowed ("no" exit to decision block 679B), or if there has been a local command ("yes" exit to decision block 678), then control proceeds to FIG. 14E decision block 680 where there is a test to determine whether the command is a customer execution request. If it is ("yes" exit to decision block 680), the customer security program is performed as part of the security check to validate the request (block 682), and if the function is validated ("yes" exit to-decision block 682), then there is a test to determine if command line translation is active (decision block 684). Command line translation is typically used to change customer drive references to the equivalent replica drive references. This is particularly useful when issuing commands from the customer computer 50 from a replica drive command prompt with the processor flag set for replica execution. For instance, from customer prompt "C:" (local drive), typing "copy C:*.* D:" causes the customer computer to copy its local drive to the (virtual) replica drive. From the customer computer "D:" (replica) prompt with translation active (and processor flag set to replica), on the other hand, the same command "copy C:*.* D:" causes the same action to occur. If command line translation is active ("yes" exit of decision block 684), customer computer 50 uses its processing control table 800 and its drive translation data stored within redirected drive control table 834 to alter drive designators on the command line (block 686). When command line translation is not active ("no" exit to decision block 684), then block 686 is bypassed and drive designators on the command line are left intact. This associates a drive translation table with where execution will be performed. Routine 518 then determines whether the appropriate processor is in use by interrogating the processor in use flag (FIG. 16B, block 806) (decision block 688). If the processor is in use ("yes" exit to decision block 688), routine 518 accesses processor control table entries 833A, 833B to determine whether it should wait for the processor (decision block 690) or to reroute the processor (decision block 692). If it is determined that routine 518 should wait for the processor ("yes" exit to decision block 690), then control loops back to decision block 688 until the processor is available. If routine 518 should not wait for processor ("no" exit to decision block 690), and if the processor is rerouted ("yes" exit to decision block 692), the processor flag 649A within on-line service control table 501 is changed to reflect the appropriate processor to which the task has been routed (block 694). Once a processor is available to perform the task, routine 518 sets the processor in use flag 806, and routes the keystrokes, mouse, video, print, and sound based upon the active processing control table entries 818–830 (block 696). In such cases as when a customer execution request was not issued ("no" exit to decision block 680), or when the request was issued but not allowed ("no" exit to decision block 682), or when a valid execution request was issued ("yes" to blocks 680 and 682) but the processor is in use ("yes" to block 688) but the routine is not to wait for processor ("no" to block 690) and the reroute processor option is not allowed ("no" to decision block 692), then blocks 694 and 696 are bypassed. Control then proceeds to FIG. 14F decision block 698, which tests whether a command prompt drive is to be changed. If it is ("yes" exit to decision block 698), the customer security program is performed to validate the request as part of security check (block 700), and if the function is validated ("yes" exit to decision block 700), then the redirected drive control table 834 is accessed and if defaults are to be set (field 864 is YES), then the associated default values for the changed drive (see field 864, 850–860) are set within the processing control table 800, fields 808, 812, 818–832 and the default processor flag (field 862) on the redirected drive control table 834 is used to set the processor flag (field 649A) on the on-line service control data 501 (block 702). If the command prompt is not to be changed ("no" exit to decision block 698), or if the command prompt change is not allowed ("no" exit to decision block 700), then the processing control table is not changed (block 702 is bypassed), and control proceeds to block 704 to test for a processor flag toggle.

Figure 25A:
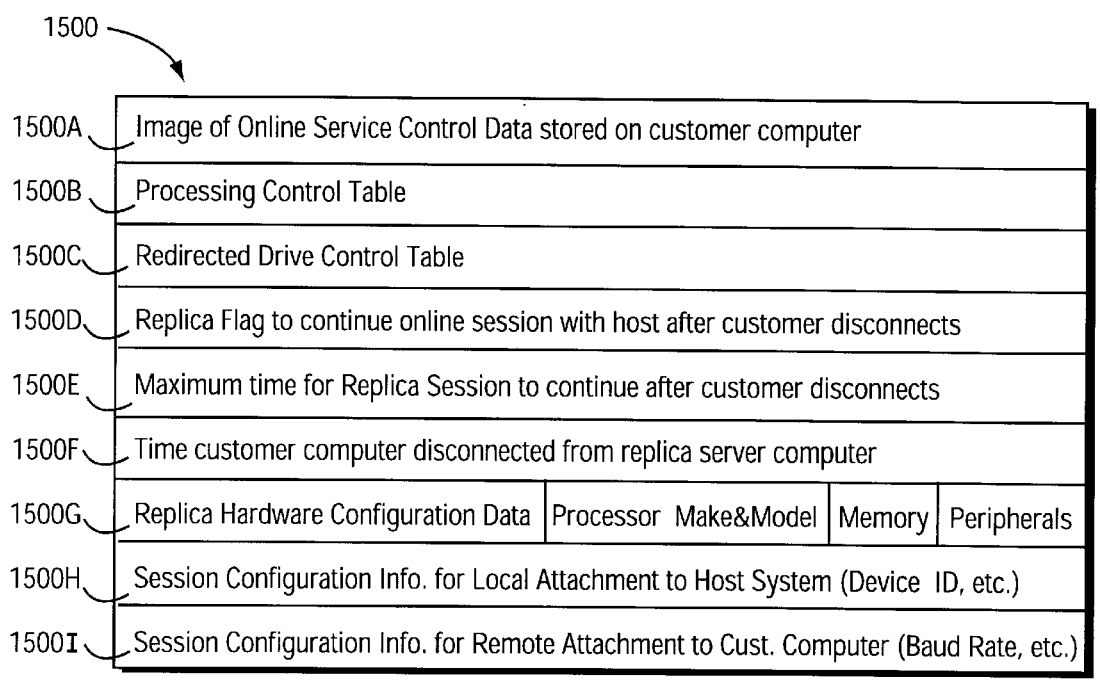
FIG. 25A schematically illustrates exemplary data structures stored by the replica computer in the preferred embodiment.

Routine 518 then tests whether there is a processor flag toggle (decision block 704). If there is ("yes" exit to decision block 704), the customer security program is performed as part of security check (block 706), the function is validated (decision block 706), and if allowed ("yes" exit to decision block 706), then a "round robin" processing to the next processing control table entry field is performed (block 708) from which the on-line service control data 501 processor flag 649A is then set (block 710). If the processor flag was not toggled ("no" exit to decision block 704, or if the processor flag toggle is not allowed ("no" exit to decision block 706), then the "round robin" to the next processing control table entry (block 708) and the step of setting the processor flag (block 710) are bypassed and control proceeds to block 712 of FIG. 14G to test for a toggle in keyboard input. In a replica on-line server session, host computer PC execution commands are directed to the replica computer 160 for execution. The replica computer treats these commands as originating locally and directs the command to execute in the customer or replica processor based on the processor flag stored on the replica on-line service control data (FIG. 25A, block 1500A). In the case of commands keyed from a personal computer command prompt by the customer, they are directed based on the processor flag stored on the customer computer. In the case of commands keyed from a personal computer command prompt by the replica (by on-line service personnel providing service or training), they are directed based on the processor flag stored on the replica computer (same as host PC execution commands). For that reason, the processing control table and redirected drive control data, and on-line service control data need to reside on both the customer and replica computers and the processor flag on customer computer on-line service data may not match the processor flag value on the replica computer image of customer computer on-line service data. In any event, much of the configuration activity involves one system setting or changing table values (including processor flag) on the opposing system. The host system, via a PC execution command, may also run a program in the replica or customer computer to change the processing flag in order to achieve the appropriate processor execution or I/O redirection for keyboard, mouse, video and sound.

Figure 14G:
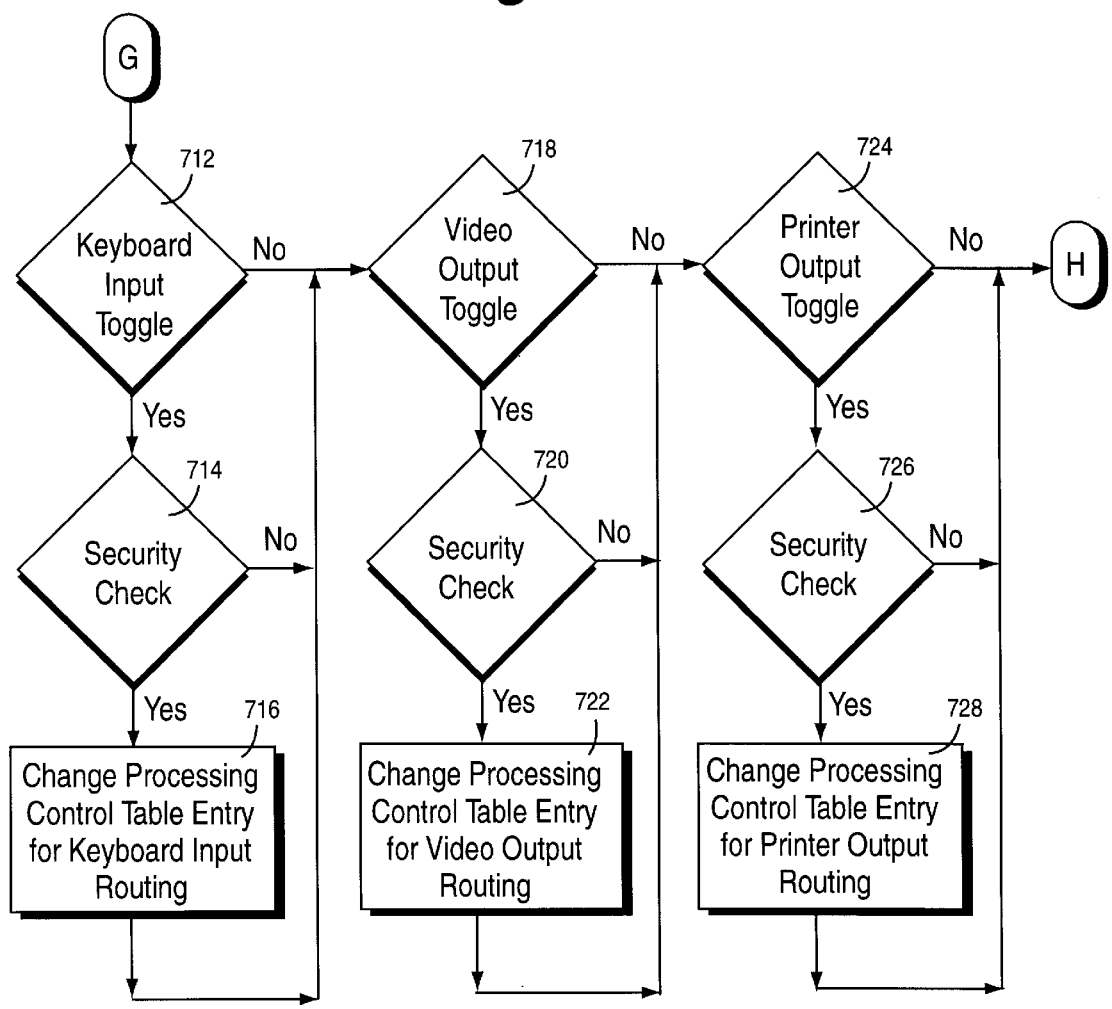
Figure 14H:
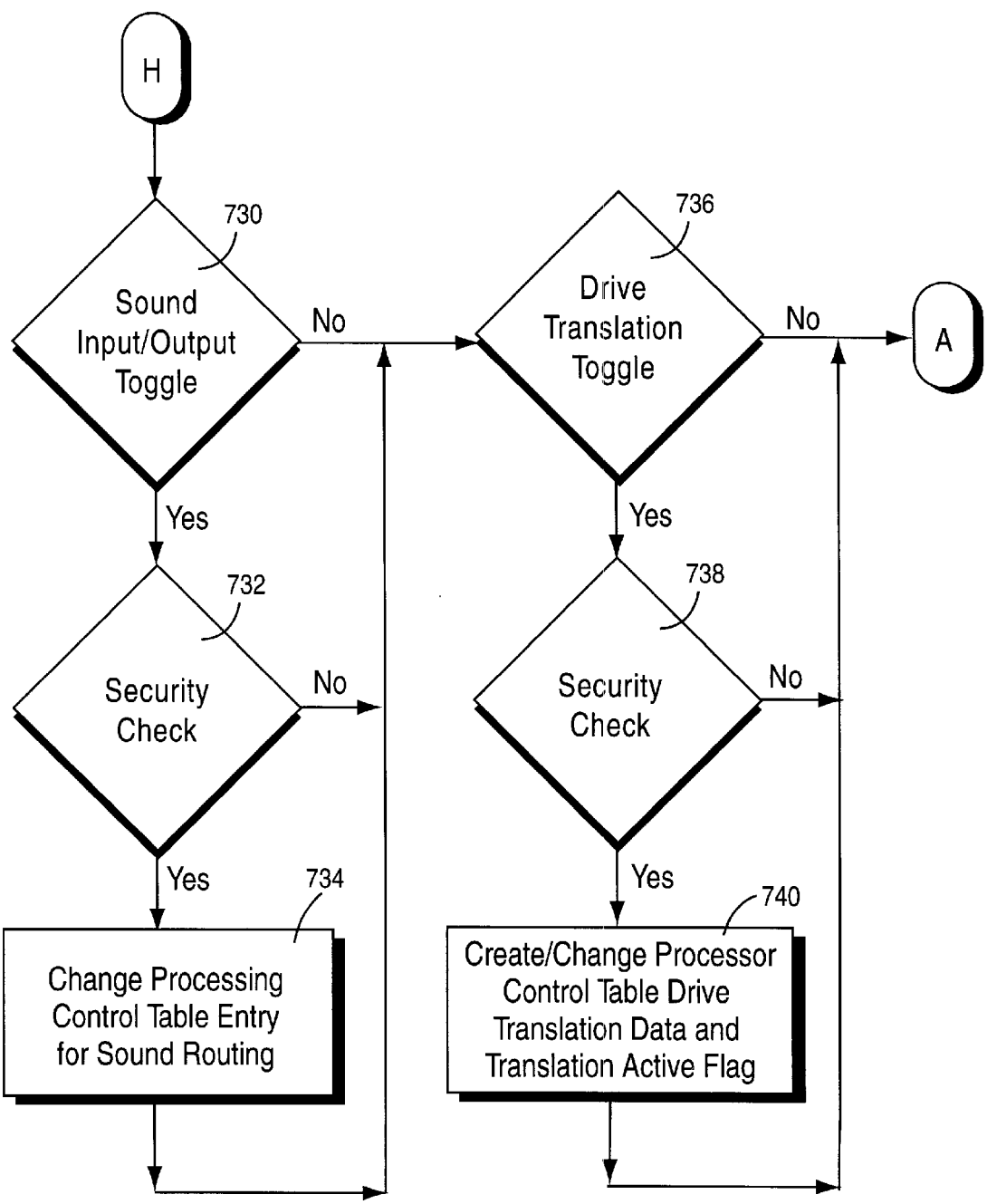

FIG. 14G and FIG. 14H show steps 712–740 which tests whether the keyboard input (blocks 712–716), video output (block 718–722), printer output (blocks 724–728), sound input/output (blocks 730–734) or drive translation (blocks 736–740) should be "toggled" (i.e., changed from a current value to a single other alternative value). The result of activating these toggles is to activate the alternate parameter within the processing control table 800. Thus, for example, if decision block 712 determines that the keyboard input is to be toggled, then block 716 changes the value of processing control table entry 818 to a value other than the one it was previously set for (i.e., if it was previously set to route the keyboard to customer computer 50, it is changed to route the keyboard instead to replica computer 160, and vice versa). Similarly, block 722 alters the values stored within processing control table field 822, block 728 alters the processing control table field 824, block 734 alters the processing control table field 826, 828, and block 740 alters the value within the processing control table field 812. These toggle tests follow similar logic. First, a toggle request is tested. If the toggle request was not issued ("no" exit to decision blocks 712, 718, 724, 730, 736), then the next toggle request is tested. When a toggle request is issued ("yes" exit to decision blocks 712, 718, 724, 730, 736), then a security check is performed to determine if the toggle request is valid. If the request is not valid ("no" to decision blocks 714, 720, 726, 732, 738), then the next toggle is tested. If the request is valid ("yes" to the security check decision block), then the toggle action is performed.

Figure 15:
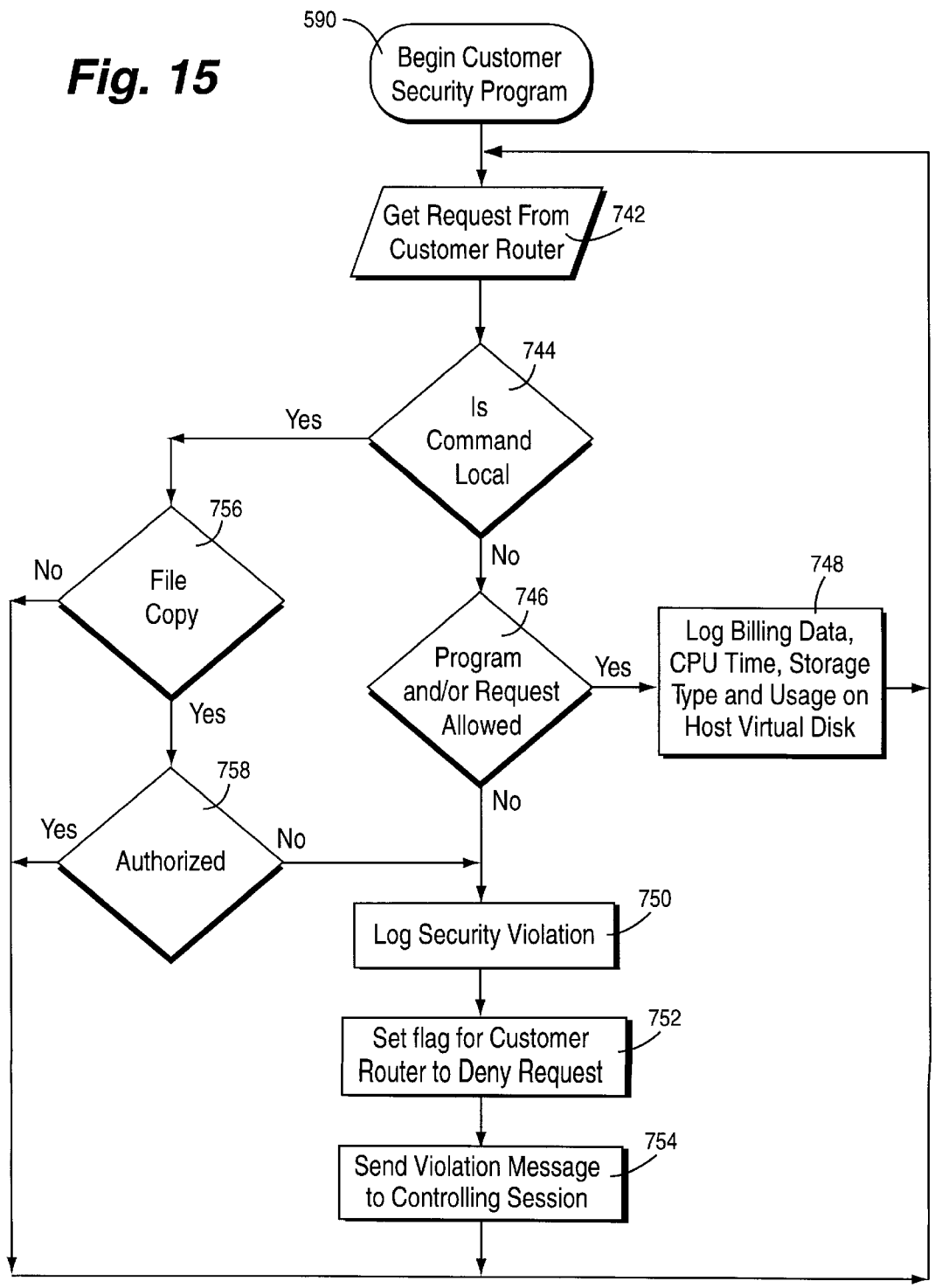
FIG. 15 is a flowchart of exemplary program control steps of the "security check" block of FIGS. 14A–14H.

FIG. 15 is a flowchart of exemplary program control steps performed by customer computer 50 as part of the "customer security program" shown repeatedly in FIGS. 14A–14H.

FIG. 15 is a flowchart of program control steps performed by customer computer 50 to execute the "security check" routine shown in FIGS. 14A–14H. The purpose of the security check is to ensure that only "authorized" tasks are performed. The routine first obtains the command (block 742) and determines whether it was generated locally or by the remote computer (i.e., from the host 104 or the on-line replica 160). If the command is remotely originating (e.g., by a user of the replica computer 160 or by the host 104 via a "PC Execution" command; "no" exit to block 744), then block 746 screens the command to determine whether it is allowed. If the command is allowed, appropriate information is typically logged at the host computer 104 or the replica computer 160 system virtual disk for billing. If the command is not allowed, a security violation is logged at the customer server router 518 (block 750), a flag is set to tell the customer server router 518 to deny the request (block 752) and a violation message is sent to the controlling session (block 754).

If the command was entered by the user of the customer computer 50, it will generally be performed since the user should not be limited in what he can do with his own local computing resources and security checks performed at host 104 and replica computer 160 prevent the customer computer command from creating unauthorized accesses on those computers. There is an important exception, however, in the case of software rental. In instances in which the system 100 attaches a virtual disk to the customer computer 50 containing software that the user of customer computer 50 is only allowed temporary access to, the user could attempt to bypass the resource security to the virtual disk through various techniques. Resource security, which is used by the preferred embodiment AS/400 host 104 to control access to all of its stored "objects," can be used to control access to information within different "virtual drives" provided by the AS/400 host computer 104 to customer computer 50. For each object, resource security can be used to maintain specific or public authority. Specific authority describes the authority of individual users. Public authority describes the authority for all users who do not have specific authority. Resource security applies to each virtual disk drive, and to each object within the drive. The AS/400 supports the following file sharing modes when sharing files:

(a) Compatibility—A file opened in this mode allows no other access to the file. When you use this mode you are the only one who can access the file.
 (b) Deny Read/Write (Exclusive)—A file opened in Deny Read/Write (Exclusive) mode allows you to open the file only once. You are the only one who can access the file, but you can only access it once. You cannot access it a second time from another drive while it is open.
 (c) Deny Read—A filed opened in Deny Read mode allows anyone to access the file and to write to it, but it does not allow anyone to read it.
 (d) Deny Write—A file opened in Deny Write mode allows anyone to open the file and to read it, but Deny Write mode does not allow anyone to write to the file.
 (e) Deny None—A file opened in Deny None mode allows anyone to open the file and to read and write to that file.

Note that the AS/400 security measures do not provide any "execute only" access to objects stored on a virtual disk. Thus, to grant execution rights to customer computer 50 over a particular program stored on a virtual disk, the preferred embodiment host 104 must allow the user authority to read the file. Read authority, in turn, grants a full right to copy the file. This "read" authority could thus be used by an unscrupulous user of customer computer 50 to take a copy of a rental program on a virtual disk without paying the appropriate license fee.

One way to handle the software rental issue is to have the software execute on the customer computer 50 in response to "PC Execution" commands provided by the host computer 104 based on host menu options selected by the customer computer user. The advantage of this approach is that there is never any need for the customer to attach a virtual disk containing the rental software. In effect, the host menu selection causes the software to be downloaded directly into the customer computer memory 66, where the customer computer 50 can execute it. A CL command created with authority to the virtual disk with the rental software is used to access the rental software.

However, since the preferred embodiment also envisions attachment of virtual disks containing rental software, routine 590, blocks 756–758 are used to secure information stored on virtual disk drives so that, for example, the customer computer 50 can execute, but not copy, a program. Since the AS/400 does not provide "execute only" access (i.e., the customer computer can execute the software but cannot copy it), the preferred embodiment software loaded into the customer computer 50 provides an additional "security check" protection for this situation. In particular, block 756 checks whether the customer computer 50 user has requested a copy from a virtual disk. If so, then decision block 758 determines (e.g., based on marker files or other information stored on the virtual disk) whether the request is authorized. If the copy request is not authorized, then the routine 590 blocks the command (block 752) to prevent an unauthorized copy from being made. If the customer computer 50 does not request a copy from a virtual disk ("no" exit to decision block 756), or if a file copy is requested and is authorized ("yes" exit to decision block 758), then security routine 590 takes no action for this security check being performed by customer computer 50.

This copy protection arrangement could still be circumvented by an inventive user of customer computer 50 who copies portions of the executing program out of his computer's memory 66. Accordingly, the preferred embodiment provides additional software executing on the customer computer 50 to prevent this from happening. For example, the software can be executed within a protected area of memory that is erased if unauthorized access is attempted, encryption techniques can be used to make the software useless unless run during an on-line connection with the system 100, and/or various memory access and other activities of customer computer 50 can be continually monitored during software rental (e.g., by monitoring interrupts and/or function calls) to ensure that no unauthorized access is taking place.

IX. Detailed Flowcharts of Exemplary Host Computer Tasks and Data Structures

Figure 17:
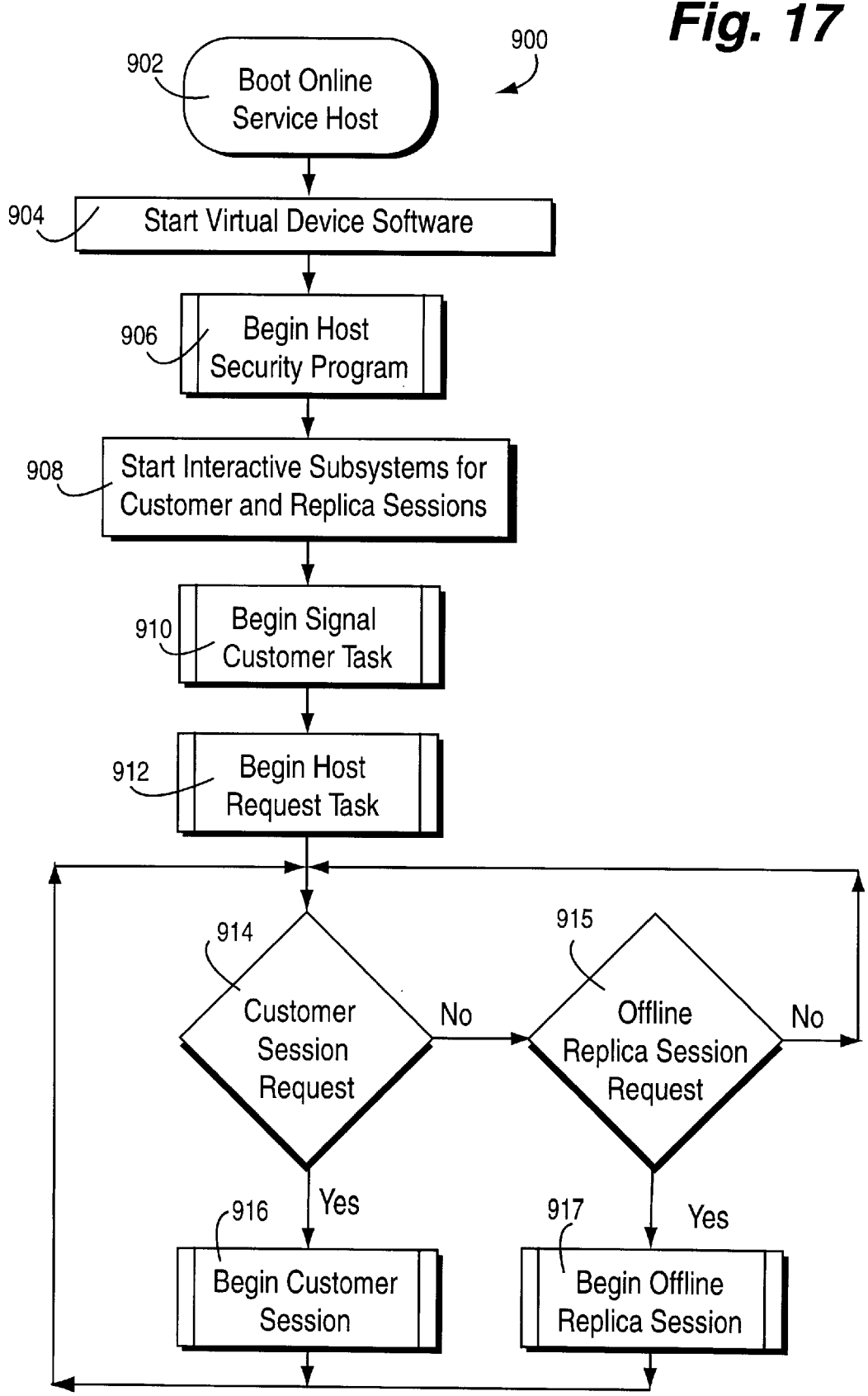
FIG. 17 is a schematic flowchart of exemplary program control steps performed by the host computer in the preferred embodiment.

FIG. 17 is a flowchart of exemplary program control steps performed by the host computer 104 when it is first "booted" or turned on. Beginning at block 902 ("boot"), the host computer starts its virtual device support software (block 904) and then begins a host security program 906 shown in FIG. 18. After the host security program 906 has been started, host computer 104 establishes a link and starts the subsystems for customer and replica on-line service sessions (block 908). Host computer 104 then displays a sign-on screen for either on-line or off-line replica operations as appropriate. Host computer 104 then begins a signal customer task (910) shown in FIGS. 19A–19B. This task signals customers and provides access codes to display messages or to trigger an on-line session at customer computer 50. Host computer 104 then begins a host request task 912 shown in FIGS. 20A–20B. This host request task manages host based requests on behalf of customers, which may be signaled or responded to by generating requests to replica computer 160. Once all of these tasks are in place, host computer 104 enters a loop (block 914, 915) where it is constantly checking and waiting for connects from customer computers 50 and off-line replica computer 160 in order to begin on-line sessions and/or off-line replica computer 160 sessions. When a call comes in, host computer 104 begins an on-line customer session (block 916 shown in more detail in FIGS. 21A–21E). Host computer 104 is multi-tasking so that many different on-line customer sessions may be progressing simultaneously. Similarly, when the off-line replica computer 160 makes a request (block 915), the host computer 104 begins an off-line replica session (block 917).

Figure 18:
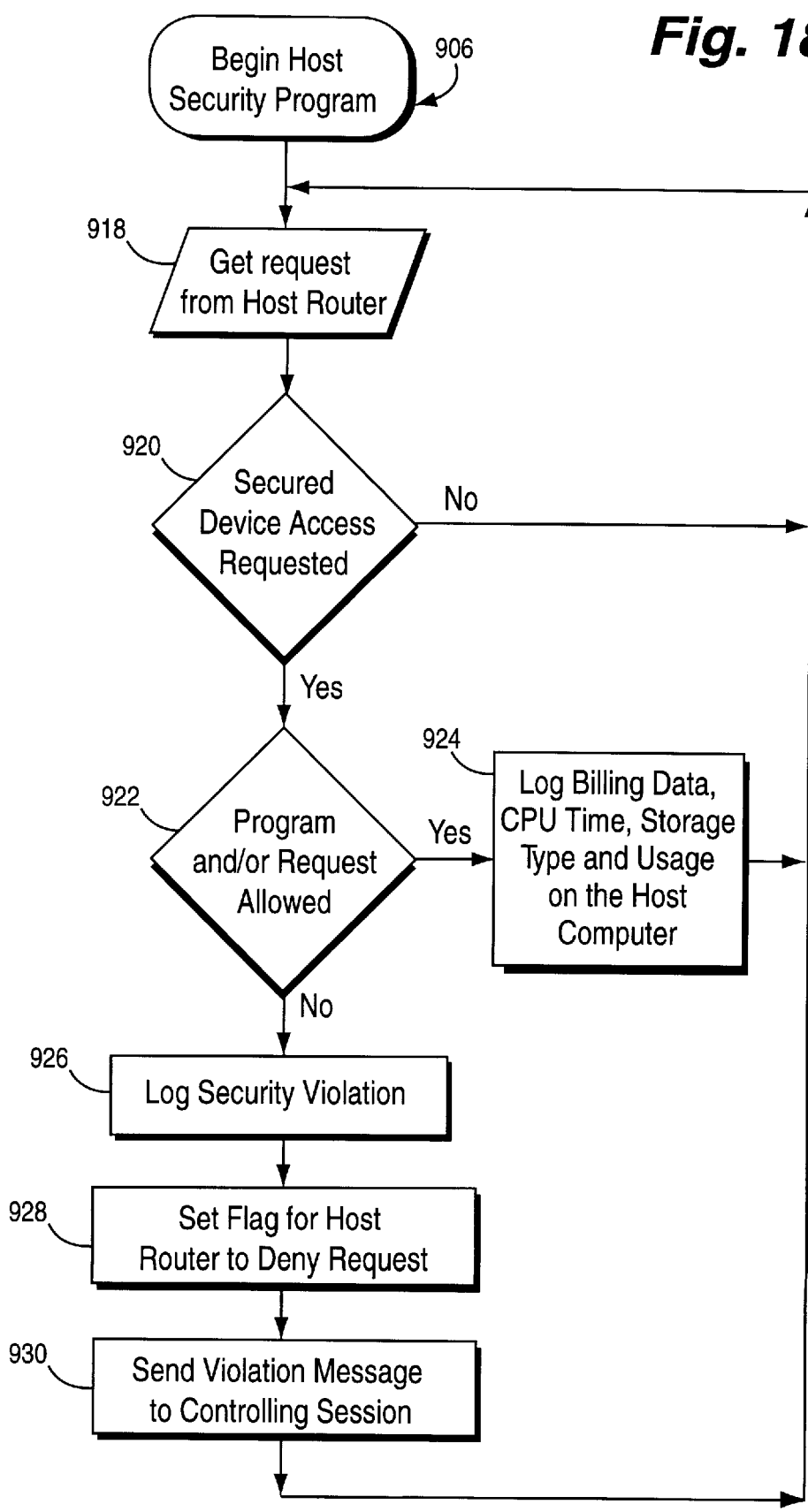
FIG. 18 is a flowchart of exemplary program control steps performed by the "begin host security program" block shown in FIG. 17.

FIG. 18 is a flowchart of exemplary program control steps performed by the host computer 104 as part of the host security program 906. The first step performed is to read requests from the router (block 918). The "router" is a host program used to route personal computer virtual device accesses. The host security program 906 is a user exit program specified under network configuration and is called automatically by the router to validate requests. Decision block 920 then tests whether the customer has requested access to a secured device. If the customer has not requested access to a secured device ("no" exit to decision block 920), then no further action is performed by security routine 590 for this customer. In the preferred embodiment, all access to virtual devices during an on-line session are validated for security (this is in addition to user ID and object resource security). When a customer is running applications within her own customer computer 50 and a request to the host is issued to change to a different "on-line server virtual device" drive or subdirectory, the request is validated for access rights by decision block 920. Routine 906 then determines whether or not the request for a particular program and/or information is going to be allowed (block 922). This test is important for program rental and other secured access, in which case the router requests are validated to restrict programs and requests while attached to certain (virtual device) drives and subdirectories in the preferred embodiment. If access is allowed, then host computer 104 logs billing data, CPU time, storage type and usage to permit billing and audit trails (block 924). If the security check performed by block 922 fails, then host computer 104 logs the security violations (block 926), flags the router to deny access to the requested device (block 928), and sends a violation message to the controlling session (block 930).

Figure 19A:
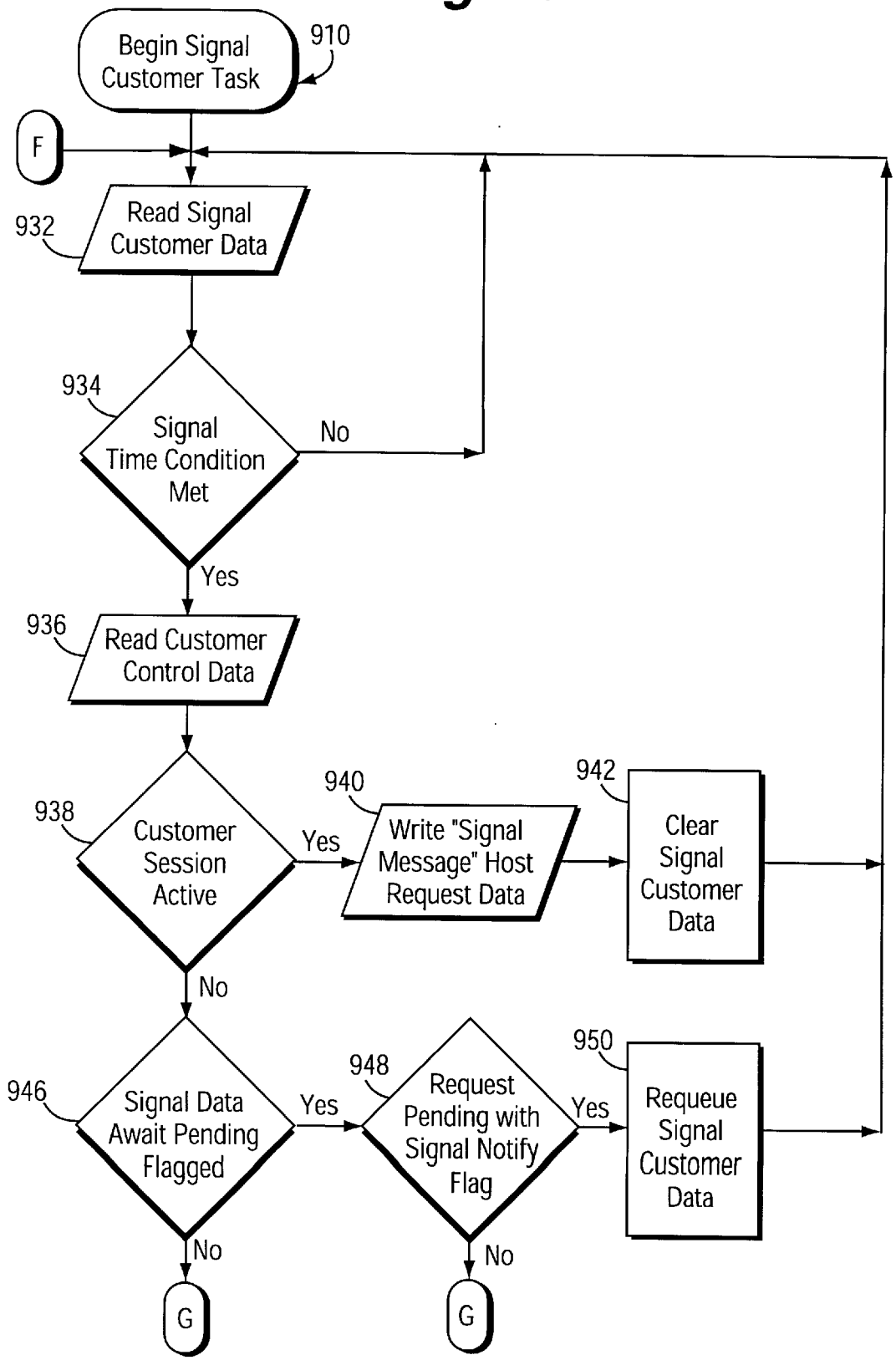
FIGS. 19A and 19B together are a flowchart of exemplary program control steps performed by the host computer system as part of the "begin signal customer task" block shown in FIG. 17.
Figure 19B:
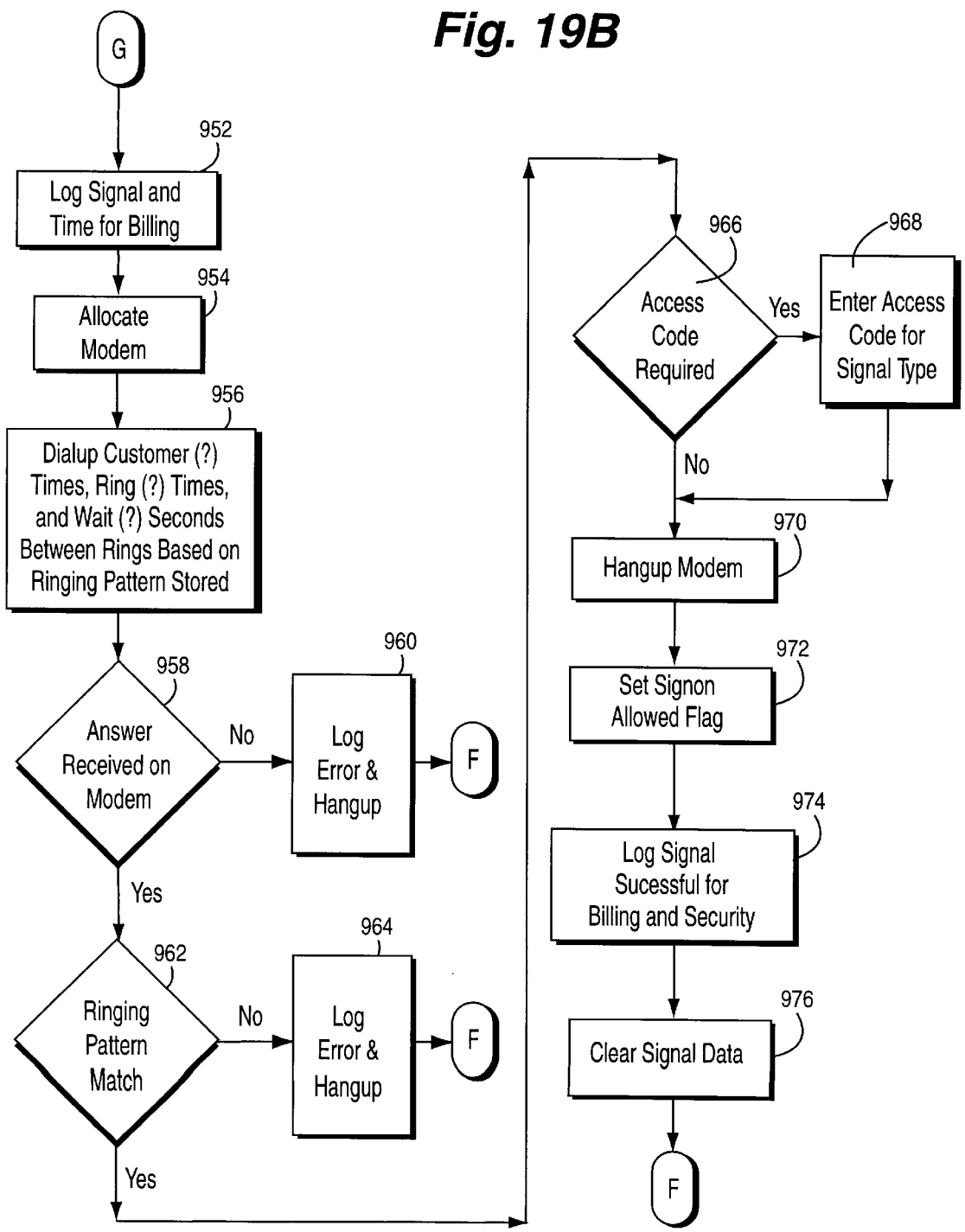

FIGS. 19A–19B are together a flowchart of exemplary program control steps performed by host computer 104 as part of the "signal customer" task 910. Host computer 104 maintains a signal customer data block 1000 in the preferred embodiment in order to keep track of signalling it must send to different customer computers. Exemplary format for this signal customer data block is shown in FIG. 22E. This signal customer data block 1000 includes, for example, a user ID field 1000A, a date/time submitted field 1000B, a date/time to dial-up field 1000C, an access code field 1000D, a dial-up reason 1000E, a replica/host signal flag 1000F, and an "await pending requests" field 1000G. Block 932 shown in FIG. 19A accesses this signal customer data block 1000, and decision block 934 tests whether it is time to send a signal. This test is performed continuously until it is time to send a signal ("yes" exit of decision block 934). At that point, a customer control data log 1002 associated with that particular customer to be signalled is read (block 936). An exemplary format for customer control data block 1002 is shown in FIG. 22B. The exemplary FIG. 22B format for this customer control data block 1002 includes the following information:

Image of On-line Service Control Data Field 1002A
    A copy of the on-line service control data structure on the customer's computer is stored as part of the customer control data. This copy is obtained from a host data structure (shown in FIG. 22A) storing on-line service control data blocks for each customer of the on-line service 100. FIG. 22A shows a collection of Online Service Control Data structures for customers 1, 2, and N (with N representing an unlimited number of customers). This data may be updated from on-line service control data 501 (shown in FIG. 16A) during the course of an on-line session.

Billing Name, Address, Phone Number Field 1002B
    Standard billing information is maintained.

Payment Field 1002C
    Method of Payment, Bank & Credit Card Information
    Standard information for payment processing is maintained.

Access Control Field 1002D
    (Customer Access Allowed, Multiple Simultaneous Sign Ons Allowed)
    Used to disable access for non-payment of bill, disconnection, or other reason.

Simultaneous sign on option is used to determine if the user ID can be used by multiple customer computers at the same time.

Payment History Field 1002E
    Balance & Payment Info, Current & YTD Balance, Payment & Charge History
    Standard billing historical data available to the customer.

Credit Info Field 1002F
    Credit Info, Credit Limit, Maximum Daily/Monthly Charge Limits per Service Option
    Used to limit customer access to ability to pay, including daily and monthly limits and limits on specific services.

Service Limitation Field 1002G
    Services Allowed/Prohibited Table Occurs, Service, Date/Day/Time Range, Allow/Prohibit
    Used to selectively allow or restrict certain services during specified times. Entries can be entered by customer or by on-line service customer service. Customer cannot alter entries maintained by customer service.

Ringing Pattern Field 1002H
    Ringing Pattern Table Occurs, Call Occurrence, Phone Number, Wait Time Before Dialing, Times to Ring, Answer on Ring, Tolerance
    Used by the signal customer task. Pattern is sent to trigger the customer computer modem to answer and receive an access code from the on-line service indicating the reason for the signal. Wait time is used to determine when to issue the next call. Answer on ring determines when the customer should answer. A pattern match may include provisions for the customer to answer more than once before the dialing pattern is complete. Tolerance allows fuzzy logic for when the customer should answer (i.e., answer on +or −2 rings from Answer on Ring value).

Dial-up Table Field 1002I–1002L
    Dial-up Table Occurs, Date/Day, Time/Interval Period, Use Ring Pattern, Complete Pending Requests
    Four variable length tables can exist—by date/time, day/time, date/interval period, and date/interval period. A similar table exists on the customer computer. The customer can setup to have his computer or the on-line service initiate the on-line sessions. A ringing pattern is specified and an option flag exists to cause the dial-up request to wait until all pending requests are completed.

Access Code Table 1002M
Access Code Table, Dial-up Reason, Access Code
This table identifies each access code the on-line service can send to the customer computer during a signal request, and provides an associated reason for the access code.

Request Pending Field 1002N
Request Pending Table Occurs, Request, Date/Time, Estimated Completion, Notify Method
This table identifies any requests that have not yet completed. Date/time indicates the start of the request, and notify method indicates what to do when the request is completed.

Completion Message Field 1002O
Completion Message Table Occurs, Completion Message, Notify Status, Notify Method
This table stores the completion messages issued by process requests. Notify status indicates if the message has been received and notify method indicates how the customer was notified (i.e., message sent to display during on-line session or signal request and access code sent to customer computer).

Error Message Field 1002P
Error Message Table Occurs, Error Message, Status, Action Performed, Response
This table stores the error messages received by the customer or on behalf of the customer (including off-line requests performed by Replica Process or Host Request Process). Status indicates the disposition of the message. Action performed indicates any response issued to the message. Response indicates the result of any actions performed.

Notify Field 1002Q
Notify Method Table Occurs, Message, Response Action, Notify Method
This table associates notify methods with error messages. For a given message, the response to the message is stored and a notify method is provided to allow customer contact in the event of a failure to perform a specified request.

Dialback Field 1002R
Dialback Option Flag, Sign On Allowed Flag
Used to indicate that the customer cannot sign on until the customer's computer has received a signal request. When a customer signs on without a prior signal request, the on-line service computer issues a signal request and hangs up. Once the customer computer receives a signal from the host (answers modem after dialing pattern patch), the sign on allowed flag is set to allow the user to access the on-line service.

Membership Field 1002S
Member Since Date, Reinstatement Date
Indicates how long the customer has been using the service and when service was reinstated if suspended.

Last Access Field 1002T
Last Sign On Date & Time, Duration

Cancellation Field 1002U
Service Cancel Date, Reason

Processor Flag 1002V
This field holds the processor flag value for local host based commands (currently unused).

Telco Billing Flag 1002W
Set on or off during each session initiation depending on whether the customer is accessing the on-line service with a special charge pay telco number such as 900 area code access. Billing records include this flag to identify activity as billable via Telco.

Error Sign On Attempts 1002X
A count is provided of the number of times an invalid password was issued with this customer's user ID.

Once the customer control data block 1002 for the customer to be signalled has been obtained from mass storage, host computer 104 determines whether the customer is currently signed on to an on-line session (decision block 938). A host request is associated with each signalled request in the preferred embodiment. If the customer already has received the request that this signal is associated with, there is no need to signal. If the customer session is already active ("yes" exit to decision block 938), host computer 104 writes the signal message to the host request file 1004 (block 940) and clears the associated entry (block 942) within the signal customer data block 1000. The host request will be directed to the customer session via Begin Customer Session 916 block 1144 shown on FIG. 21C.

FIG. 22C schematically shows an exemplary format for the host request file 1004. In the preferred embodiment, this data resides on the On-line Service Computer 104 and is accessed by the Host Request Task 912 and the Customer On-line Session Task 916.

The host request file 1004 contains the following information in the preferred embodiment:

User ID Field 1004A
User ID of the customer associated with the task.

Start Date/Day & Time Field 1004B
Date or day and time after which this task can be started.

Request Table Entry Field 1004C
Identifies the task to be performed. New tasks can be added to the table as they become available. Tasks include "backup," "restore," "archive," etc. as shown in FIG. 22C.

Parameters 1004D
These are the parameters to pass in response to prompts and the location and names of input and output used by the task.

Use Replica Flag 1004E
This flag indicates that the request is to be performed by an On-line Service Customer Replica Computer (off-line request).

Notify Method Field 1004F
Used to signal or notify the customer before (if customer computer is needed) and/or after processing the request.

If the customer session is not active ("no" exit to decision block 938), then host computer 104 determines whether the "signal data await pending" flag 1000G within the signal customer data block is on. This option is used to make sure that there are no other off-line (e.g., replica) requests pending. If the flag is on ("yes" exit to decision block 946), then host 104 checks whether other pending requests are found that will issue a customer signal when complete (decision block 948). If such other requests are pending ("yes" exit to decision block 948), then the signal customer data block 1000 is re-queued (block 950). This avoids unnecessarily duplicative signals to customer computers 50. If there is no need to wait for pending requests ("no" exit to decision block 946), or if there is a pending request ("yes" exit to decision block 946) but the request does not issue a customer signal when complete ("no" exit to decision block 948), then control proceeds to block 952 of FIG. 19B to begin the steps necessary to issue a customer signal.

Referring now to FIG. 19B, once it is decided by host computer 104 that a particular customer computer 50 will be signalled, the host computer logs signal and time for billing (block 952), allocates the modem 102 (block 954), and sends a dialing pattern to the telephone number of the customer computer having the appropriate number of calls, rings per call, and wait intervals between rings based upon the stored calling pattern within the customer control data block field 1002H (block 956). Host computer 104 next determines whether the customer computer answered (decision block 958). If not, host computer logs an error and gives up (block 960). If the host computer 104 detects that the customer computer 50 did answer, the host computer tests whether the customer computer answered on the appropriate ring of the final call (decision block 962). If the host computer 104 expected the customer computer 50 to answer on the fifth ring and it instead answered on the second ring, for example, host computer 104 will log an error and hang up (block 964). Errors within about one ring are ignored by the host computer because it is not possible to detect which ring an answering telephone goes off hook on with closer than an accuracy of about +1 ring. This testing to ensure that the customer computer 50 picks up on the correct ring provides added authentication and security, since it allows the host computer 104 to have some assurance that it has contacted the appropriate customer computer 50.

If the host computer 104 determines that there is a ringing pattern match ("yes" exit to decision block 962), then host computer 104 tests whether an access code is required (block 966). If the signal customer data block 1000 specifies an access code in field 1000D (as tested for by decision block 966), then host computer 104 sends the appropriate access code (block 968), after the access code is sent (or if no access code is required), host computer 104 hangs up the modem 102 (block 970), and then may set a "sign-on allowed" flag (block 972) within customer control data dialback field 1002R (see FIG. 22B). In the preferred embodiment, when a signal is successfully sent, the customer computer 50 can access the system directly. When the dialback option is configured, a customer cannot access the system unless the system successfully sends a signal to the customer computer. This signal is sent when the customer first accesses the system, or if time triggered signal data is processed based upon a host or replica request. Host computer 104 then logs a "signal successful" message for billing and security purposes (block 974), and clears the signal data block 1000 associated with that particular signal (block 976).

Figure 20A:
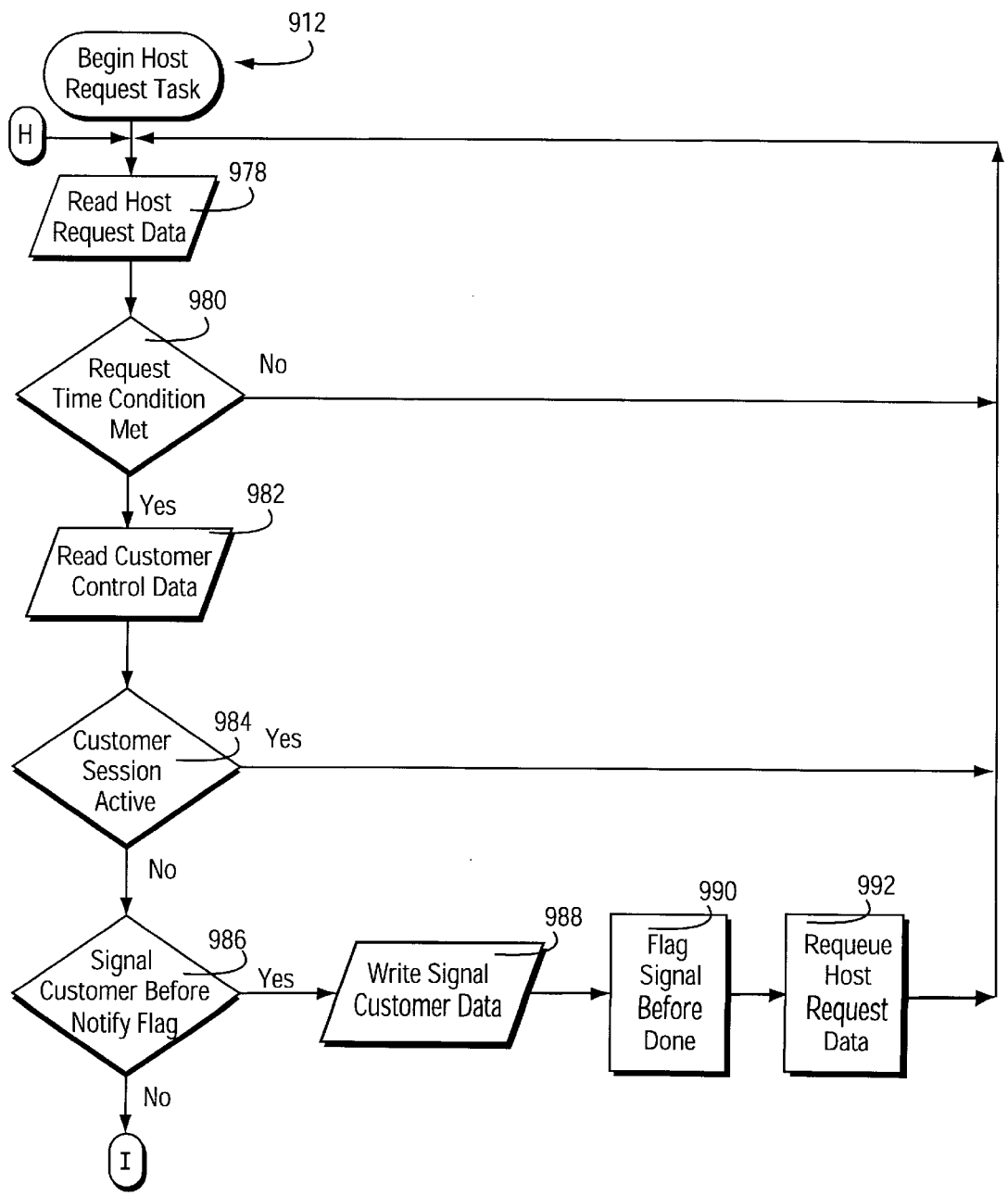
FIGS. 20A–20B together are a flowchart of exemplary program control steps performed by the host computer system of the preferred embodiment to effect the "begin host request task" block shown in FIG. 17.
Figure 20B:
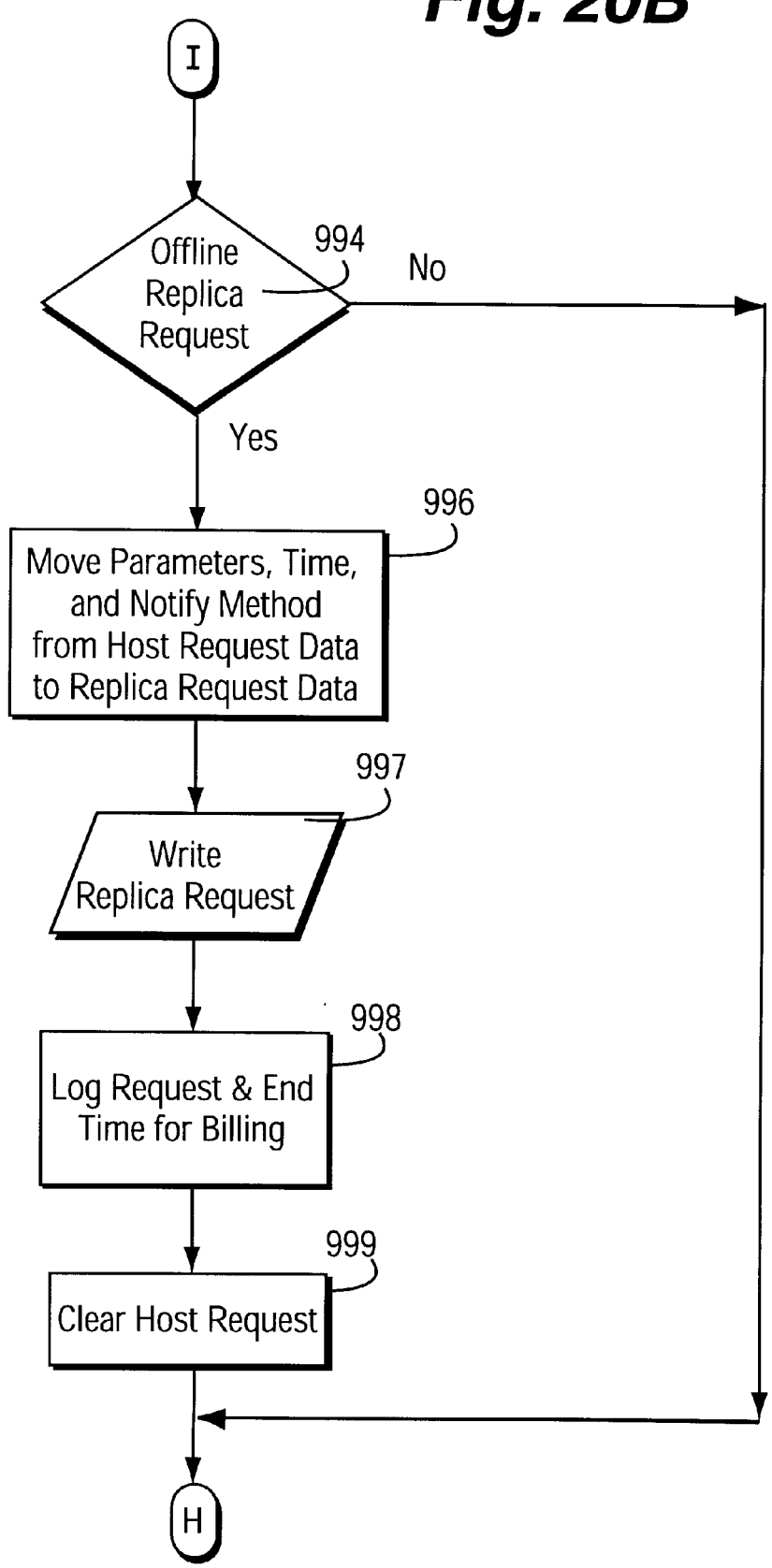

FIGS. 20A–20B together are a flowchart of exemplary program control steps performed by host computer 104 as part of the "host request" task 912. The purpose of the "host request" task 912 is to see whether there are any host requests. In the preferred embodiment, these host requests are performed, not by host computer 104, but either by replica computer 160 or by customer computer 50. In the preferred embodiment, host computer 104 keeps track of the host requests, and allocates them to either the customer computer 50 (e.g., by writing to the signal customer data block 1000 in order to schedule a signal to the customer computer 50), or by writing to a replica request block 1006 (see FIG. 22D) in order to control the replica computer 160 to perform the request.

Referring to FIG. 20A, host computer 104 reads the next host request from the host request file 1004 shown in FIG. 22C (block 978). If the conditions specified by the "start date/day and time" field 1004B of the host request file 1004 record are not met ("no" exit to decision block 980), then control proceeds to the start of routine 912 so that the next host request can be read (block 978). If, however, the conditions specified by the "start date/day and time" field are met ("yes" exit to decision block 980), then host computer 104 reads the customer control data block 1002 associated with the particular customer computer to whom the request pertains (block 982). Host computer 104 then determines whether the customer computer 50 is currently logged on (decision block 984). In the preferred embodiment, the customer's on-line session task also reads host request data. Thus, if the customer is in an on-line session ("yes" exit to decision block 984, the request will be managed by the on-line session rather than by the host request task 912, so control proceeds back to read the next host request (block 978).

Assuming that the host request task 912 is going to perform the request, host computer 104 determines whether an on-line session is necessary to satisfy the request (decision block 986). Some requests (e.g., requests for pure processing) can be satisfied without the associated customer computer 50 being logged on. Most other requests, however, require some input from or output to the customer computer 50 via a live, real-time on-line session. If an on-line session is required to perform a host request, signal data is written to a signal customer data block 1000, and the host request is re-queued until the customer computer begins an on-line service session (blocks 988, 990, 992).

Referring to FIG. 20B, decision block 994 determines whether the request can be performed by an off-line replica. If the host request does not need to signal the customer computer 50 and it is not a replica request, then it will be performed when the customer establishes an on-line service session and control thus returns back to the beginning of the host request task ("no" exit to decision block 994). On the other hand, if the request can be performed by an off-line replica computer ("yes" to decision block 994), and assuming that replica computer 160 is available to perform off-line tasks, the host computer 104 moves the host request file entry to a replica request 1006 entry so as to schedule the replica request (see FIG. 22D) (block 996, 997). In particular, the host computer 104 at this point writes a replica request data block 1006 of the form shown in FIG. 22D including the following information:

User ID Field 1006A
    User ID of the customer associated with the task.
Date/Time Submitted Field 1006B
    When the Replica request was issued.
Date/Time to Start Field 1006C
    Date or day and time after which the Replica task can start.
Estimated Completion Time Field 1006D
    How much time the task should take to complete.
Request Type 1006E
    Identifies the task to be performed. New tasks can be added to the table as they become available. Tasks currently include backup, restore, archive, etc.

Request Parameters 1006E
    These are the parameters to pass in response to prompts and the location and names of input and output used by the task.

Processor Type Flag 1006F
    Identifies the type processor needed for the request.

Input Device/File List 1006G
    Identifies the input required to perform this task.

Output Device/File List 1006H
    Identifies the output required to perform this task.

Notify Method Field 1006I
    Used to signal or notify the customer before (if customer computer is needed) and/or after processing the request.

The host then logs request and end time for billing purposes (block 998), and clears the host request block 1004 (block 999, FIG. 20B).

Figure 21A:
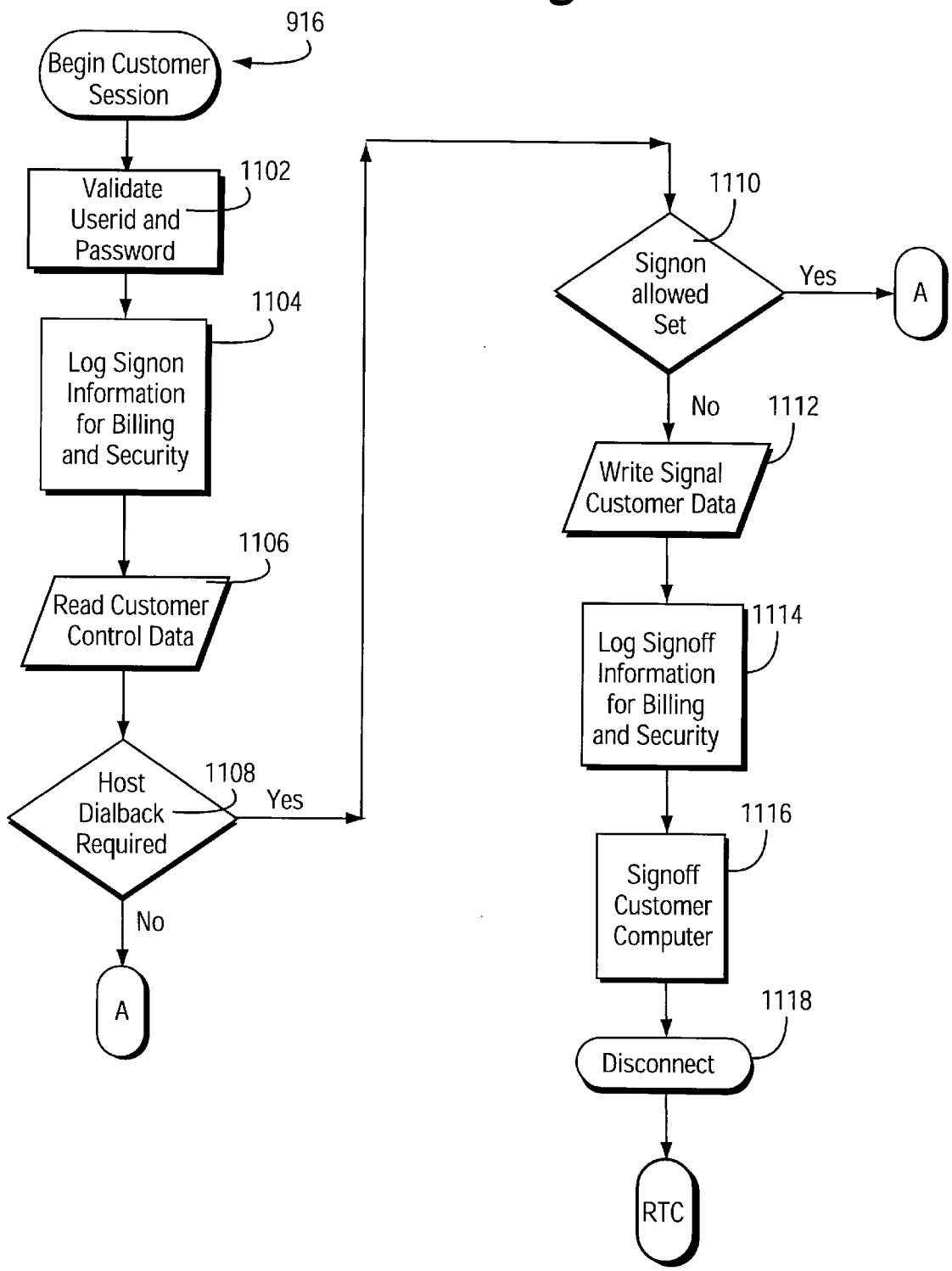

FIGS. 21A–21E together are a flowchart of exemplary program control steps performed by host computer 104 in order to begin an on-line session with a customer computer 50. Referring to FIG. 21A, host computer 104 validates user ID and password provided by the logged-on customer computer 50 (block 1102) and logs the sign-on information for billing and security purposes (block 1104). Host computer 104 then accesses the basic information associated with the customer computer 50 from the customer control data block 1002 associated with the user ID/password (block 1106). Host computer 104 checks within the customer control data block 1002 to determine whether the dialback option 1002R requires the host computer 104 to signal the customer computer 50 before allowing process requests (block 1108). If dialback is not required ("no" exit to decision block 1108), then dialback processing is bypassed and control proceeds with the online session initiation at block 1120 of FIG. 21B. If dialback is required, then host computer 104 checks the "sign-on allowed" flag (block 1110) of record 1002R to determine whether the "signal customer" task block 972 (FIG. 19B) set this flag properly to allow the customer computer 50 to call in. If the flag is set ("yes" exit to decision block 1110), then control proceeds with the on-line session at block 1120 of FIG. 21B. If the flag is not set, then the host computer 104 treats the call-in from the customer computer 50 as a request for the host computer to contact it, and writes a signal customer data block 1000 to that effect (block 1112). Host computer 104 then logs sign-off information for billing and security (block 1114), signs off the customer computer (block 1116), and disconnects (block 1118). Subsequently, as described previously in connection with the "signal customer" task of FIGS. 19A–19B, the host computer will contact the customer computer 50 in a more secure way. At this point, the host computer 104 refuses the customer computer contact because user ID and password security is deemed insufficient in the preferred embodiment to provide adequate security for the data being transferred via the on-line service.

Figure 21B:
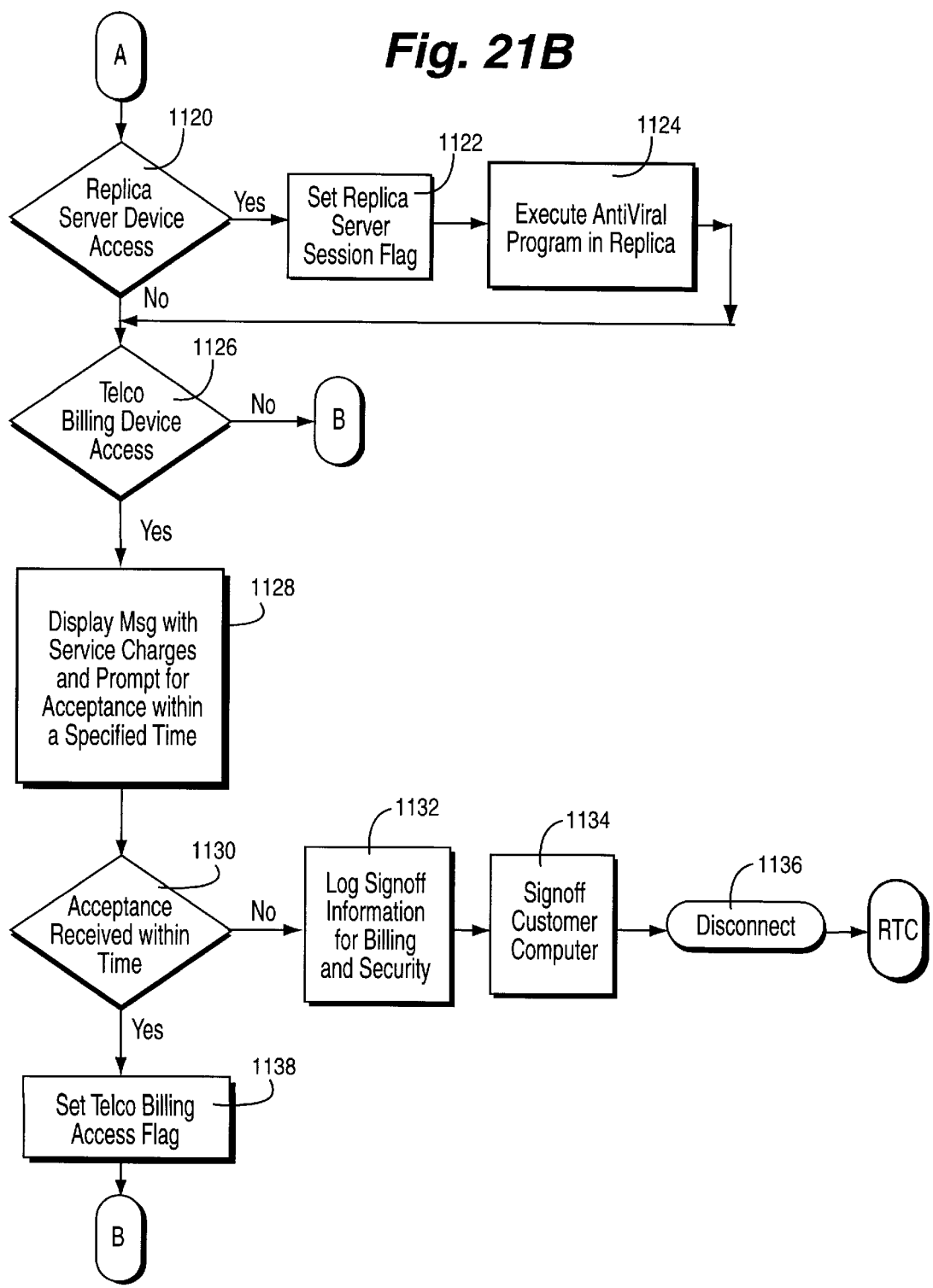

Referring to FIG. 21B, assuming that the customer computer 50 is permitted to access at this time, host computer 104 determines whether the customer computer 50 is going to be accessing the replica computer 160 (decision block 1120). If it is, then a replica server session flag (field 607 on FIG. 16A, also stored on FIG. 22B field 1002A and FIG. 25A field 1500A) (block 1122) is set, and host computer 104 allocates a virtual disk and causes the replica computer 160 to execute anti-viral software (block 1124). If it is not ("no" exit to decision block 1120), then the session flag setting step (block 1122) and the anti-viral execution step (block 1124) are bypassed.

Host computer 104 next queries its communications controller 112 to determine whether the customer computer is calling in on a special charge telephone number (e.g., a 900 number) (decision block 1126). If it is, host computer 104 displays a message specifying the service charges and prompts for acceptance within a specified time (block 1128). This gives the customer the opportunity to exit before phone charges begin. Basic charge amounts are also displayed. If the customer does not accept within a specified time (decision block 1130), host computer logs sign-off information for billing and security (block 1132), signs off the customer computer 50 (block 1134), and disconnects (block 1136). If the customer does accept, then host computer 104 sets a Telco billing access flag 1002W within the customer control data block 1002 to indicate that billing is being handled by the telephone company instead of by the host computer 104 (block 1138). If, however, the customer computer is not calling in on a special charge telephone number ("no" exit to decision block 1126), then control proceeds with the on-line session at block 1140 of FIG. 21C.

Figure 21C:
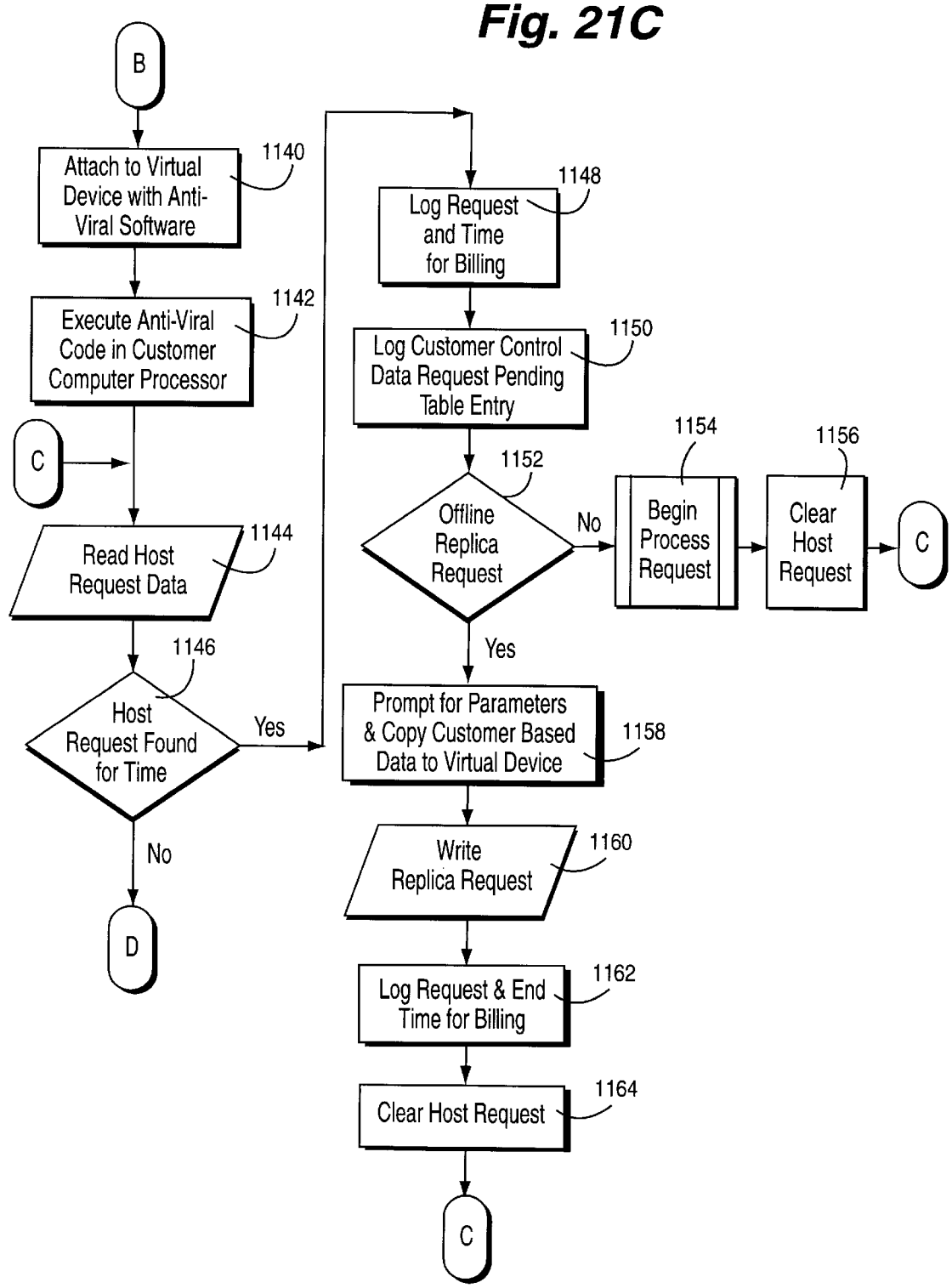

Referring now to FIG. 21C, host computer 104 attaches to customer computer 50, a virtual disk containing anti-viral software and forces the customer computer to execute the anti-viral code (blocks 1140, 1142). Host computer 104 then reads the host request file 1004 to see if there are any host requests outstanding for the particular customer (block 1144). If there are no requests ("no" exit to decision block 1146), then control proceeds with the on-line session at block 1166 of FIG. 21D. If there are requests ("yes" exit to decision block 1146), host computer logs the request in time for billing (block 1148), and then logs information about pending requests until the requests are completed (block 1150). Host computer 104 then determines whether the request is for an off-line replica processing (block 1152). If it is not, then the host computer begins processing the request during the on-line session (block 1154) and, once it is completed, clears the host request (block 1156). If, on the other hand, the request is for an off-line replica computer 160 ("yes" exit to decision block 1152), host computer 104 prompts the user for associated parameters and copies the customer based data to a virtual device available to the replica computer 160 (blocks 1158, 1160). Host computer 104 then logs the request and end time for billing purposes (block 1162), and clears the host request (block 1164).

Referring now to FIG. 21D, assuming that things are going to proceed in an on-line session, host computer 104 displays request options to the customer computer 50 (block 1166). This allows the customer to select request options after or between host requests in the preferred embodiment. If the customer or a host request at any time issues a sign-off request (decision block 1168), host computer 104 logs the sign-off information for billing and security (block 1170), signs off the customer computer (block 1172) and disconnects (block 1174).

If the customer computer 50 or replica computer 160 issues a request (block 1176), host computer 104 logs the billing and pending table with request and begin time (block 1178). Host computer 104 then checks whether the request is for an off-line replica computer (block 1180). If it is not, then the host computer performs the request during the on-line session (block 1182). If the request is for an off-line replica, on the other hand ("yes" exit to decision block 1180), host computer 104 prompts for parameters and copies the customer based information to a virtual device for attachment to the replica computer (blocks 1184, 1186), and then logs the request and end time for billing (block 1188). If, on the other hand, decision block 1176 does not receive a request from customer computer 50 or replica computer 160 ("no" exit to decision block 1176), then control loops back to block 1144 of FIG. 21C to check if a host request is now available.

Figure 21E:
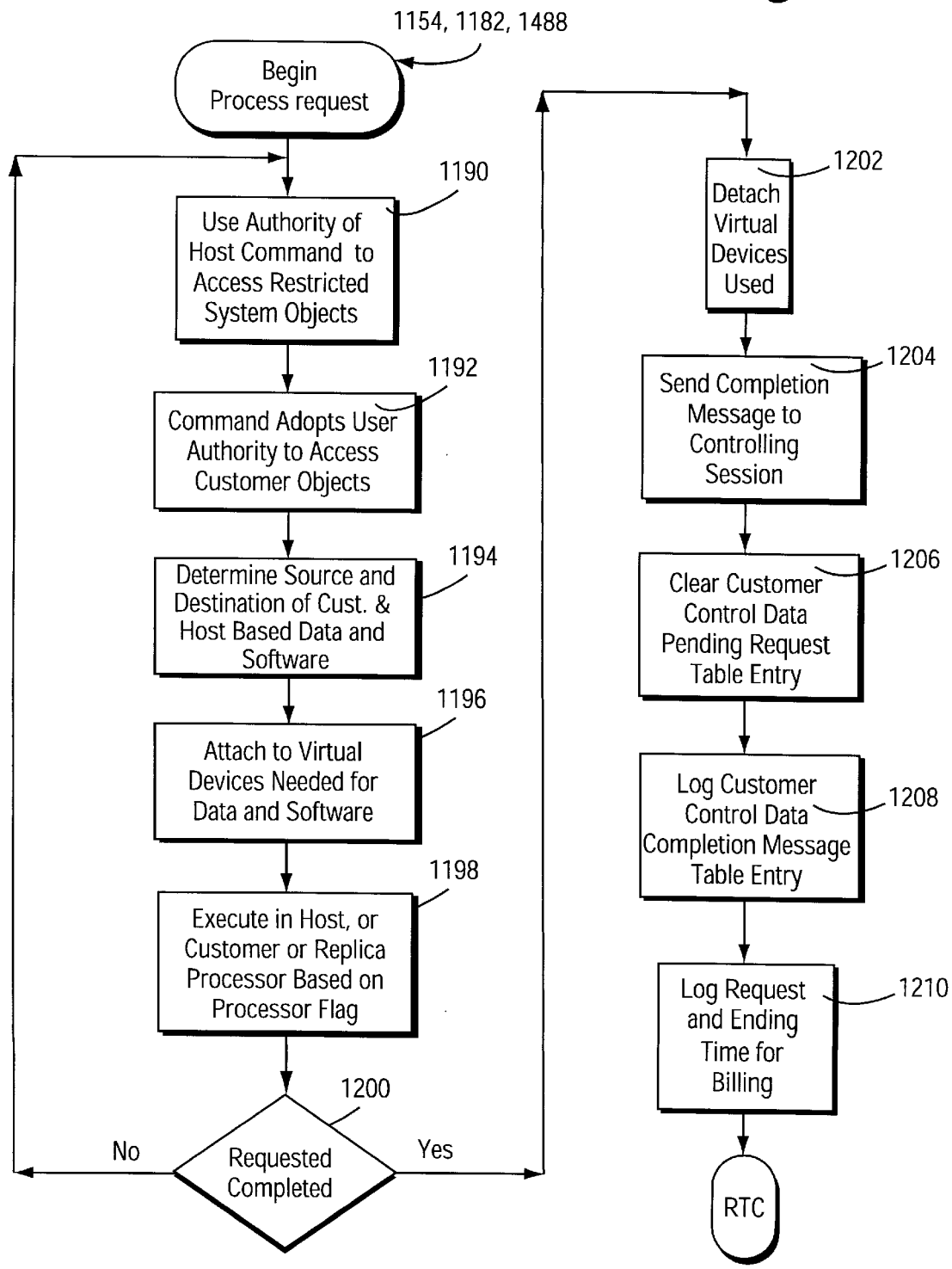
Figure 21F:
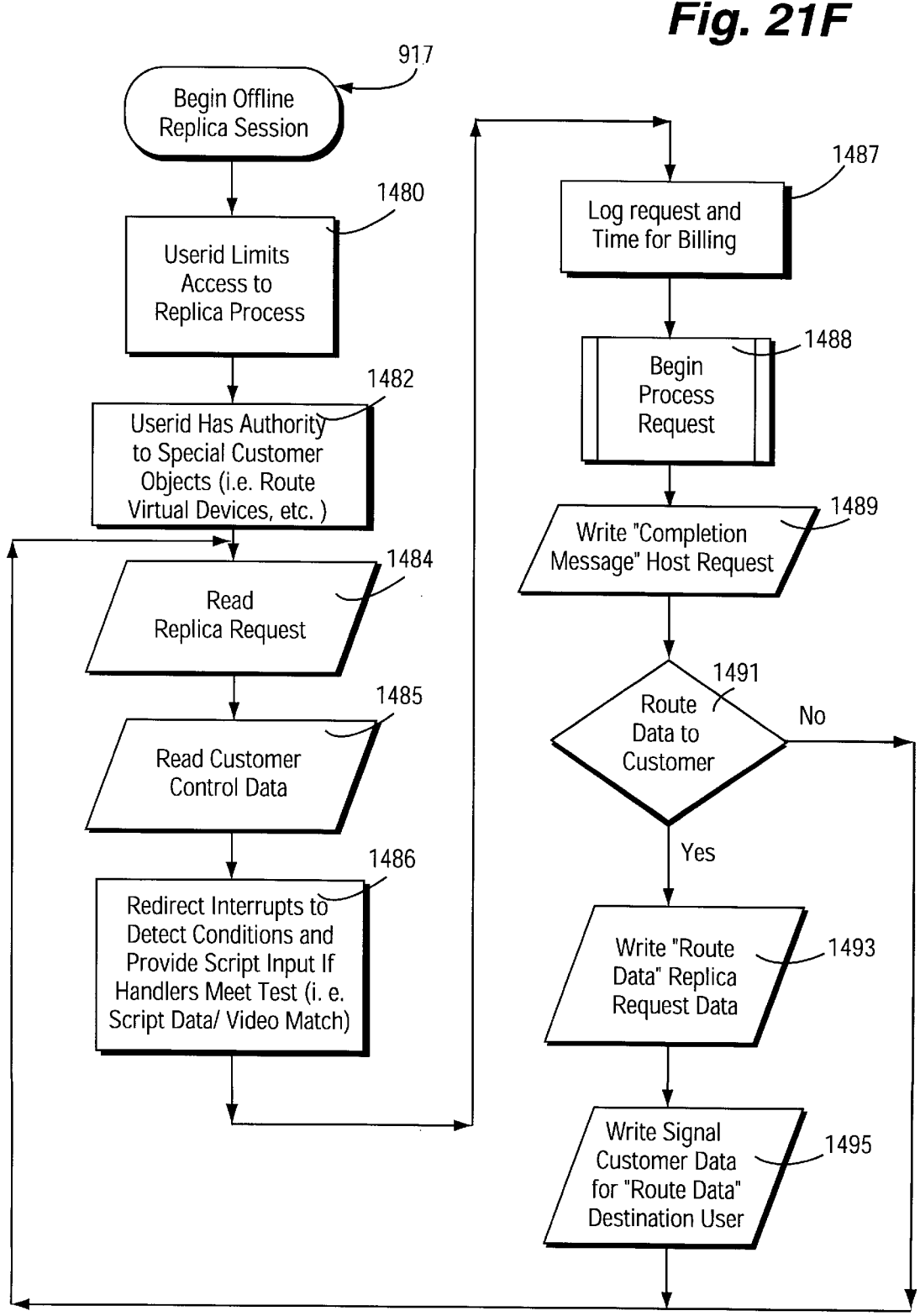
FIG. 21F is a flowchart of exemplary program control steps performed by the host computer system in the preferred embodiment to effect the "begin off-line replica session" block shown in FIG. 17 to manage the operations of an off-line replica computer.
Figure 22H:
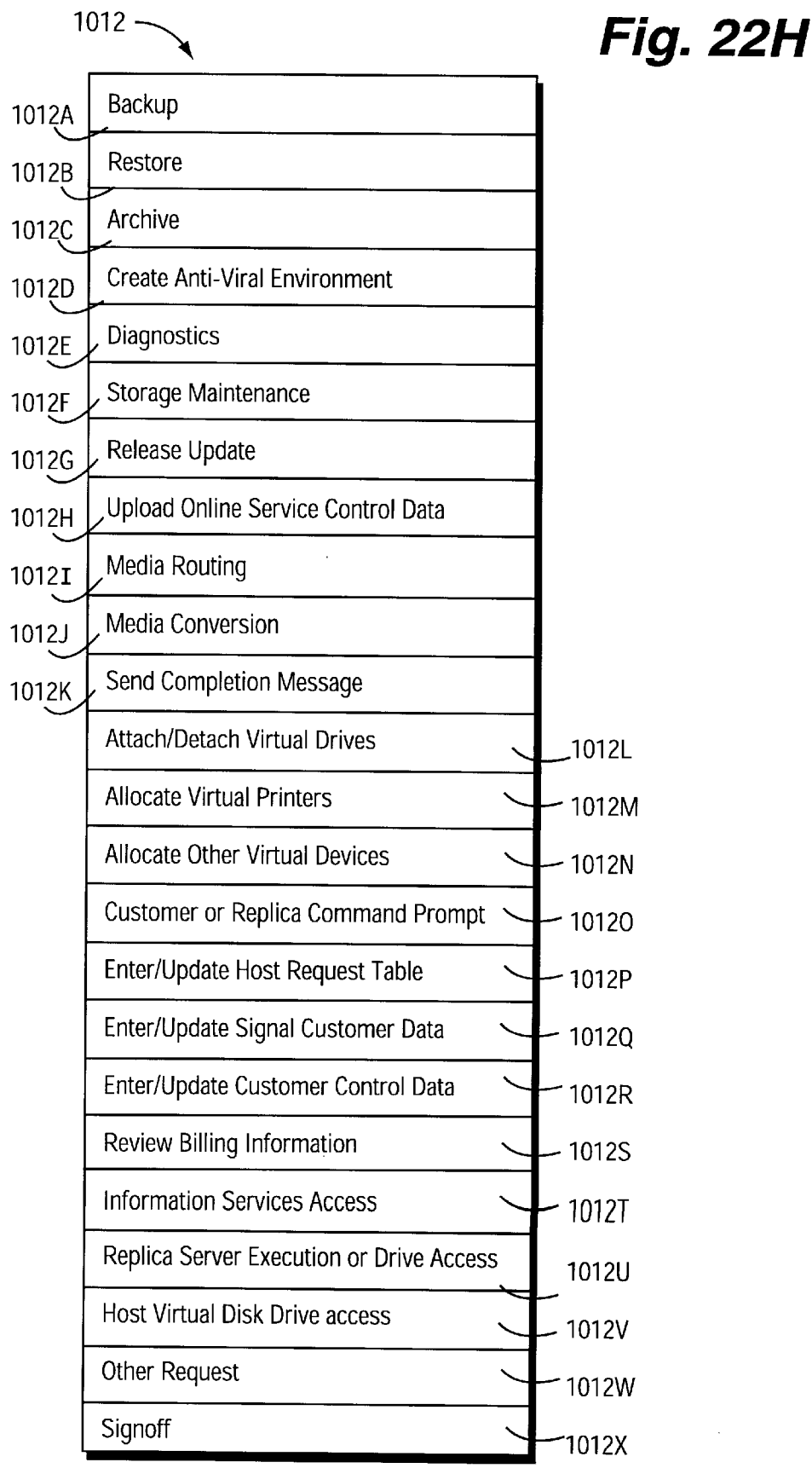
FIG. 22H schematically shows some of the request options available to on-line service customers in the preferred embodiment.

FIG. 22H shows some examples of requests that can be performed by the customer computer 50 or the replica computer 160. In the preferred environment, the request options shown in request options block 1012 can include, but are not limited to:

Backup (1012A)
   provide data backup services to customers
Restore (1012B)
   provide data restore services to customers
Archiving (1012C)
   provide data archival services to customers
Creating an anti-viral environment (1012D)
   allows customer to run anti-viral code from online service
Diagnostics (1012E)
   provide hardware and software diagnostic services
Storage maintenance (1012F)
   provide storage maintenance services to customers
Release update services (1012G)
   provide release update services to customers
Uploading online service control data (1012H)
   transfer customer control data to on-line service
Media routing services (1012I)
   route data to other customers
Media conversion services (1012J)
   change media format (i.e. convert fax to voice)
Sending a completion message (1012K)
   signal processing data maintenance for customers
Attaching or detaching virtual devices (1012L)
   device allocation services for customers
Allocating a virtual printer for host based printing services (1012M)
   virtual printer services for customers
Allocating other virtual devices such as CD-ROM or fax (as shown by devices 120 in FIG. 3) (1012N)
   virtual device services for customers
Requesting the customer computer or replica computer command prompt (1012O)
   command processing option for customers
Accessing the host request table (1012P)
   host request data maintenance for customers
Accessing customer signal data (1012Q)
   signal request data maintenance for customers
Accessing certain customer control data (1012R)
   customer control data maintenance for customers
Reviewing billing information (1012S)
   billing information review services for customers
Accessing information services (1012T)
   information services for customers
Accessing the replica for execution or drive access (1012U)
   replica processing and resource sharing services for customers
Accessing a host virtual disk (1012V)
   host virtual device access services for customers
Some other request (1012W)
   access to other requests for customers
Signoff request (1012X)
   signoff request processing for customers FIG. 21E is a flowchart of exemplary program control steps performed by block 1154 of FIG. 21C and block 1182 of FIG. 21D in order to process an on-line request, and block 1488 of FIG. 21F in order to process an off-line request. Host computer 104 first determines the authority of the host command to access restricted system objects (block 1190). In the preferred embodiment, customers are restricted from most system areas. The command used to perform a customer's request allows access to only the necessary areas of host computer 104. The host computer adopts the user authority to access customer objects (block 1192), and then determines the source and destination of the customer and host based data and software (block 1194). Host computer 104 then attaches whatever virtual devices (e.g., disks, printers, etc.) are needed for data and software (block 1196), and executes the requested task in the customer computer 50, replica computer 160 or host processor 106. Where the task is executed is based on the processor flag within the request, and is determined by the type of software to be executed (e.g., mini-computer or micro-computer) as well as other factors. In this context, the host command is capable of issuing a router command to execute the program in the customer's computer 50 when necessary. In the case of replica server sessions host commands routed to the workstation are first directed to the replica computer and replica server routing causes execution to occur in either the replica or customer computer (with or without command line translation) based on the processor flag in the customer control data. Blocks 1190–1198 are performed repeatedly until all commands have been executed (decision block 1200; a "command" may actually consist of many commands or a sequence of commands). Once the request has been completed ("yes" exit to decision block 1200), host computer 104 detaches the virtual devices that were attached at block 1196 (block 1202), and sends a completion message to the controlling session (block 1204). Host computer 104 then clears customer control data pending request table entry 1002N (see FIG. 22B), logs the customer control data completion message table entry 1002O (see FIG. 22B), and logs request and ending time for billing purposes (blocks 1206, 1208, 1210).

In the preferred embodiment, "Begin Customer Session" block 916 in FIG. 21A refers to a high level workstation program (preferably written in RPG400 or COBOL) invoked by a CL program configured as the sign-on program in the AS400 user profile for each customer. The on-line session ends upon completion of this program. This program validates customer command input and menu options and calls CL programs to satisfy varying customer requests. Similarly, "Begin Off-line Replica Session" in FIG. 21F refers to a high level workstation program invoked by a CL program configured as the sign-on program in the AS400 user profile for each Off-line Replica User ID. This CL sign-on program also retrieves the device ID for the device invoking sign-on and validates this device ID as representing one of the Off-line Replica computers physically attached to the AS400.

In the preferred embodiment, when each CL command is created, it is already known what programs should run on the host computer and what programs should run on the attached personal computer in block 1198. What may not be known is whether to execute in the customer or replica processor if PC execution is requested during an on-line replica server session. It may be determined that a program should only run in the on-line replica computer (a rental or demo program for instance). In this case, block 1198 executes a control program loaded from read-only host virtual disk to set the replica processor flag to cause execution of personal computer commands in the replica processor. In other cases, the existing processor flag value on the replica computer will determine where personal computer execution will take place.

Further describing FIG. 21E, since this process is itself an AS400 CL command, execution in block 1198 to satisfy the request is performed by another CL command if the request requires host processing. If the request is for off-line processing within the off-line replica computer processor, a CL command is used in block 1198 to cause execution in the replica personal computer processor. In this case, the CL command executed in block 1198 includes the PC command name and parameters as part of the parameter list of said CL command. If a customer is directly attached to the host computer for an on-line session, customer computer execution is performed as just described for the off-line replica computer. Customer computer execution during an on-line replica server session is performed similarly in that the host CL command for PC execution causes the command to be directed to the replica processor except the replica server router program may route the command to the customer processor (if the replica computer processor flag is set to customer).

Some CL commands issued in block 1198 by the program described by FIG. 21E may issue PC execution commands to run a program to change the processor flag on the replica or customer computer when execution in a specific processor is required. The FIG. 21E commands can interrogate the customers on-line replica server flag to determine whether such a program needs to execute. The processor flag only needs to be changed during on-line replica server sessions because the flag is used to determine customer or replica execution during an on-line replica server session only. It should also be noted that one of the "Request Options" identified in FIG. 22H is for Customer or Replica Computer Command Prompt, block 10120. If this request option is selected, block 1198 executes a host CL command to cause PC execution of COMMAND.COM in the personal computer processor. This causes a secondary command processor to be loaded in the personal computer to allow personal computer command input during the host session without the appearance of a host session. Similarly, the customer may select a command option to run a personal computer program which has an option to invoke the personal computer command processor (or secondary command processor) to execute personal computer commands without the appearance of host interaction.

From the personal computer command prompt provided by the secondary command processor, the customer can change between virtual drives, run the personal computer program supplied by IBM to Attach/Detach AS400 Virtual Drives, and run various programs in the personal computer processor (customer or replica processor based on processor flag associated with local command during on-line replica server session). The secondary command processor execution is ended with control returned to caller when the command "EXIT" is received.

During execution from a secondary command processor as described, host system security and the host, replica and customer router security programs are used to log and validate requests. When the customer runs the virtual disk program used to allocate and de-allocate host based virtual disks, AS400 object security validates the user and/or command authority to allocate the virtual disk.

The command authority refers to the option during command creation that allows the command to adopt the authority of the commands owner during execution. The user profile of the owner of the command may be set up to have authority to host commands that the customer does not have on her own. The command authority is the authority of the secondary command processor call from FIG. 21E block 1198 (which typically would not provide authority to most system virtual disks). In the case of virtual disks used for system functions or owned by another customer, the allocation would be denied based on lack of user resource authority. In the case of virtual disks used to supply rental and purchase programs and info to customers, the allocation may be denied if it is determined the allocation should be limited to selection by menu or command option requested by the workstation programs described in FIGS. 21A and 21E (calling a CL command, FIG. 21E, with command authority (adopted from the owner of the command) to cause the allocation to be performed during execution within block 1198). In this situation, the customer would need to select the device allocation by host menu or command option (as previously described) before selecting the option to invoke a secondary command processor. In the case of public virtual disks or virtual disks with customer access authority, the allocation will be permitted for the authority requested (read/write) if host security allows for the user profile.

In the preferred embodiment, host security validates all device allocation requests and read/write requests based on the user profile and command authority. The Host, Replica, and Customer Security programs described in FIGS. 15, 18, and 24K are provided to validate and log PC execution and virtual device access. The customer and replica security programs further provide the ability to detect and deny unauthorized disk or RAM copy requests of secured on-line service data and programs. The host security program is called by the host router program as a user exit program. Similarly, the customer and replica security programs are called by their respective router server programs to validate all requests and activity.

FIG. 21F is a flowchart of exemplary program control steps performed by the host computer 104 to manage an off-line replica session. When routine 917 begins, the replica computer 160 first provides a user ID and associated password to establish authority to manipulate special customer objects (e.g., route virtual devices, etc.) (block 1480, 1482). The host computer 104 limits the authority of the replica computer 160 based on this user ID. The off-line replica computer then reads the replica request file associated with it (see FIG. 25B), reads associated customer control data block 1002, and then redirects interrupts to manage automated keystrokes based upon a customer stored script (blocks 1484–1486). Various methods are available and well known for providing automated input for tasks. Basically, certain conditions and values such as data in the video buffer is identified after which data is moved into the keyboard buffer in response (including carriage return and other control characters). This leaves the impression of an interactive session with the customer. The replica computer then logs the request in time for billing purposes (block 1487), and begins processing the request (block 1488) by executing appropriate software. Once the request is completed, the replica computer 160 writes a "completion message" to the host request file (block 1489), and routes data if necessary to a different customer using route data replica request (block 1491). Block 1491 asks if the request includes routing results to another customer. If so, host computer 104 writes a "route data" replica request and signal data request for the different customer to receive these results to the replica request data file (block 1493); and finally, writes a signal customer data for the "route data" destination user (block 1495). If there are no routing results for another customer ("no" exit to decision block 1491), then the request is completed so control loops back to block 1404 to read the next replica request.

A significant difference between the on-line workstation programs represented by FIGS. 21A and 21F is that FIG. 21A (on-line replica computer 160) receives all command and menu option input either interactively by the customer or by requests read from the Host Request file, whereas the workstation program represented by FIG. 21F (off-line replica computer) receives all command and menu option input from requests read from the Replica Request file (off-line requests). The workstation program in FIG. 21F also issues PC execution commands within the off-line replica to reconfigure interrupts to satisfy input requests with script data provided by the Off-line Replica Request. This redirection involves chaining interrupt handlers used to test for various conditions (video buffer content, timeout, etc.) and provide input based on a match test. Common between the workstation programs described in FIGS. 21A and 21F is that both satisfy on-line service requests (some of which are described in FIG. 22H "Request Options") by calling CL programs generically described by FIG. 21F "Begin Process Request" block 1488. Each of the request options are satisfied by a separate CL program following the general functionality of FIG. 21E. That is to say, the CL commands are created with the authority of the owner of the command to access resources the customer may not have under her own user profile. The CL command adopts customer or replica user ID authorities to access customer objects. Virtual devices are allocated to satisfy the request. Execution is performed in the appropriate processor. Virtual devices are detached and the command is logged.

Figure 23:
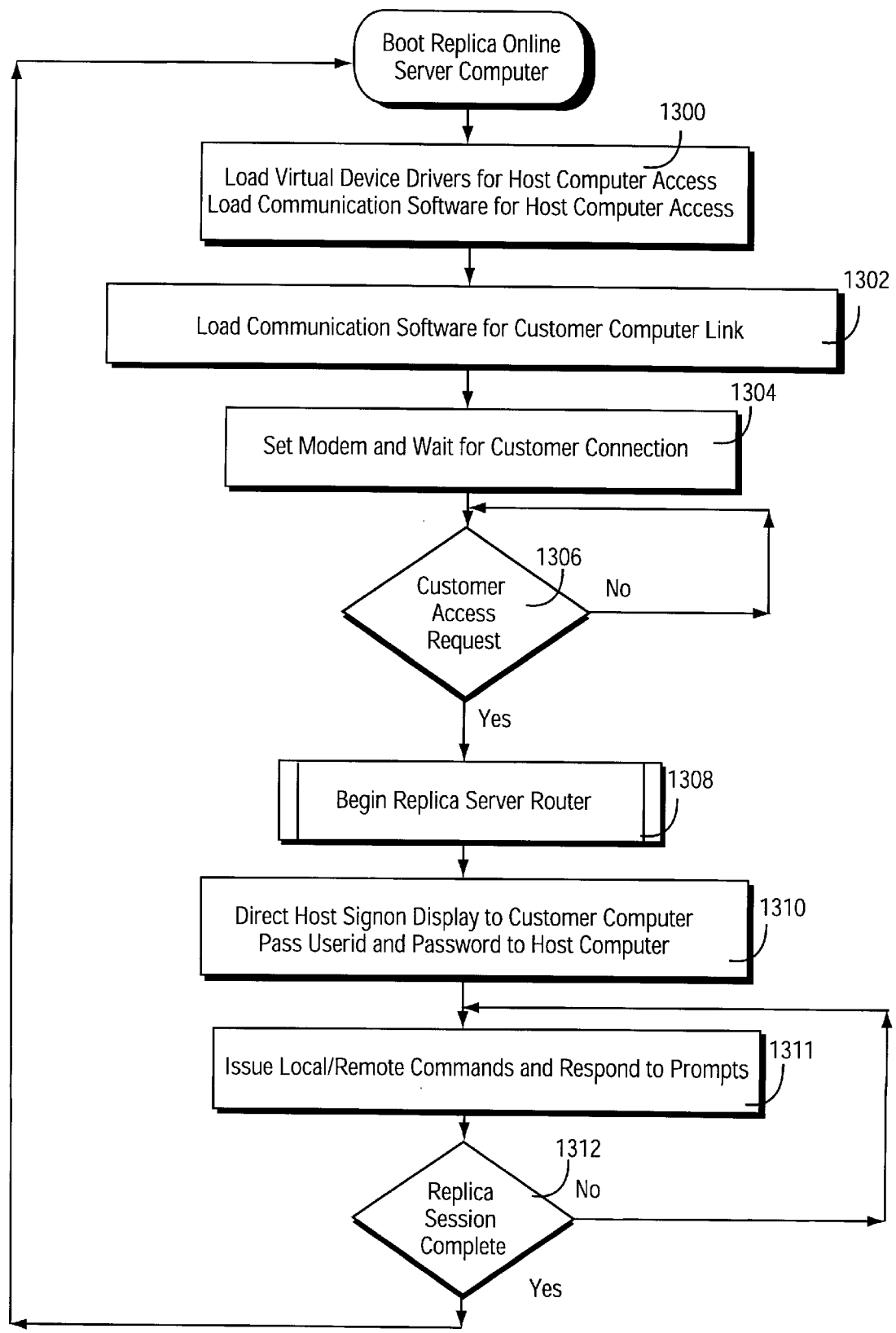
FIG. 23 is a flowchart of exemplary program control steps performed by the on-line replica computer in the preferred embodiment.

X. Detailed Flowcharts of Exemplary On-Line Replica Computer Tasks and Data Structures FIG. 23 is a flowchart of exemplary program control steps performed by replica computer 160 acting as an on-line replica computer in the preferred embodiment. When first activated, replica computer 160 loads the appropriate virtual device drivers for access to host computer 104 and also loads appropriate communications software for access to the host computer (block 1300). Replica computer then loads communications software for accessing customer computers 50 via data link 150 (block 1302). Replica computer 160 then sets its modem 162, and waits for a customer connection (block 1304). When a customer access request comes in over the data link 150 and modem 162 (decision block 1306), replica computer 160 begins a replica server process (block 1308). Replica computer 160 then directs the host sign-on display to the customer computer 50, and passes user ID and password to the host computer (block 1310), and then issues local and/or remote commands and responds to prompts (block 1311). The replica computer 160 maintains the on-line session with customer computer 50 until the session is complete (as tested for by decision block 1312), at which time it disconnects and reloads all of its software ("yes" exit to decision block 1312). The customer and replica computers perform asone and same. System 100 needs to reload/IPL because it is not possible to know what the prior customer did. Also session completer refers to (block 1312) replica sign-off to host. The customer may sign-off the replica first, allowing commands to continue in the replica. Then the replica session ends—signing-off the host. The functions performed by steps 1314–1474 of FIGS. 24A–24J are basically the mirror images of similar steps performed by customer computer 50 as shown in FIGS. 14A–14H. FIG. 24D shows the steps performed by the replica computer 160 in conjunction/cooperation with customer computer 50 performing the steps shown in FIG. 14D, FIG. 24E shows the steps performed by replica computer 160 to terminate an on-line session with the customer computer 50 (see also Box 1388–1394 shown in FIG. 24F). The steps shown in FIG. 24G are performed by replica computer 160 in cooperation with customer computer 50 performing the steps shown in FIG. 14E. In this routine, block 1398 tests the commands to the replica computer 160. A host "PC Execution" command is considered a local command in this context, and are therefore routed to the customer computer 50 by the FIG. 24G routine in the same way that a local replica command is routed to the customer computer. Similarly, the steps shown in FIG. 24H are performed by replica computer 160 in cooperation with customer computer 50 performing the steps shown in FIG. 14F. Likewise, FIG. 24I shows the steps performed by replica computer 160 in cooperation with customer computer 50 performing the steps shown in FIG. 14G and FIG. 24J shows the steps performed by the replica computer when the customer computer is performing the steps shown in FIG. 14H.

FIG. 24K is a flowchart of the security routine performed by the on-line replica computer 160 to perform security checks. Its operation is similar to the customer computer security checks shown in FIG. 15.

Figure 24A:
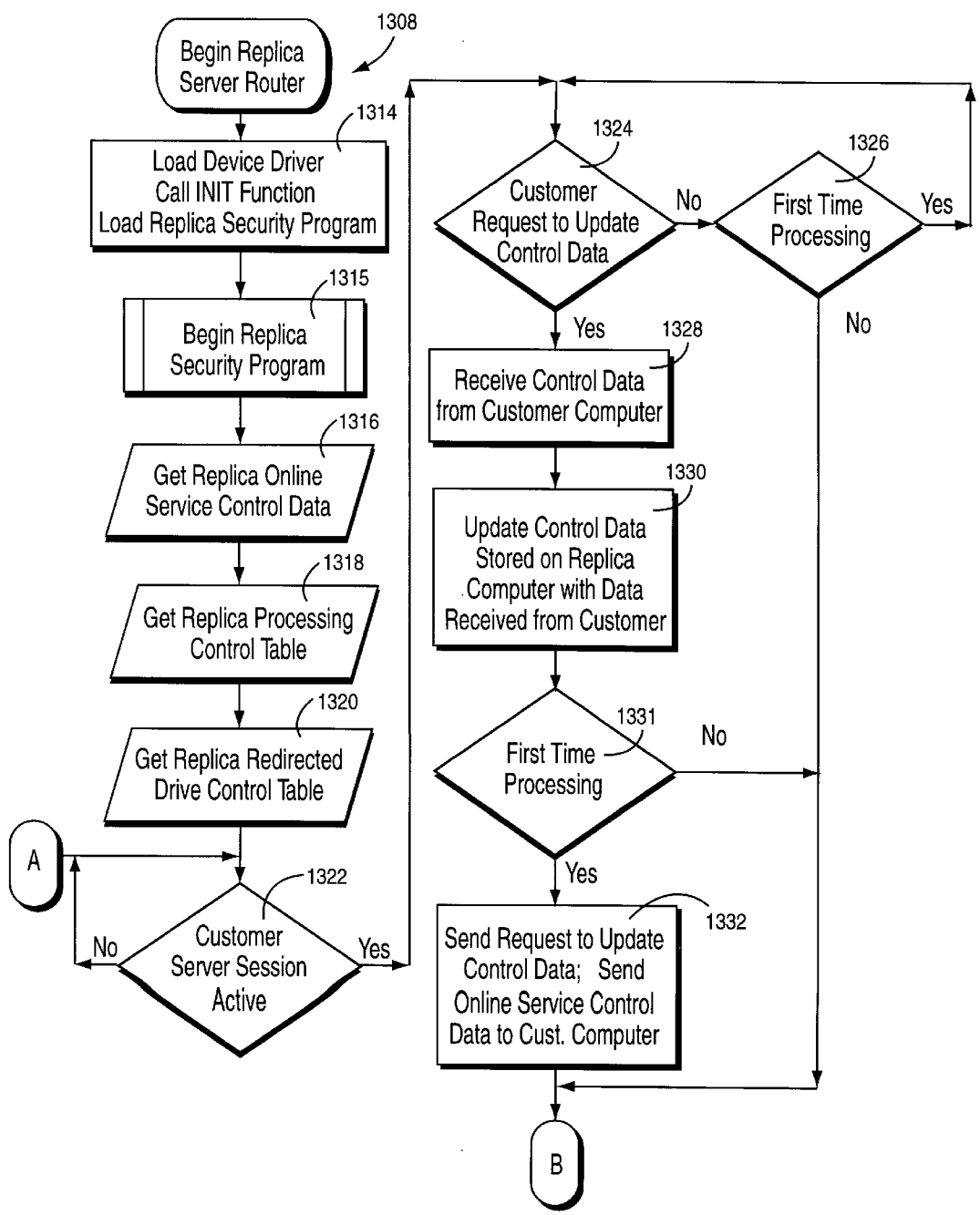
FIGS. 24A–24J together are a flowchart of exemplary program control steps performed by the replica computer of the preferred embodiment to effect the "begin replica server router" block of FIG. 23.
Figure 24B:
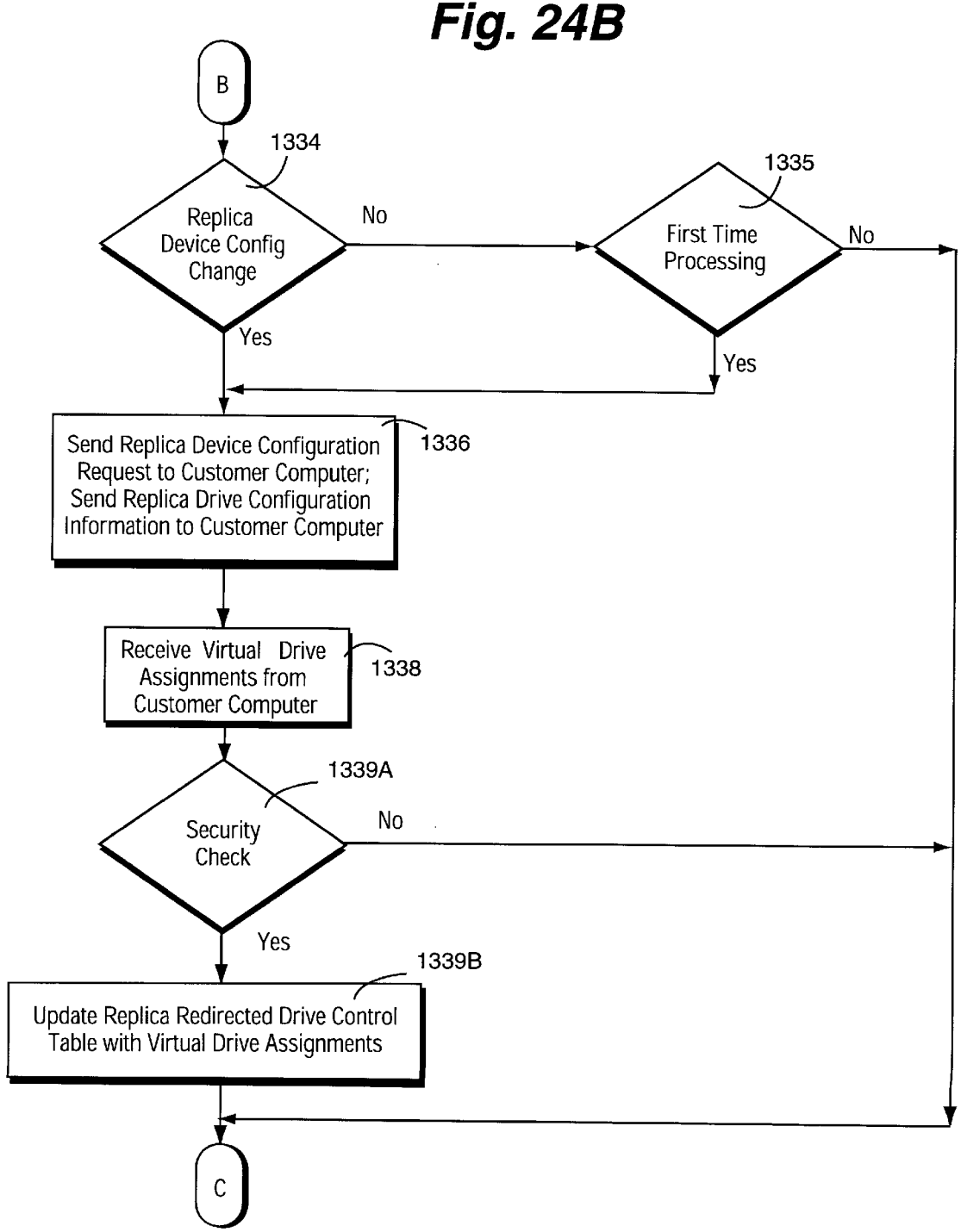
Figure 24C:
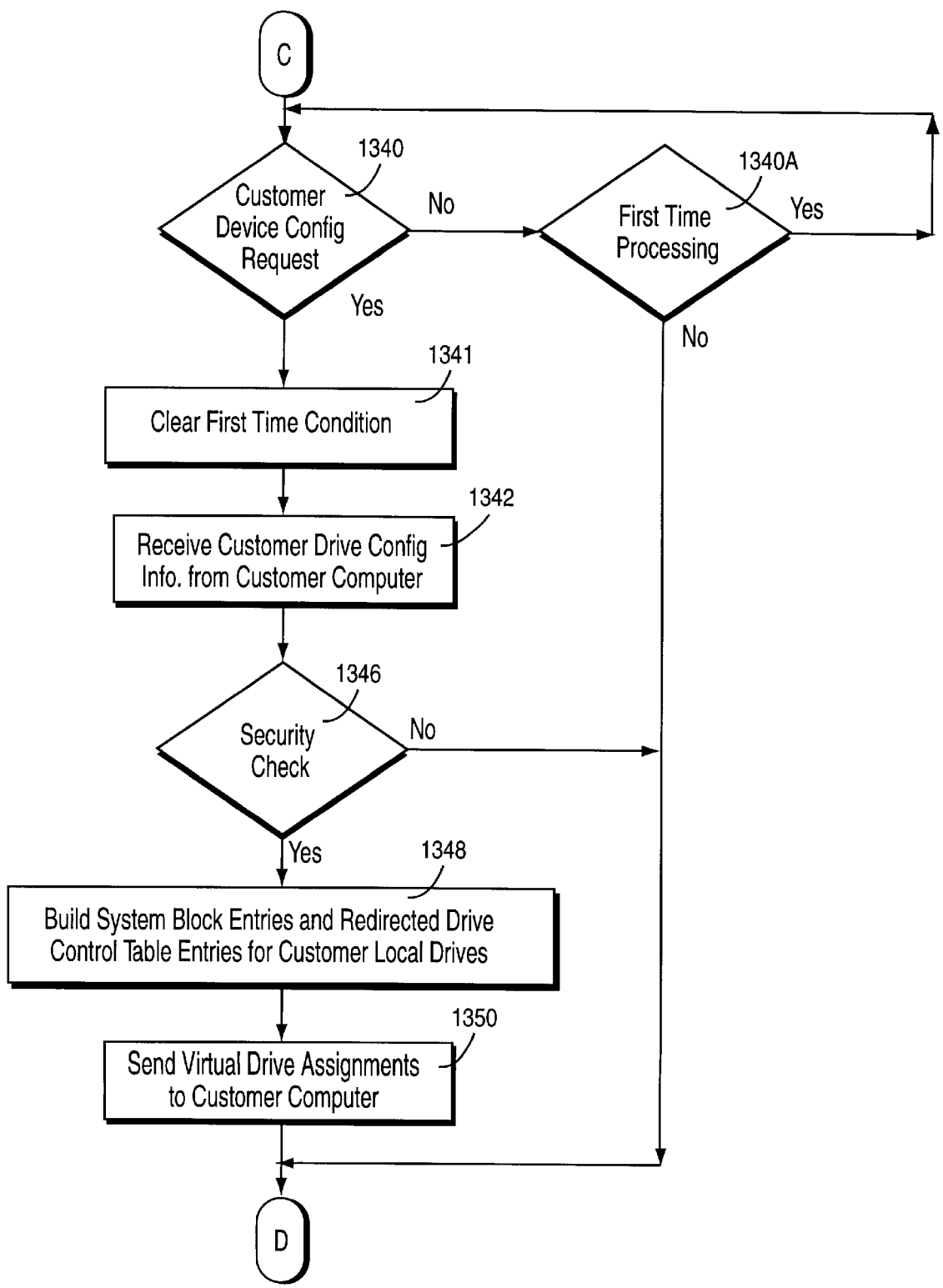
Figure 24D:
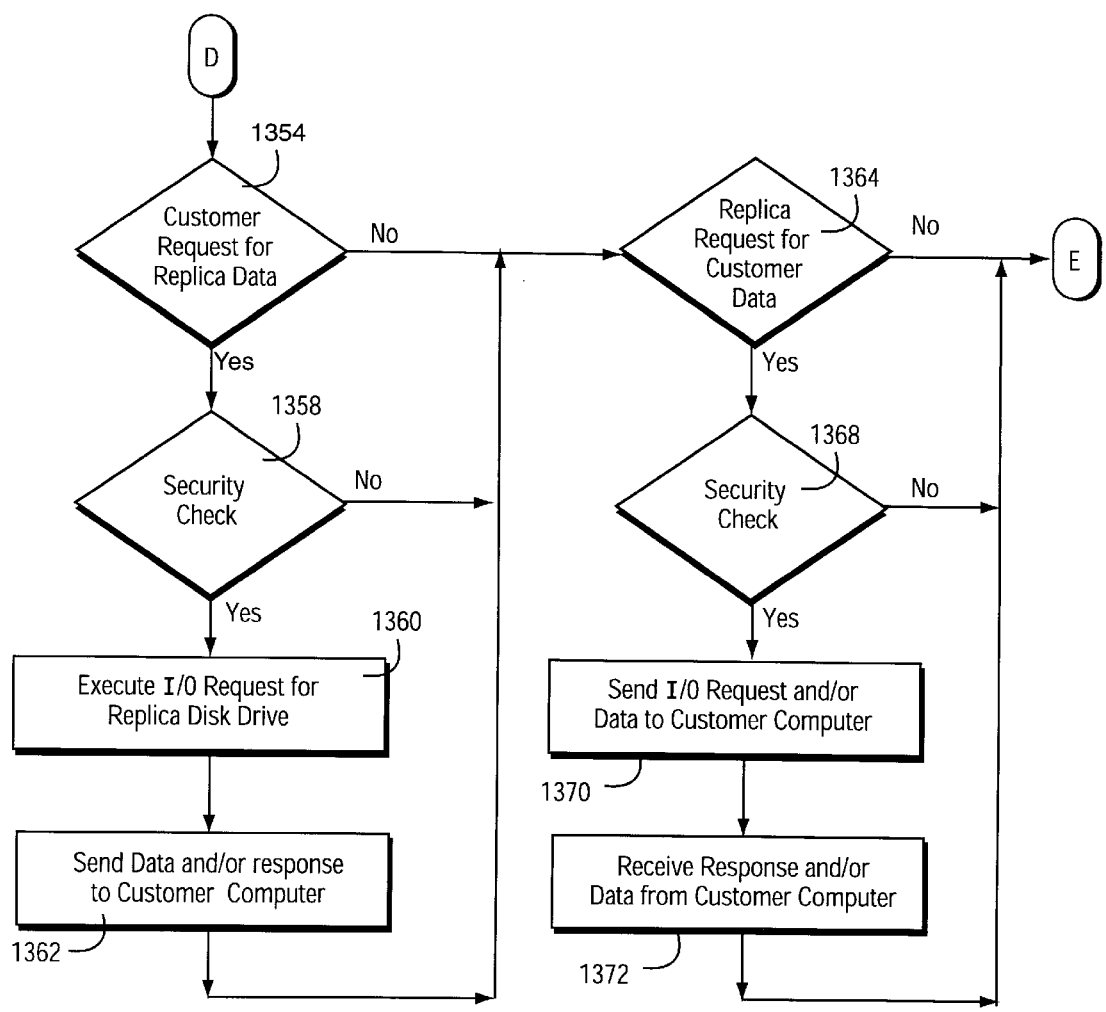
Figure 24E:
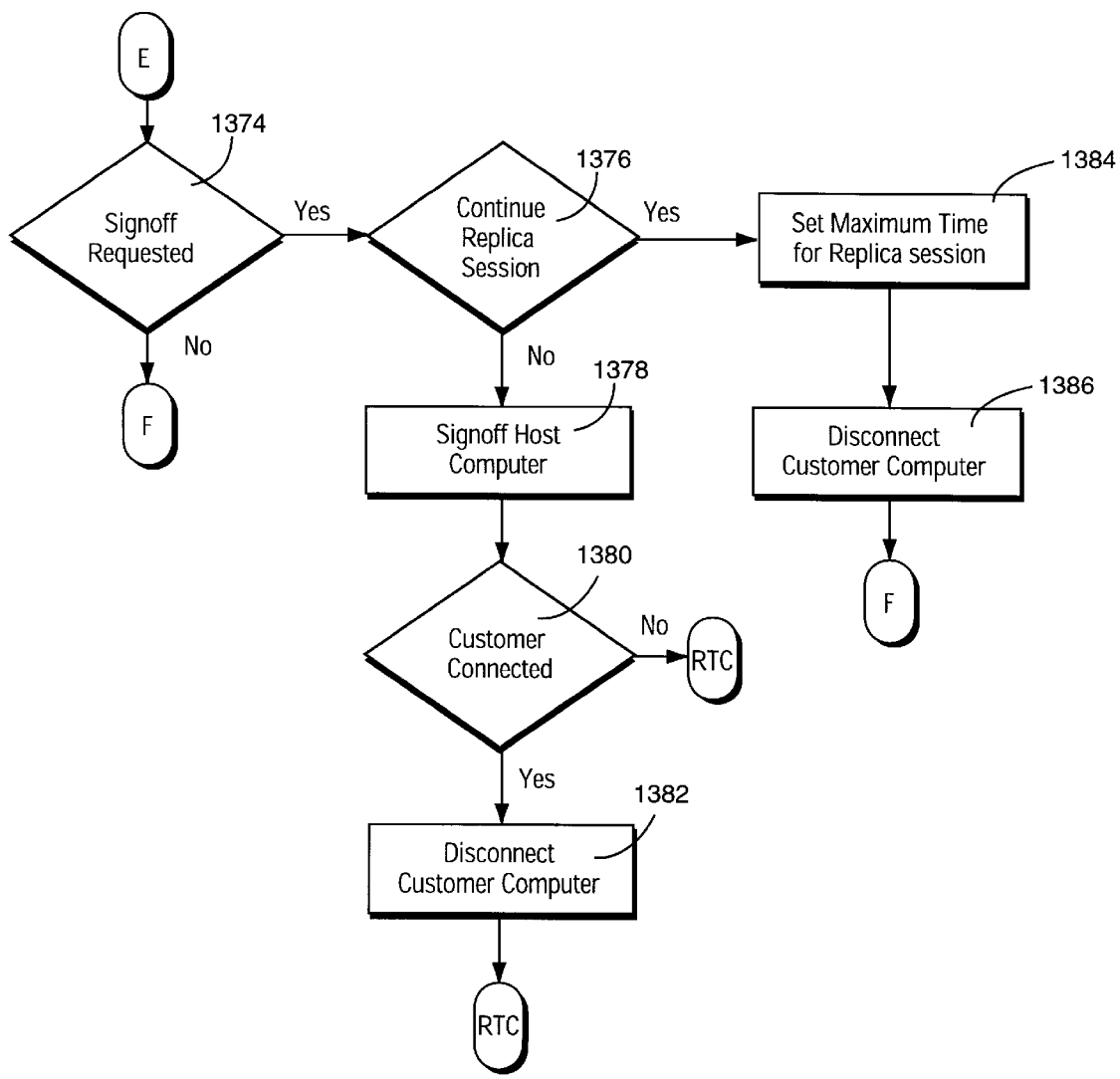
Figure 24F:
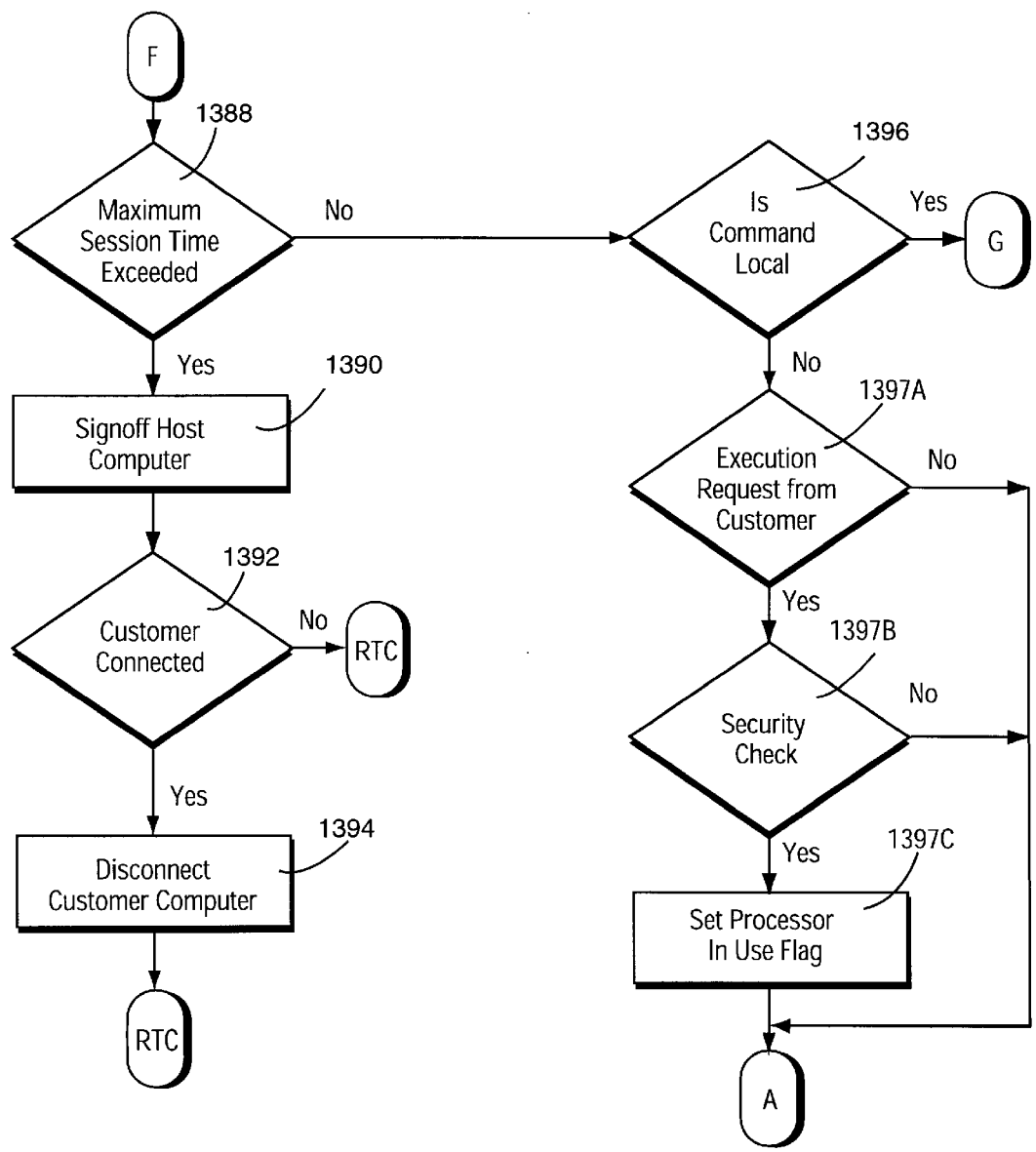
Figure 24G:
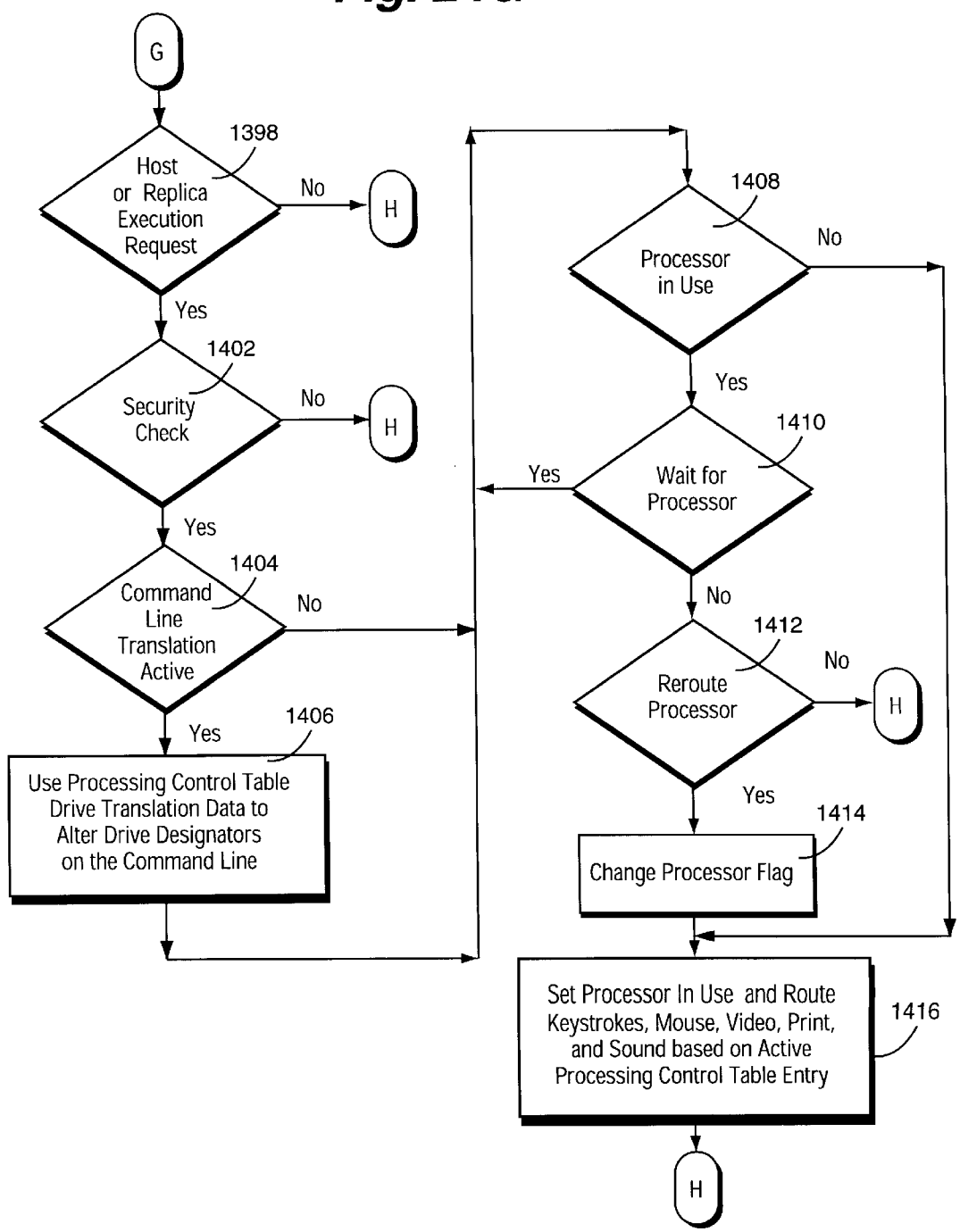
Figure 24H:
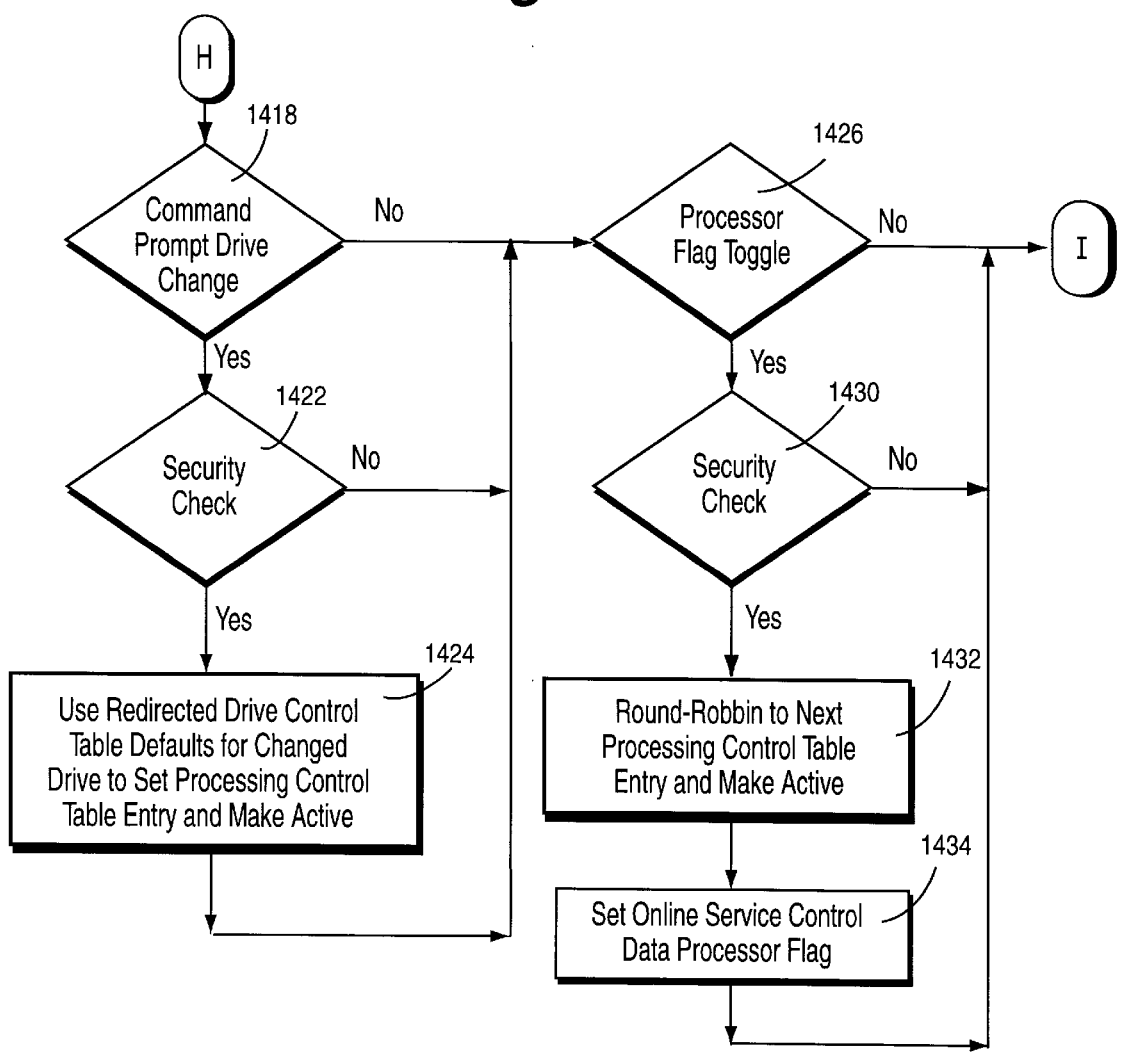
Figure 24I:
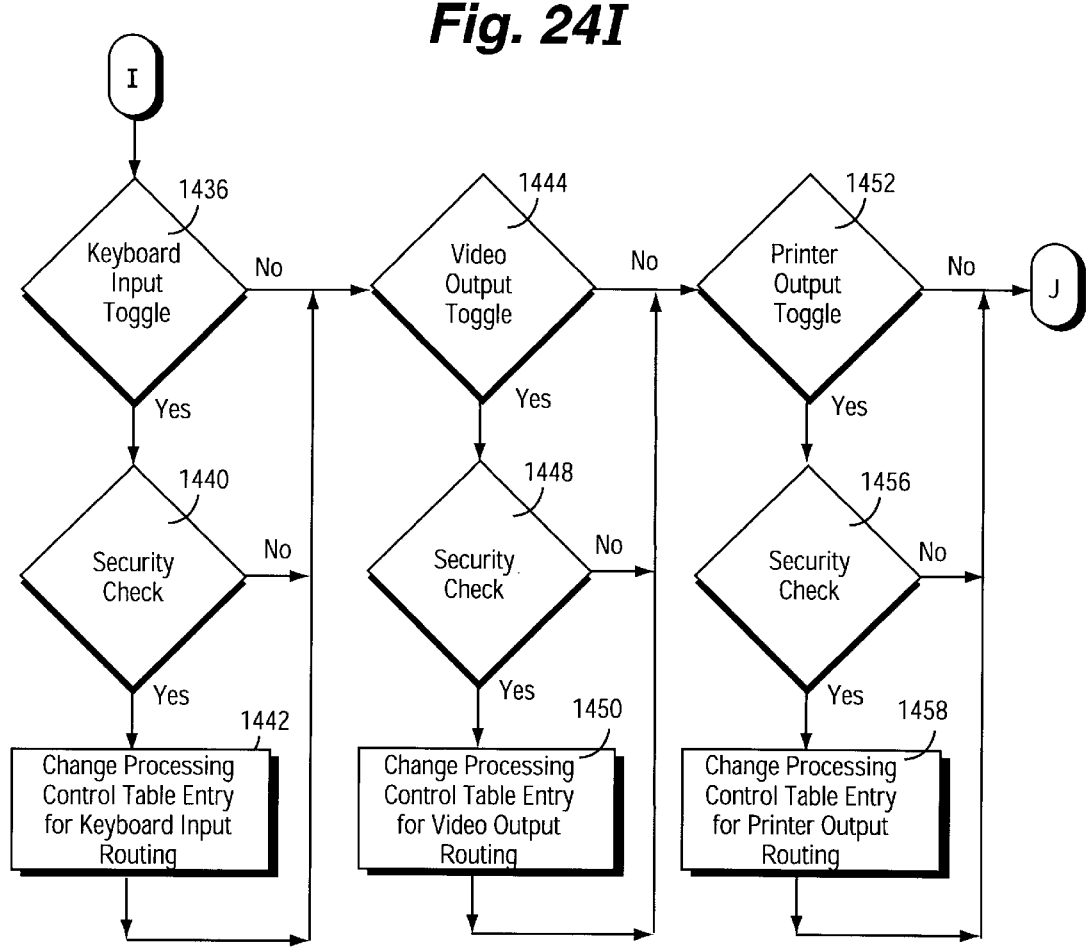
Figure 24J:
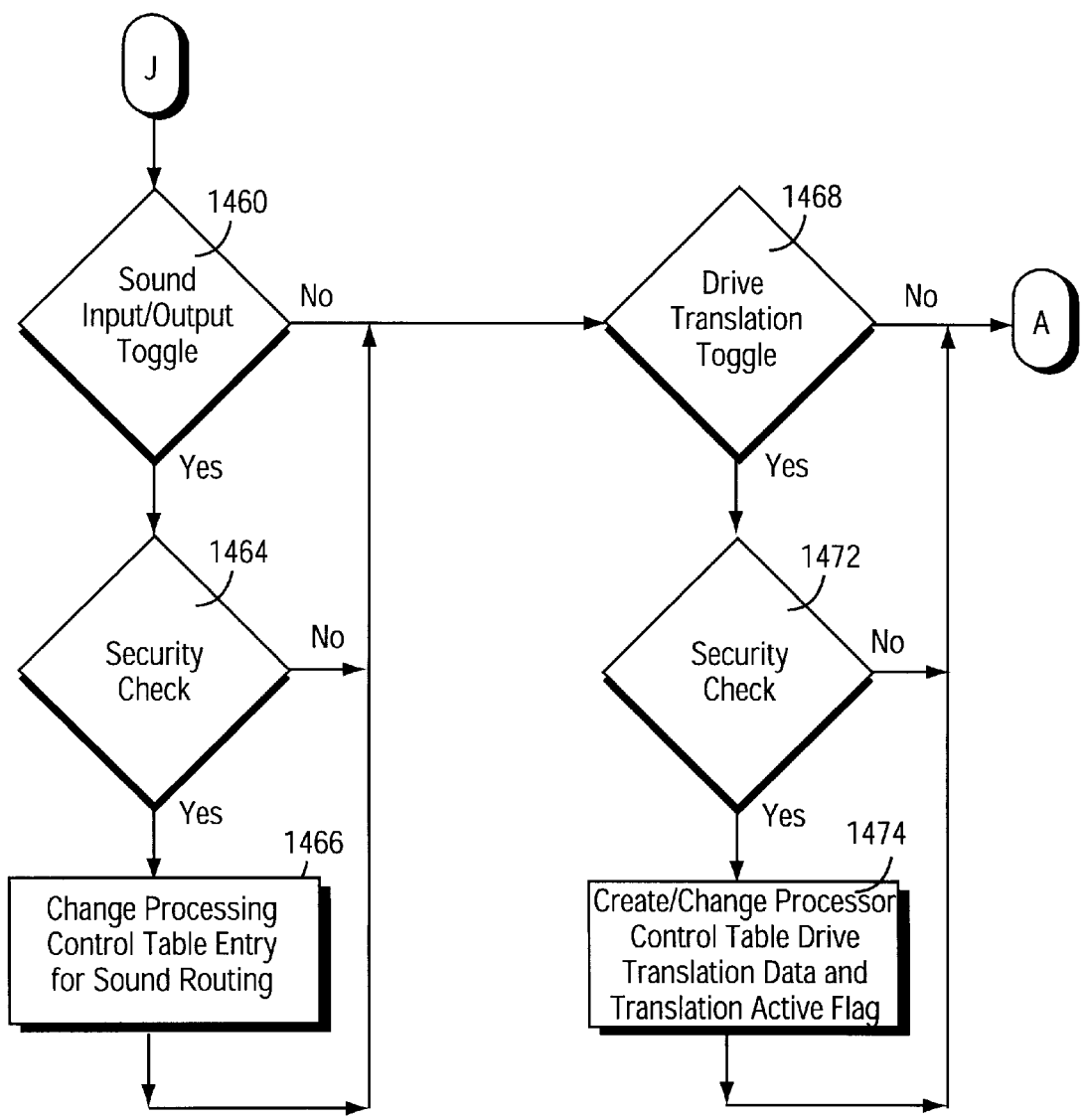
Figure 24K:
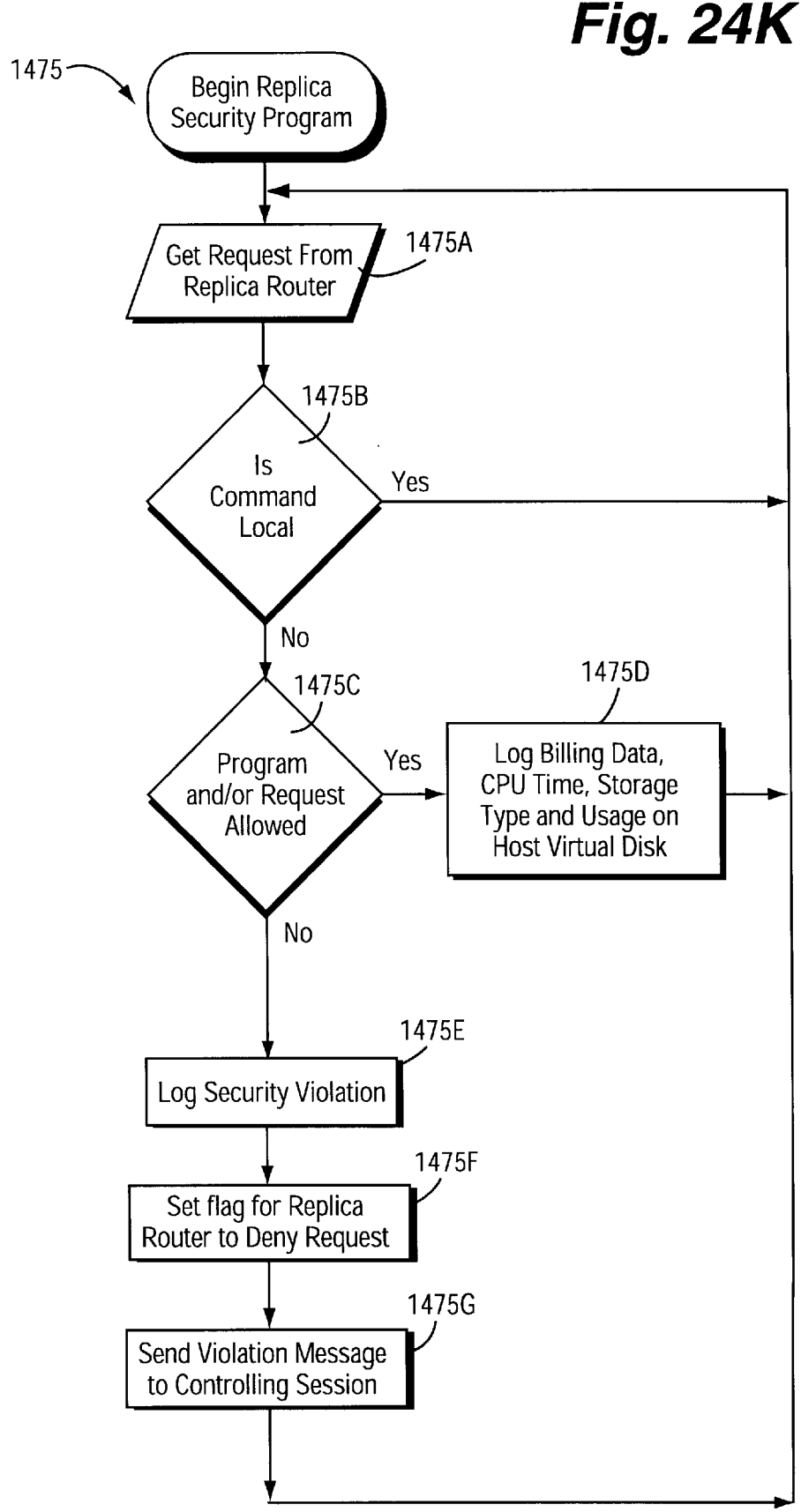
FIG. 24K is a flowchart of exemplary program control steps performed by the preferred embodiment replica computer to effect the "security check" block in FIGS. 24A–24J.

In more detail now, it should be noted that FIGS. 24A–24K are together a flowchart of exemplary program control steps performed by the replica computer 160 at FIG. 23, block 1308 to establish a connection with customer computer 50. This routine 1308 is performed when the replica computer 160 determines that the customer computer 50 has requested to establish a connection with replica computer 160 via modem 162 and data link 150, and executes for at least the duration of such a connection. Referring to FIG. 24A, replica computer 160 first loads an appropriate device driver, calls an "initialization" ("INIT") function, and then loads the replica security program used to validate access during the on-line session (block 1314). The replica security program (routine 1475 of FIG. 24K) then prepares itself to provide security checking functions for replica computer 160 (block 1315). The replica computer 160 then retrieves the replica control data table 1500 (block 1316) shown in FIG. 25A, as well as a processing control table 800 (block 1318) and a redirected drive control table 834 (block 1320). The explanation of FIGS. 14A–14H, described earlier in this specification, provides a detailed description of table 800 (FIG. 16B) and table 834 (FIG. 16C). Once the replica computer 160 has retrieved/constructed its basic data structures (blocks 1316–1320), it waits for a customer server session to become active (decision block 1322).

Continuing with FIG. 24A, once a session becomes active ("yes" exit to decision block 1322), the replica computer 160 tests whether the customer computer has issued a request to update control data (decision block 1324). If no request is received ("no" exit to decision block 1324), then routine 1308 checks if this is first time processing. If it is ("yes" exit to decision block 1326), then routine 1308 will loop back to block 1324 until the customer request to update control data is received. If this is not first time processing ("no" exit to decision block 1326), then control proceeds with a test for a replica device configuration change in block 1334 of FIG.

24B. If, on the other hand, a customer request to update control data was issued by the customer computer 50 ("yes" exit to decision block 1324), then the control data is received from the customer computer (block 1328), and this control data is used to update the control data stored on the replica computer 160 (block 1330). Then decision block 1331 tests whether this is first time A processing. If it is ("yes" exit to decision block 1331), then the replica computer 160 sends a request to the customer computer 50 to update control data and sends control data to the customer computer to be updated (block 1332). If this is not first time processing ("no" exit to decision block 1331), then block 1332 is bypassed.

Referring now to FIG. 24B, decision block 1334 tests whether a replica device configuration change has occurred. If no device configuration change was detected ("no" exit to decision block 1334), then first time processing is checked. If this is not first time processing ("no" exit to decision block 1335), then control proceeds to block 1340 of FIG. 24C, to test whether the customer computer is sending its device configuration information to the replica computer. If this is first time processing ("yes" exit to decision block 1335), or if a change to the replica device configuration has occurred ("yes" exit to decision block 1334), then the device configuration request and data are sent to the customer computer (block 1336), and the virtual drive assignments created by customer computer 50 are received from the customer computer (block 1338). Then routine 1475 in FIG. 24K is called to perform a security check (decision block 1339A) to make sure that the replica computer is allowed to update the replica redirected drive control table with virtual drive assignments. If allowed ("yes" exit to decision block 1339A), then block 1339B updates the virtual drive assignments in table 834 for the replica computer. If not allowed, then block 1339B is bypassed and control proceeds to FIG. 24C to test whether the customer computer is sending its device configuration information.

Referring now to FIG. 24C, routine 1308 tests whether the customer computer 50 has sent its device configuration information to the replica computer 160. If the customer computer has not sent its device configuration to the replica computer 160 ("no" exit to decision block 1340), then routine 1308 checks for first time processing. If it is ("yes" exit to decision block 1340A), then control loops back to block 1340 until the customer computer sends its device configuration to the replica computer. If this is not first time processing ("no" exit to decision block 1340A, then control proceeds to block 1354 of FIG. 24D to test for a customer request for replica data. If, on the other hand, a customer device configuration request is received ("yes" exit to decision block 1340), then the first time conditioning flag is cleared (block 1341), and the customer drive configuration information is received from customer computer 50 (block 1342). Then routine 1308 calls routine 1475 to perform a security check (decision block 1346) to make sure that the replica computer is allowed to build system block entries and redirected drive control table entries for the customers local drives. If the request is allowed ("yes" exit to decision block 1346), then routine 1308 builds the system block entries and redirected drive control table entries for the customers local drives (block 1348), and then sends the virtual drive assignments created in block 1348 to the customer computer 50 (block 1350). If the request is not allowed ("no" exit to decision block 1346), then blocks 1348 and 1350 are bypassed.

Continuing now with FIG. 24D, routine 1308 determines whether the customer computer 50 has made a request for data stored on the replica computer 160 (decision block 1354). If a customer request for replica data is received ("yes" exit to decision block 1354), and if the replica security program (routine 1475) determines the request is allowed ("yes" exit to decision block 1358), then the I/O request for the replica disk drive is performed (block 1360), and the data and/or response is sent to the customer computer 50 (block 1362). If, on the other hand, this is not a customer request for replica data ("no" exit to decision block 1354), or if the security check in decision block 1358 determines that the request is not allowed ("no" exit to decision block 1358), then control proceeds to block 1364 to test for a replica request for customer data.

FIG. 24D continues with a test to determine whether there is a replica request for customer data (decision block 1364). If there is ("yes" exit to decision block 1364), then the replica security routine 1475 is called to determine if the request is allowed. If the request is allowed ("yes" exit to decision block 1368), then routine 1308 sends the I/O request and/or data to the customer computer 50 (block 1370), and receives a response and/or data from the customer computer 50 (block 1372). If, on the other hand, this is not a replica request for customer data ("no" exit to decision block 1364), or if the replica security routine 1475 determines such a request is not allowed ("no" exit to decision block 1368), then control proceeds to block 1374 of FIG. 24E to test for a signoff request.

Continuing now with FIG. 24E, routine 1308 tests for a signoff request (decision block 1374). If this is not a signoff request ("no" exit to decision block 1374), then control proceeds to block 1388 of FIG. 24F to test if the maximum session time has been exceeded. If a signoff request has been issued ("yes" exit to decision block 1374), then the replica computer 160 tests for whether to continue the replica session (decision block 1376).

Referring to FIG. 24E again, if after a signoff request is issued (decision block 1374), it is determined that block 1500D of the replica control data table 1500 indicates that the replica computer 160 should continue the online session with host computer 104 after the customer disconnects ("yes" exit to decision block 1376), then the maximum time for the replica session is updated in block 1500E of replica control data table 1500 (block 1384), the customer computer is disconnected (block 1386), and control proceeds to block 1388 of FIG. 24F to test if the maximum session time has been exceeded. If, on the other hand, data block 1500D of replica control data table 1500 indicates that the replica session is not to be continued after the customer disconnects ("no" exit to decision block 1376), then the session with host computer 104 is ended (block 1378), and a test is performed to determine whether the customer computer 50 is still connected to the replica computer 160. If the customer computer is connected ("yes" exit to decision block 1380), then the customer computer 50 is disconnected from the replica computer 160 (block 1382). In any event, regardless of decision block 1380, if block 1376 determines that the replica session is not to be continued ("no" exit to decision block 1376), control returns to the caller. Now that the replica session is complete ("yes" exit to decision block 1312 in FIG. 23), the replica server computer then reboots to prepare for the next on-line replica session.

Referring now to FIG. 24F, decision block 1388 checks to see if the maximum session time, as indicated by data block 1500E in replica control data table 1500, has been exceeded. If the maximum session time has been exceeded ("yes" exit to decision block 1388), then the replica computer 160 ends the on-line session with host computer 104 (block 1390), and a test is performed to determine whether the customer computer 50 is still connected to replica computer 160. If the customer computer is connected ("yes" exit to decision block 1392), then the customer computer 50 is disconnected from replica computer 160 (block 1394), and control returns to the caller. If the customer computer 50 is not connected ("no" exit to decision block 1392), then control also returns to the caller. As previously discussed, now that the replica session is complete ("yes" exit to decision block 1312 in FIG. 23), the replica server computer then reboots to prepare for the next on-line replica session.

Continuing with FIG. 24F, if the maximum session time has not been exceeded ("no" exit to decision block 1388), then a test is performed to determine if this is a local command. If this is a local command ("yes" exit to decision block 1396), then control proceeds to block 1398 of FIG. 24G to test for a host or replica execution request. If however, this was not a local command ("no" exit to decision block 1396), then a test is performed to determine whether this is an execution request from the customer computer 50. If it is ("yes" exit to decision block 1379A), then replica security routine 1475 is performed to see if the execution request is allowed. If it is allowed ("yes" exit to decision block 1379B), then the processor in use flag (data block 806 in processing control table 800) is set (block 1397C) and control loops back to tag "A" of FIG. 24A (preceding the customer server session active test block 1322). As previously indicated in the description of FIGS. 14A–14H, the replica computer 160 executes the task based on commands provided by the customer computer 50 to the keyboard buffer of the replica computer. If this is not an execution request from the customer computer 50 ("no" exit to decision block 1379A), or if it is an execution request but it is not allowed ("no" exit to decision block 1379B), then again control loops back to tag "A" of FIG. 24A.

Referring now to FIG. 24G, decision block 1398 tests whether this is a host or replica execution request. As noted previously, host requests for "PC Execution" are considered local requests to routine 1308. In any event, if this is a host or replica execution request ("yes" exit to decision block 1398), then a test is performed to determine if the execution request is allowed. If it is not ("no" exit to decision block 1402), or in the cases when this is not a host or replica execution request ("no" exit to decision block 1398), then control proceeds to test for a command prompt drive change at decision block 1418 in FIG. 24H. If, however, the command is allowed ("yes" exit to decision block 1402), then a test is performed on block 812 of processing control table 800 to determine whether command line translation is active. If command line translation is active ("yes" exit to decision block 1404), then replica computer 160 uses its processing control table 800 and the drive translation data stored within the drive translation table (block 814) to alter drive designators on the command line (block 1406). If command line translation is not active ("no" exit to decision block 1404), then block 1406 is bypassed. Routine 1308 then determines whether the appropriate processor is in use. If the processor is in use ("yes" exit to decision block 1408), then routine 1308 interrogates processing control table entries 833A, 833B to determine whether it should wait for the processor (decision block 1410) or to reroute the processor (decision block 1412). If it is determined that routine 1308 should wait for the processor ("yes" exit to decision block 1410), then control loops back to test for processor in use (decision block 1408) until the processor is no longer in use. If routine 1308 is not to wait for processor ("no" exit to decision block 1410), then a test is made on processing control table entry 833B to determine if the processor is to be rerouted. If it is not to be rerouted ("no" exit to decision block 1412), control proceeds to test for a command prompt drive change in block 1418 of FIG. 24H. If the command is to be rerouted ("yes" exit to decision block 1412), then the processor flag 649A within online service control table 501 (stored in block 1500A of replica control data table 1500, FIG. 25A) is changed to reflect the appropriate processor to which the task has been routed (block 1414). Next, and also in cases where it was determined that the processor is not in use in decision block 1408 ("no" exit to block 1408), block 1416 sets the processor in use flag 806, and routes the keystrokes, mouse, video, print, and sound based upon the active processing control table entries 818–830 (block 1416).

Continuing now with FIG. 24H, decision block 1418 tests whether there is a command prompt drive change request. If there is such a request ("yes" exit to decision block 1418), then the replica security program is performed to validate the request as part of security check (block 1422), and if the function is validated "yes" exit to decision block 1422), then the redirected drive control table 834 is accessed and if defaults are to be set (field 864 is YES), then the associated default values for the changed drive (see field 864, 850–860) are set within the processing control table 800, fields 808, 812, 818–832 and the default processor flag (field 862) on the redirected drive control table 834 is used to set the processor flag (field 649A) on the on-line service control data 501 table stored as block 1500A of replica control data table 1500 (block 1424). In those cases where there is not a command prompt drive change request ("no" exit to decision block 1418), or when the change request is not allowed ("no" exit to decision block 1422), then control proceeds to decision block 1426 to test for a processor flag toggle.

Routine 1308 then tests whether there is a processor flag toggle. If there is ("yes" exit to decision block 1426), the replica security program is performed as part of security check (block 1430) to validate the processor flag toggle request. If allowed ("yes" exit to decision block 1430), then a "round robin" processing to the next processing control table entry is performed (block 1432), from which the on-line service control data 501 processor flag 649A (stored in block 1500A of replica control data table 1500) is then set (block 1434). In those cases where there is not a processor flag toggle request ("no" exit to decision block 1426), or when the processor flag toggle request is not allowed ("no" exit to decision block 1430), then control proceeds to decision block 1436 to test for a keyboard input toggle.

Continuing now with FIG. 24I, decision block 1436 is tested to determine if the keyboard input is to be toggled. If it is ("yes" exit to decision block 1436), then the replica security program is performed as part of security check (block 1440). If the toggle is allowed ("yes" exit to decision block 1440), then the alternate parameter (customer/replica) is set within block 818 in processing control table 800 (block 1442). If this is not a request for keyboard input toggle ("no" exit to decision block 1436), or if the command is not allowed ("no" exit to decision block 1440), then control proceeds to decision block 1444 to test for a video output toggle. Next, decision block 1444 is tested to determine if the video output is to be toggled. If it is ("yes" exit to decision block 1444), then the replica security program is performed as part of security check (block 1448). If the toggle is allowed ("yes" exit to decision block 1448), then the alternate parameter (customer/replica) is set within block 822 in processing control table 800 (block 1450). If this is not a request for video output toggle ("no" exit to decision block 1444), or if the command is not allowed ("no" exit to decision block 1448), then control proceeds to decision block 1452 to test for a printer output toggle. Next, decision block 1452 is tested to determine if the printer output is to be toggled. If it is ("yes" exit to decision block 1452), then the replica security program is performed as part of security check (block 1456). If the toggle is allowed ("yes" exit to decision block 1456), then the alternate parameter (customer/replica) is set within block 824 in processing control table 800 (block 1458). If this is not a request for printer output toggle ("no" exit to decision block 1452), or if the command is not allowed ("no" exit to decision block 1456), then control proceeds to decision block 1460 in FIG. 24J to test for a sound input/output toggle.

Continuing now with FIG. 24J, decision block 1460 is tested to determine if the sound input/output is to be toggled. If it is ("yes" exit to decision block 1460), then the replica security program is performed as part of security check (block 1464). If the toggle is allowed ("yes" exit to decision block 1464), then the alternate parameter (customer/replica) is set within blocks 826/828 in processing control table 800 (block 1466). If this is not a request for sound input/output toggle ("no" exit to decision block 1460), or if the command is not allowed ("no" exit to decision block 1464), then control proceeds to decision block 1468 to test for a drive translation toggle. Next, decision block 1468 is tested to determine if the drive translation is to be toggled. If it is ("yes" exit to decision block 1468), then the replica security program is performed as part of security check (block 1472). If the toggle is allowed ("yes" exit to decision block 1472), then the alternate drive translation data parameters are set within data blocks 812 and 814 in processing control table 800 (block 1474). If this is not a request for drive translation toggle ("no" exit to decision block 1468), or if the command is not allowed ("no" exit to decision block 1472), and also in the cases when the drive translation is performed, then control loops back to tag "A" (preceding block 1322) of FIG. 24A.

FIG. 24K is a flowchart of exemplary program control steps performed by replica computer 160 as part of the "replica security program" shown repeatedly in FIGS. 24A–24J.

FIG. 24K is a flowchart of program control steps performed by replica computer 160 to execute the "security check" routine shown in FIGS. 24A–24J. The purpose of the security check is to ensure that only "authorized" tasks are performed. Routine 1475 first obtains the command (block 1475A) and determines whether it was generated locally or by remote computer (i.e. from the replica computer 160 or host computer 104 or from customer computer 50). As previously noted in this specification, a command originating from the host computer is considered to be a local command to the replica computer 160. If the command is local ("yes" exit to decision block 1475B), then no further security checking for this command is performed and control returns to the security check caller. If this is not a local command ("no" exit to decision block 1475B), then the command originated from the customer computer 50, and a test is performed to determine if the program and/or request is allowed. If allowed ("yes" exit to decision block 1475C), appropriate information is typically logged at the host computer 104 or replica computer 160 system virtual disk for billing (block 1475D). If the command is not allowed ("no" exit to decision block 1475C), a security violation is logged at the replica server router routine 1308 (block 1475E), a flag is set to tell the replica server router routine 1308 to deny the request (block 1475F), and a violation message is sent to the controlling session (block 1475G). Control then returns to the security check caller.

Figure 25B:
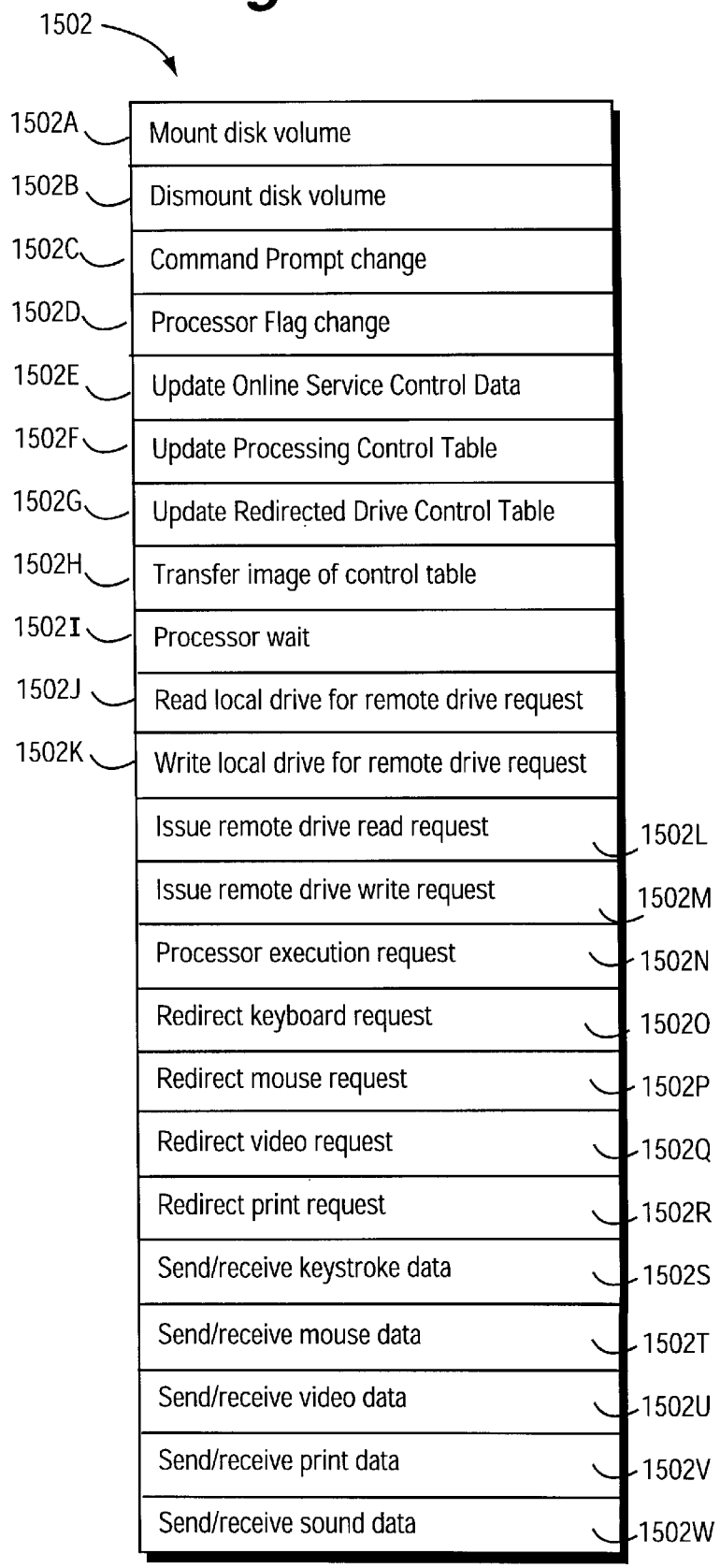
FIG. 25B schematically illustrates some of the requests managed by the customer and replica server router programs in the preferred embodiment.

FIG. 25B shows some examples of requests that can be performed by customer computer 50 or replica computer 160 as part of the online replica session. In the preferred environment, the online replica request options shown in replica server router requests block 1502 can include, but are not limited to:

Mount disk volume (1502A)
    Mount a disk volume on replica or customer computer Dismount disk volume (1502B)
    Dismount a disk volume on replica or customer computer Command prompt change (1502C)
    Change the command prompt for customer or replica computer Processor flag change (1502D)
    Change the processor flag for the customer or replica computer Update online service control data (1502E)
    Update the online service control data on the customer or replica computer Update processing control table (1502F)
    Update the processing control table on customer or replica computer Update redirected drive control table (1502G)
    Update the redirected drive control table on customer or replica computer Transfer image of control table (1502H)
    Transfer an image of control table to replica or customer computer Processor wait (1502I)
    Wait for processor on replica or customer computer Read local drive for remote drive request (1502J)
    Local device access for remote virtual device on replica or customer computer Write local drive for remote drive request (1502K)
    Local device write access for remote virtual device on replica or customer computer Issue remote drive read request (1502L)
    Remote device access for virtual device on replica or customer computer Issue remote drive write request (1502M)
    Remote device write access for virtual device on replica or customer computer Processor execution request (1502N)
    Processor execution request from replica or customer computer Redirect keyboard request (1502O)
    Redirect keyboard on replica or customer computer Redirect mouse request (1502P)
    Redirect mouse on replica or customer computer Redirect video request (1502Q)
    Redirect video on replica or customer computer Redirect print request (1502R)
    Redirect printer output on replica or customer computer Send/Receive keystroke data (1502S)
    Allow replica or customer computer to send or receive keystroke data Send/Receive mouse data (1502T)
    Allow replica or customer computer to send or receive mouse data Send/Receive video data (1502U)
   Allow replica or customer computer to send or receive video data
Send/Receive print data (1502V)
   Allow replica or customer computer to send or receive print data
Send/Receive sound data (1502W)
   Allow replica or customer computer to send or receive sound data FIG. 25A shows a data structure maintained by replica computer 160 in order to manage its operation. In FIG. 25A (Replica Control Data block 1500), block 1500A represents an image of the customer on-line service control data block 501 of FIG. 16A. In the preferred embodiment, most data structures (excluding block 649A, 649B, 649D, 649E) in this control data block 501 are obtained from customer computer 50 by on-line replica computer 160 during initial message exchanges between the two computers (see FIG. 14A). Block 1500B of FIG. 25A represents the processing control table (see FIG. 16B), which replica computer 160 obtains from host virtual disk or replica local storage. FIG. 25A block 1500C represents the redirected drive control table for replica computer 160. This replica redirected drive control table has the same format as the customer redirected drive control table (see FIG. 16C), although it may have different contents pertaining to the replica computer 160. The replica computer 160 and the customer computer 50 each build their respective redirected drive control tables based on information they receive from the other computer (see FIGS. 14B, 14C). FIG. 25A block 1500D determines if the replica should continue the session after the customer disconnects. Block 1500E sets a maximum time the replica session can continue after the customer disconnects. Block 1500F stores the time the customer computer 50 disconnected from the replica computer 160. Block 1500G maintains various hardware configuration information about the replica computer 160. Block 1500H maintains session configuration information used by the replica computer 160 to connect to the host computer 104, and block 1500I maintains session configuration information used by the replica computer 160 to connect to the customer computer 50.

Figure 26:
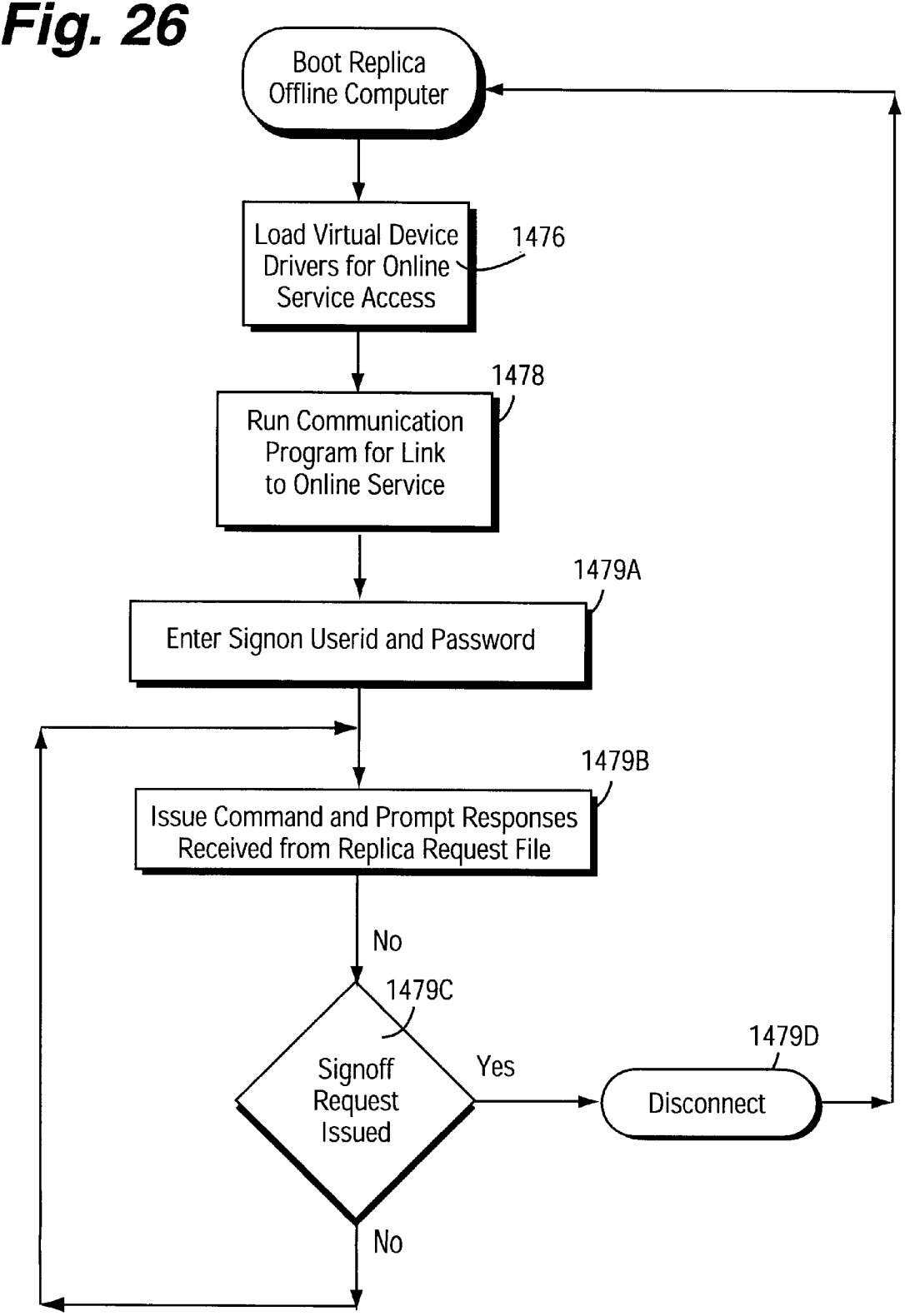
FIG. 26 is a flowchart of exemplary program control steps performed to boot up and operate the off-line replica computer in the preferred embodiment.

XI. Detailed Flowchart of Exemplary Off-Line Replica Computer Tasks and Data Structures FIG. 26 is a flowchart of exemplary program steps performed by replica computer 160 when it is operating as an off-line replica computer. The steps shown in FIG. 26 are similar to those shown in FIG. 13 used to Begin Host Session except that commands at the replica computer are received from a replica request file provided by the host. As shown in FIG. 26, the off-line replica computer 160 loads virtual device drivers for host access in a manner that is similar to the customer's computer 50 (1476). Off-line replica computer 160 similarly establishes a link to host computer 104 (1478), and signs on using a user ID that limits access to replica processes (blocks 1479A). As seen in blocks 916 and 917 of FIG. 17, the sign on program executed by host computer 104 for the off-line replica computer 160 (routine 917 of FIG. 21 F) is different from the sign on program used by customer computers 50 (routine 916 of FIG. 21A). This is because user interaction is not allowed for the replica computer. The sign on program simply loops on reading replica data and performs the specified tasks (block 1479B). One of the specified tasks may be a Signoff Request, tested for in decision block 1479C. If a signoff request is issued ("yes" exit to block 1479C), block 1479D will disconnect the replica computer. If no signoff request is issued ("no" exit to block 1479C), the program loops back to block 1479B to read more replica data and performs the specified tasks.

XII. On-Line Service Sign Up Process

Figure 27:
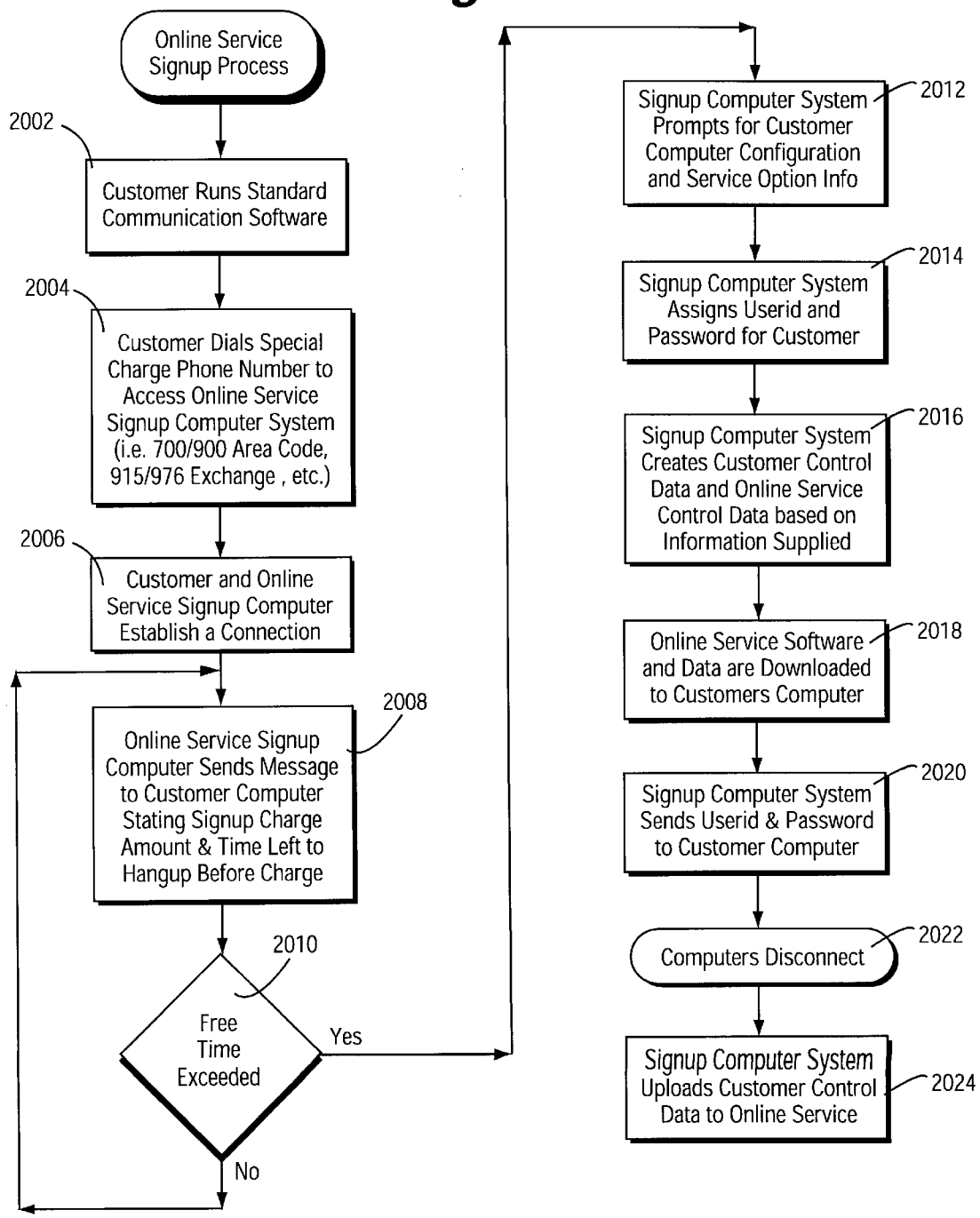
FIG. 27 is a flowchart of exemplary program control steps performed by a preferred embodiment on-line service sign-up computer in order to issue new account numbers for the on-line service.

FIG. 27 is a flowchart of exemplary program control steps performed by replica computer 160 (or even a stand-alone personal computer connected to a modem in a dial up telephone line) in order to sign up new users of on-line service system 100. The "sign up" process in a preferred embodiment rapidly grants new users access rights so that they can immediately begin using the on-line system 100. Referring to FIG. 27, a new customer runs standard communications software on his personal computer to access the sign on computer, which also runs standard communications software (block 2002). The customer uses his computer 50 and modem 80 to dial a special charge telephone number to access the on-line service sign up computer system (block 2004). For example, this special charge telephone number may be a "700" or "900" area code, a "915" or "976" exchange telephone number, or other similar numbers that are reserved by the telephone company and set aside for automatic charging of goods and services. Via this special telephone number, an on-line connection is established between the new customer and the on-line service sign up computer (block 2006). The on-line service computer then sends a message to the new perspective customer computer stating sign up charge amount and time left to hang up before the charge will be incurred (block 2008). Basically, the perspective customer is told to hang up within a time period or he will be charged for on-line service sign up ("no" exit to decision block 2010). If the specified amount of time is exceeded and the customer has not yet hung up ("yes" exit to decision block 2010), the telephone company will automatically charge the new customer a given flat fee specified by the information provided that runs the on-line service system 100. At this point, the new customer is queried for various customer computer configuration and service option information (block 2012) so that the on-line service sign up computer can begin to build portions of a customer control data block 1002 of the type shown in FIG. 22B. The sign up computer system then assigns a user ID and password to the new customer (block 2014), and completes the customer control data 1002 and on-line service control data 501 (FIG. 16A) based upon the information it has supplied (block 2016). The on-line service software and data are then downloaded automatically to the customer's computer via modem using conventional data packet transmission techniques (block 2018). This on-line service software, as described above, permits the customer computer 50 to access the on-line service system 100. The sign up computer system then sends the user ID and password to the customer computer (block 2020), and the computer disconnects (block 2022). Finally, the sign up computer system uploads the customer control block 1002 to the host computer 104 (e.g., this uploading may be in a batch mode) so that the host computer recognizes the new customer (block 2024).

XIII. Billing

The on-line service described in the preferred embodiment is designed to capture and provide billing in a number of ways:

(a) In the case of remote access with a Telco special charge phone number, access can be provided by a per minute charge associated with the phone number used to access the system. This arrangement involves an agreement between the Telco provider and the On-line Service to charge a fixed rate by minute for access by this telephone number. The host system continues to capture and log time and access charges for services and optionally this information can be provided to the Telco to assess a customers charge for special charge pay telephone number. In any event, the customer bill appears on the customers telephone bill in the event of special charge Telco access.

(b) Customers can be charged a flat fee for monthly usage on the system. A one time subscription fee may also be charged to initially set up the customer on the system. A flat fee could be based on the type and amount of storage and access desired. For instance the monthly charge may be less for a customer desiring access to virtual disks owned by the customer than for another customer subscribing to Release Update Services, or to another customer paying a monthly charge for rental access to a certain program or information file.

(c) Customers can also be charged a per use fee based on the amount of time and/or the amount of virtual disk storage read or written on behalf of the client. In this case the customer may be notified before said access of the impending fees to be assessed if the request option is continued.

Billing information is captured in several ways in the preferred embodiment. Upon each sign-on and sign-off, the user ID and date & time are written for billing purposes, along with an identification of the type of activity, in this case, sign-on or sign-off. As each host based menu option or command (or Host Request, or Off-line Request) is performed on behalf of a customer, the user ID, start and ending time, request name and other pertinent billing information is logged as billing data (FIG. 22F). The actual charge for requests is defined in a separate charge file (FIG. 22G). Separate charges may be assessed if the request is performed during a regular customer link to the host, an On-line Replica Server Session, or an Off-line Replica processing request on behalf of a customer. Charges may be assessed by the minute, using a monthly base charge (optionally including a per minute charge), and by per use.

The Host Security program (specified as the Virtual Disk Router User Exit program), the Replica Security program, and the customer computer program intercept all drive access requests and log billing data for storage used and commands (requests) issued during personal computer interaction (during secondary processor execution, for instance). The Customer Security program logs billing information when On-line Service personnel at an On-line Replica Server computer issue commands that run in the customer processor or access data stored on the customer computer on behalf of the customer as in training, troubleshooting or performing diagnostics for the customer. The Host Security program logs all billing data for access to host based virtual devices used by the customer or replica computer. In the case of Off-line replica computer processing, the User ID of the Replica processor is actually logged for billing. A monthly billing program is required to identify completed Off-line Requests logged as Billing data (host based menu and command requests log the User ID of the Customer as read from the Off-line Replica Request data, along with the Replica user ID) and collates command and storage usage charges assessed by the security programs into the Billing Data file by matching Off-line Request begin and ending times for the host based command or menu option (which may be a host command to invoke a secondary command processor if commands were logged for billing as well as storage charges by the security program) with command and storage usage charge data written by the security program during the Off-line Session. Each Off-line Replica Request has a start and ending time logged as billing data, therefore the (security program) logged Billing Data that falls within this start and end time and has the same replica user ID are assigned a user ID belonging to the customer that originally issued the Off-line Request. In any event, billing activity is captured during command begin and end, log-on and log-off, and during access to virtual disk data. This provides the necessary provisions to correctly bill a customer for all types of access on the on-line service.

In the preferred embodiment, host computer 104 maintains billing records in the form of a billing data log 1008 shown in FIG. 22F. This billing data block contains the following information useful for billing purposes:

User ID Field 1008A
   User ID of the customer associated with the task.
Date/Time Started Field 1008B
   When the request began.
Date/Time Completed Field 1008C
   When the request ended.
Request Field 1008D
   Identifies the request.
Request Successful Field 1008E
   Flag to indicate if the request completed successfully.
Customer/Host Replica Request Field 1008F
   Flag to indicate if the request originated as a host request or as a customer request.
Processor Type Field 1008G
   Indicates if request performed on host computer 104, customer computer 50, or replica computer 160.
Telco Billing Flag Field 1008H
   Flag to indicate that this request was issued while the customer used a special charge pay Telco number such as a 900 area code phone number.
CPU Time, Storage Type and Usage Field 1008I
   Used to bill customer for storage charges.
Printer Type and Charges Field 1008J
   Used to bill customer for printer charges.
Charge Amount Field 1008K
   Amount charged to perform the request. An on-line session itself is a request and a charge amount is assessed for the requested session start and end time less the time performing specific requests during the on-line session.

In the preferred embodiment, host computer also maintains a Charge Table 1010 shown in FIG. 22G that stores the following:

Request Field 1010A
   Identifies the request.
Customer/Host/Replica Request Field 1010B
   Flag to provide a separate charge for host request, customer request and replica request.
Replica On-line/Off-line Request Field 1010C
   Flag to provide a separate charge for requests performed by an On-line Replica computer or Off-line Replica Computer.
Processor Type Flag 1010D
   Which processor(s) actually performed the request.
Time of Day Range Field 1010E
   Used to provide different rates during times in a given day.
Date Range Field 1010F
   Used to provide different rates during certain periods (i.e., weekend rates).
Holiday Field 1010G
   Used to provide different rates during certain days.

Charge Amount per Minute Field 1010H
This is the charge amount for time based services.
Monthly Base Charge Field 1010I
This is the charge amount for fixed charge services.
Per Use Charge Field 1010J
This is the charge amount for per usage charge services.
Storage Charge Table 1010K
Table of charges by storage type and quantity.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of distributing software updates via an on-line computer system that, in use, is connectable to a customer computer system located remotely to said on-line computer system, said method comprising:
   (a) storing a first version of software on said remote computer system;
   (b) establishing a virtual disk drive;
   (c) storing a second version of said software on said virtual disk drive;
   (d) establishing a real time telecommunications link between said on-line computer system and said remote computer system;
   (e) copying, over said link, said second software version from said virtual disk drive to said remote computer system to update said stored first software version; and
   (f) charging a fee for said updating.

2. A method of distributing software for an on-line computer system to a customer computer system located remotely to said on-line computer system, said method comprising:
   (a) establishing N virtual disk drives at the online computer system, N being an integer;
   (b) storing N software programs, one on each of said N virtual disk drives;
   (c) establishing a real time telecommunications link between said online computer system and [a] the remote computer system;
   (d) selecting one of said N software programs; and
   (e) attaching one of said N virtual disk drives to said remote computer system, including selecting said one virtual disk drive to attach based on the results of said selecting step (d).

3. An online computer system providing commercial software distribution services to remote customer computers without requiring an external special purpose remote control security hardware module at said customer computers in order to interface with said online computer system, said system performing the following steps:
   (a) establishing a customer relationship between a customer and an online service provider providing a software rental service, said customer having a customer's computer associated therewith;
   (b) establishing a telecommunications link between the customer's computer and the online computer system;
   (c) validating a customer's access to at least one software program for rental provided by the online service provider;
   (d) allowing the customer to select the at least one software program for rental purposes from the online service provider;
   (e) conditioned at least in part on validating step (c), allowing the customer to execute the software program selected in step (d) in the customer computer's processor, including the steps of:
      (1) encrypting at least a part of the online service provider software rental program selected in step (d),
      (2) transmitting the encrypted software rental program to the customer computer,
      (3) decrypting the software rental program transmitted in step (2), and
      (4) loading the software rental program decrypted in step (3) into the customer computer processor for execution;
   (f) restricting said customer from making a copy of at least said decrypted software rental program;
   (g) conditioned at least in part on completion of software program execution in step (e), deactivating said software rental program by performing at least one of:
      (1) deleting said software rental program from said customer computer, and
      (2) disabling said software rental program from further execution, and
   (h) assessing a charge to the customer.

4. An online computer system providing release update distribution services to remote customer computers without requiring an external special purpose remote control security hardware module at said customer computers in order to interface with said online computer system, said system performing the following steps:
   (a) establishing a customer relationship between a customer and an online service provider providing a release update service, said customer having a customer's computer associated therewith;
   (b) establishing a telecommunications link between the customer's computer and the online computer system;
   (c) validating a customer's authority;
   (d) allowing a release update to be selected from the online service provider;
   (e) determining the customer's eligibility to receive the release update selected in step (d); and
   (f) conditioned at least in part on validating step (c) and determining step (e), allowing the customer to receive the release update selected in step (d), including the steps of:
      (1) determining if the online service provider release update selected in step (d) is to be provided with automated processing,
      (2) transmitting the release update to the customer computer, and
      (3) conditioned at least in part on determining step (1) applying the release update transmitted in step (2).

5. An online computer system providing commercial software distribution services to remote customer computers without requiring an external special purpose remote control security hardware module at said customer computers in order to interface with said online computer system, said system performing the following steps:
   (a) establishing a customer relationship between a customer and an online service provider providing a software distribution service, said customer having a customer's computer associated therewith;
   (b) establishing a telecommunications link between the customer's computer and the online computer system;
   (c) validating a customer's authority;
   (d) allowing the customer to select a software program to purchase from the online service provider;

(e) conditioned at least in part on validating step (c), allowing the customer to receive the software program selected in step (d), including the steps of:
  (1) encrypting the software program selected in step (d),
  (2) transmitting the encrypted software program to the customer computer,
  (3) decrypting the software program transmitted in step (2),
  (4) storing the software program decrypted in step (3) on storage accessible by the customer computer; and
(f) assessing a charge.

6. A method as in any of claims 1, 2 or 4 further including protecting said telecommunications link with encryption.

7. A method as in any of claims 1, 2, 3, 4 or 5 wherein each of the foregoing steps is performed for multiple customers, and the method further includes allowing multiple customers to substantially simultaneously access online information.

8. A method as in any of claims 1, 2, 3, 4 or 5 further including the step of requesting a payment.

9. A method as in any of claims 1, 2, 3, 4 or 5 further including denying said customer computer further access to receive distributed software updates if a payment is not received.

10. A method as in any of claims 1, 2, 3, 4 or 5 further including tracking at least one of: (i) the customer computer system's access to the on-line computer system, and (ii) the customer computer system's receipt of software via the on-line computer system.

11. A method as in any of claims 1, 2, 3, 4 or 5 further including conditionally restricting at least a part of the customer computer's access to the on-line computer system.

12. A method as in any of claims 1, 2, 3, 4 or 5 wherein said step of establishing a telecommunications link comprises establishing an Internet link between said on-line computer system and said customer computer system.

13. A method as in any of claims 1, 2, 3, 4 or 5 wherein said customer computer system is located geographically remotely to said on-line computer system.

14. A method as in any of claims 1, 2, 3, 4 or 5 further including requesting a payment, and conditionally allowing said customer computer system access to copy software based on whether said payment is received.

15. A method as in any of claims 1, 2, 3, 4 or 5 wherein said customer computer system is controlled by a customer of said on-line computer system, and said method further includes encrypting data associated with the identity of said customer and providing said encrypted data to said on-line computer system.

16. A method as in any of claims 1, 2, 3, 4 or 5 wherein said link establishing step comprises calling the on-line computer system over a telecommunications link that automatically results in a portion of software distribution charges being paid by a telecommunications provider.

17. A method as in any of claims 1, 2, 3, 4 or 5 further including compressing at least some of the data transported by the telecommunications link.

18. A method as in any of claims 1, 2, 3, 4 or 5 further including setting at least one service option that controls at least in part the way a request sent from the customer computer system to the on-line computer system is satisfied.

19. A method as in any of claims 1, 2, 3, 4 or 5 further including setting at least one default option for the way a request is satisfied.

20. A method as in any of claims 1, 2, 3, 4 or 5 wherein the link establishing step is performed at least in part under control of software executing on the customer computer system, and the method further includes downloading the software from the on-line computer system to the customer computer system over the telecommunications link.

21. A method as in any of claims 1, 2, 3, 4 or 5 wherein said customer computer system includes a file system, and the link establishing step comprises allowing the customer computer system to access software provided by the on-line computer system by integrating at least a portion of the telecommunications link for access by the customer computer system's file system.

22. A method as in any of claims 1, 2, 3, 4 or 5 further including providing a signup system allowing a customer of the customer computer system to subscribe to at least one software distribution service.

23. A method as in any of claims 1, 2, 3, 4 or 5 further including establishing logon information for use in accessing the software distribution service.

24. A method as in any of claims 1, 2, 3, 4 or 5 wherein said connection comprises a dialup Internet connection.

25. A method as in any of claims 1, 2, 3, 4 or 5 further including providing at least one anti-viral service that detects and disinfects computer viruses.

26. A method as in any of claims 1, 2, 3, 4 or 5 including charging a monthly fee.

27. A method as in any of claims 1, 2, 3, 4 or 5 further including conditionally sending a message to the customer computer system.

28. A method as in any of claims 1, 2, 3, 4 or 5 wherein the link establishing step includes establishing said link at least in part under control of software executing on the customer computer system, and the method further includes the step of downloading the software from the on-line computer system to the customer computer system.

29. A method as in any of claims 1, 2, 3, 4 or 5 further including allowing a customer of said customer computer system to register for software distribution services with said on-line computer system interactively, including the step of establishing logon information comprising at least one of (a) customer identification information, (b) password information, and (c) customer name information.

30. A method as in any of claims 1, 2, 3, 4 or 5 further including executing scheduling software on the customer computer system that establishes a schedule for initiating access to the on-line computer system.

31. A method as in any of claims 1, 2, 3, 4 or 5 further including executing automation software in the customer computer system that enables the customer computer system to access the on-line computer system at least in part without user intervention.

32. A method as in any of claims 1, 2, 3, 4 or 5 further including accessing, at the on-line computer system, information specifying at least some configuration information about the customer computer system.

33. A method as in any of claims 1, 2, 3, 4 or 5 further including accessing, at the on-line computer system, information specifying at least one service option that cannot be changed by the customer of the customer computer system.

34. A method as in any of claims 1, 2, 3, 4 or 5 further including accessing, at the on-line computer system, information specifying at least one restriction for the customer of the customer computer system.

35. A method as in any of claims 1, 2, 3, 4 or 5 further including identifying a compression technique for compressing at least some of the data transmitted over the telecommunications link.

36. A method as in any of claims 1, 2, 3, 4 or 5 wherein said telecommunications link permits said customer computer system to access software from on-line computer system in a manner that simulates a mass storage device locally attached to said customer computer system.

37. A method as in any of claims 1, 2, 3, 4 or 5 wherein said above-mentioned steps are performed automatically.

38. A method as in any of claims 1, 2, 3, 4 or 5 wherein at least some of said above-mentioned steps are automatically performed periodically.

39. A method as in any of claims 1, 2, 3, 4 or 5 further including performing at least some of said above-mentioned steps while the customer computer system is unattended.

40. A method as in any of claims 1, 2, 3, 4 or 5 further including logging at least some portion of the activity performed in one of said above-mentioned steps.

41. A method as in any of claims 1, 2, 3, 4 or 5 further including requesting a password from said customer computer system, and tracking invalid password attempts.

42. A method as in any of claims 1, 2, 3, 4 or 5 further including checking the authorization of a credit card account of said customer and charging a software license fee to the customer's credit card account.

43. A method as in any of claims 1, 2, 3, 4 or 5 wherein the customer computer comprises conventional hardware programmed with special purpose downloaded software.

44. A method as in any of claims 1, 2, 3, 4 or 5 wherein the link establishing step is performed using a standard modem device.

45. A method as in any of claims 1, 2, 3, 4 or 5 further including collecting customer usage data from the customer computer in real time via said link.

46. A method as in any of claims 1, 2, 3, 4 or 5 further including performing said aforementioned steps without requiring expensive peripheral equipment to be locally connected to the customer computer.

47. A method as in any of claims 1, 2, 3, 4 or 5 further including performing said aforementioned steps without requiring substantial changes to said customer computer hardware in order to interface with the online computer system.

48. A method as in any of claims 1, 2, 3, 4 or 5 further including performing an online signup procedure that rapidly grants new customers access rights so that said new customers can substantially immediately begin using said online computer systems.

49. A method as in any of claims 1, 2, 3, 4 or 5 further including performing the aforementioned steps without requiring authentication hardware at the customer computer.

50. A software distribution service for distributing software to a customer via a customer computer associated with at least one computer user, said software distribution service comprising:

a registration arrangement that establishes a customer relationship between the computer user and the software distribution service so that new customers can begin using said software distribution service;

an online connection arrangement that establishes a real time online connection with said customer computer for communicating digital information and securing at least a portion of the digital information communicated during the online connection, said online connection arrangement including at least one of an encryptor and a decryptor;

a validator that checks authorization of a credit card account of said customer and charges an associated license fee to the customer's credit card account, said validator being coactive with said online connection arrangement, said validator conditioning the authority of said customer computer to receive distributed software;

a transfer device operatively coupled to said online connection arrangement and to said validator, said transfer device distributing software to said customer computer, said transfer device communicating the software at least in part over said online connection established by said online connection arrangement conditioned on validation by said validator that said customer computer is eligible to receive said distributed software; and a charge calculator that assesses a charge for said customer.

51. A software distribution service as in claim 50 wherein said registration arrangement establishes an identifier that is at least in part being capable of establishing said computer user as a customer of the software distribution service.

52. A software distribution service as in claim 50 wherein said online connection arrangement includes a multitasking arrangement that allows multiple customer computers to access the software distribution service substantially simultaneously.

53. A software distribution service as in claim 50 further including a payment collector that requests and receives a payment from said customer for the charge assessed by said charge calculator.

54. A software distribution service as in claim 50 further including means for denying said customer further access rights to said software distribution service if a payment is not received for the charge calculated by said charge calculator.

55. A software distribution service as in claim 50 further including a tracking arrangement that tracks at least one of said connection arrangement, said registration arrangement, said validator, and said transfer device.

56. A software distribution service as in claim 50 further including restrictor that restricts said customer computer from receiving distributed software based at least in part on said validator.

57. A software distribution service as in claim 50 wherein said connection arrangement establishes an Internet connection between said customer computer and said software distribution service.

58. A software distribution service as in claim 50 wherein said customer computer system is geographically remotely located to said software distribution service.

59. A software distribution service as in claim 50 further including payment processor that requests payment for said charge assessed by said charge calculator, and said payment processor denying said customer computer system from access to said transfer device if said payment is not received.

60. A software distribution service as in claim 50 wherein said online connection arrangement includes a decryptor for decrypting customer computer encrypted data associated with the customer's identity and provides the unencrypted data to said validator.

61. A software distribution service as in claim 50 wherein said connection arrangement establishes said connection over a telecommunications path that automatically results in a portion of an associated customer's telecommunications charge being paid by a telecommunications provider to the software distribution service.

62. A software distribution service as in claim 50 further including a compressor that compresses at least some of the digital information transported by said connection.

63. A software distribution service as in claim 50 further including means for setting at least one service option that controls at least in part the way a request sent from the customer's computer to the software distribution service is satisfied.

64. A software distribution service as in claim 50 further including a default setting arrangement for setting at least one default option for the way a request is satisfied.

65. A software distribution service as in claim 50 wherein said transfer device operates at least in part under control of software executing on the customer computer, and the service further includes a downloader that downloads the software from the service to the customer computer over said online connection.

66. A software distribution service as in claim 50 wherein said customer computer includes a file system, and said transfer device allows the customer computer to access the software for distribution by integrating at least a portion of the online connection established by said connection arrangement for access by the customer computer file system.

67. A software distribution service as in claim 50 wherein said connection arrangement establishes a dialup Internet connection.

68. A software distribution service as in claim 50 further includes a protection arrangement that provides anti-viral services, said anti-viral services being capable of detecting and disinfecting computer viruses.

69. A software distribution service as in claim 50 wherein said charge calculator charges a monthly fee.

70. A software distribution service as in claim 50 further including means for conditionally sending a message to the customer computer system.

71. A software distribution service as in claim 50 wherein said transfer device operates at least in part under control of software executing on the customer computer, and the apparatus further includes a downloader that downloads software from the online service provider to the customer computer.

72. A software distribution service as in claim 50 further including a scheduler executing on the customer computer, the scheduler establishing a schedule for initiating access to the software distribution service.

73. A software distribution service as in claim 50 further including automation software that enables the customer computer to access the software distribution service at least in part without user intervention.

74. A software distribution service as in claim 50 further including means for accessing information specifying at least some configuration information about the customer computer system.

75. A software distribution service as in claim 50 further including means for accessing information specifying at least one service option that cannot be changed by the customer of the customer computer.

76. A software distribution service as in claim 50 further including means for accessing, at the online computer system, information specifying at least one restriction for the customer of the customer computer.

77. A software distribution service as in claim 50 further including means for establishing a method of compression to be used to compress at least some of the data transmitted over the telecommunications connection.

78. A software distribution service as in claim 50 wherein said connection arrangement permits said customer computer to access said software transferred from the service in a manner that simulates a mass storage device locally attached to said customer computer.

79. A software distribution service as in claim 50 wherein said transfer device further allows the customer computer to execute said distributed software for at least one of (i) a temporary basis and (ii) a one time basis, and wherein said charge calculator assesses a free charge for temporary and one time use of said distributed software.

80. A software distribution service as in claim 50 further including means for allowing said customer computer to temporarily demonstrate the software distributed by said transfer device prior to said charge calculator assessing a charge for software distribution.

81. A software distribution service as in claim 50 wherein said charge calculator charges said customer based on at least one of (i) the duration of the connection established by said connection arrangement and (ii) the duration of said software distribution performed by said transfer device.

82. A software distribution service as in claim 50 wherein the transfer device allows the distributed software to be simultaneously available to at least one other customer computer connected to the software distribution service.

83. A software distribution service as in claim 50 wherein said validator, said transfer device and said charge calculator operate automatically.

84. A software distribution service as in claim 50 wherein said validator, said transfer device and said charge calculator operate automatically and periodically.

85. A software distribution service as in claim 50 wherein said validator, said transfer device and said charge calculator operate while the customer computer is unattended.

86. A software distribution service as in claim 50 wherein said transfer device includes means for allowing said customer computer to store said distributed software on auxiliary storage attached to said service.

87. A software distribution service as in claim 86 further including means for said customer computer to establish a subsequent connection to said service in order to access said software program stored on said online service provider auxiliary storage.

88. A software distribution service as in claim 50 further including a recorder for writing a data log of a portion of the activity performed by at least one of said connection arrangement, said registration arrangement, said validator, and said transfer device.

89. A software distribution service as in claim 50 wherein said validator operates in response to at least one of (i) a user profile and (ii) the command authority.

90. A software distribution service as in claim 50 further including a logger that requests a password from said customer computer and tracks the number of invalid password attempts.

91. A software distribution service as in claim 50 further including a tracking element used to determine the last time a customer has accessed the service.

92. A software distribution service as in claim 50 wherein the customer computer comprises conventional hardware programmed with special purpose software.

93. A software distribution service as in claim 50 wherein the registration arrangement allows new computer users to register for said software distribution service and then substantially immediately begin using said software distribution service.

94. A software distribution service as in claim 50 wherein the online computer system collects customer usage data from the customer computer in real time via said connection.

* * * * *